US011188587B2

(12) United States Patent
Pereira et al.

(10) Patent No.: US 11,188,587 B2
(45) Date of Patent: Nov. 30, 2021

(54) MEDIA FINGERPRINTING AND IDENTIFICATION SYSTEM

(71) Applicant: Roku, Inc., San Jose, CA (US)

(72) Inventors: Jose Pio Pereira, Cupertino, CA (US); Sunil Suresh Kulkarni, Santa Cruz, CA (US); Shashank Merchant, Sunnyvale, CA (US); Prashant Ramanathan, Mountain View, CA (US); Pradipkumar Dineshbhai Gajjar, Sunnyvale, CA (US)

(73) Assignee: Roku, Inc., San Jose, CA (US)

( * ) Notice: Subject to any disclaimer, the term of this patent is extended or adjusted under 35 U.S.C. 154(b) by 448 days.

(21) Appl. No.: 16/387,456

(22) Filed: Apr. 17, 2019

(65) Prior Publication Data

US 2019/0251114 A1 Aug. 15, 2019

Related U.S. Application Data

(63) Continuation of application No. 15/265,002, filed on Sep. 14, 2016, now Pat. No. 10,402,443, which is a
(Continued)

(51) Int. Cl.
*G06F 16/00* (2019.01)
*G06F 16/48* (2019.01)
(Continued)

(52) U.S. Cl.
CPC .......... *G06F 16/48* (2019.01); *G06F 16/2255* (2019.01); *G06F 16/285* (2019.01);
(Continued)

(58) Field of Classification Search
CPC ..... G06F 16/48; G06F 16/2255; G06F 16/285
See application file for complete search history.

(56) References Cited

U.S. PATENT DOCUMENTS

| 5,819,286 A | 10/1998 | Yang et al. |
| 6,925,475 B2 | 8/2005 | Essafi et al. |

(Continued)

OTHER PUBLICATIONS

Wang Xinli, "Study on Authentication for Live Streaming Media Over P2P-Based Network", 2009 International Forum on Computer-Technology and Applications, pp. 247-250. (Year: 2009).*

(Continued)

*Primary Examiner* — Cheryl Lewis
(74) *Attorney, Agent, or Firm* — McDonnell Boehnen Hulbert & Berghoff LLP

(57) ABSTRACT

The overall architecture and details of a scalable video fingerprinting and identification system that is robust with respect to many classes of video distortions is described. In this system, a fingerprint for a piece of multimedia content is composed of a number of compact signatures, along with traversal hash signatures and associated metadata. Numerical descriptors are generated for features found in a multimedia clip, signatures are generated from these descriptors, and a reference signature database is constructed from these signatures. Query signatures are also generated for a query multimedia clip. These query signatures are searched against the reference database using a fast similarity search procedure, to produce a candidate list of matching signatures. This candidate list is further analyzed to find the most likely reference matches. Signature correlation is performed between the likely reference matches and the query clip to improve detection accuracy.

20 Claims, 37 Drawing Sheets

Related U.S. Application Data continuation of application No. 15/073,858, filed on Mar. 18, 2016, now Pat. No. 9,471,674, which is a continuation of application No. 14/885,110, filed on Oct. 16, 2015, now Pat. No. 9,323,754, which is a continuation of application No. 14/711,054, filed on May 13, 2015, now Pat. No. 9,195,663, which is a continuation of application No. 14/059,688, filed on Oct. 22, 2013, now Pat. No. 9,053,104, which is a continuation of application No. 13/719,603, filed on Dec. 19, 2012, now Pat. No. 8,688,731, which is a continuation of application No. 13/463,137, filed on May 3, 2012, now Pat. No. 8,364,703, which is a continuation of application No. 12/772,566, filed on May 3, 2010, now Pat. No. 8,195,689.

(60) Provisional application No. 61/185,670, filed on Jun. 10, 2009.

(51) Int. Cl.

| | | |
|---|---|---|
| *G06F 16/41* | (2019.01) | |
| *G06F 16/28* | (2019.01) | |
| *G06F 16/783* | (2019.01) | |
| *G06F 16/951* | (2019.01) | |
| *G06F 16/22* | (2019.01) | |
| *G06F 16/901* | (2019.01) | |
| *G06K 9/00* | (2006.01) | |
| *G06K 9/46* | (2006.01) | |

(52) U.S. Cl.
CPC ............ *G06F 16/41* (2019.01); *G06F 16/783* (2019.01); *G06F 16/7847* (2019.01); *G06F 16/9014* (2019.01); *G06F 16/951* (2019.01); *G06K 9/00744* (2013.01); *G06K 9/4671* (2013.01); *Y10S 707/913* (2013.01)

(56) References Cited

U.S. PATENT DOCUMENTS

| | | | |
|---|---|---|---|
| 7,289,643 | B2 | 10/2007 | Brunk et al. |
| 7,549,052 | B2 | 6/2009 | Haitsma et al. |
| 7,650,616 | B2 | 1/2010 | Lee |
| 8,069,261 | B2 | 11/2011 | Wang et al. |
| 8,171,030 | B2 | 5/2012 | Pereira et al. |
| 8,189,945 | B2 | 5/2012 | Stojancic et al. |
| 8,195,689 | B2 | 6/2012 | Ramanathan et al. |
| 8,229,227 | B2 | 7/2012 | Stojancic et al. |
| 8,335,786 | B2 | 12/2012 | Pereira et al. |
| 8,364,703 | B2 | 1/2013 | Ramanathan et al. |
| 8,385,644 | B2 | 2/2013 | Stojancic et al. |
| 8,666,152 | B1 | 3/2014 | Ramanathan et al. |
| 8,688,731 | B2 | 4/2014 | Ramanathan et al. |
| 9,053,104 | B2 | 6/2015 | Ramanathan et al. |
| 9,195,663 | B2 | 11/2015 | Ramanathan et al. |
| 9,323,754 | B2 | 4/2016 | Ramanathan et al. |
| 9,471,674 | B2 | 10/2016 | Ramanathan et al. |
| 11,120,068 | B2 | 9/2021 | Pereira et al. |
| 2002/0002682 | A1 | 1/2002 | Tsuchiyama et al. |
| 2003/0105739 | A1 | 6/2003 | Essafi et al. |
| 2004/0062520 | A1 | 4/2004 | Gutta et al. |
| 2005/0044561 | A1 | 2/2005 | McDonald |
| 2006/0129822 | A1 | 6/2006 | Snijder et al. |
| 2007/0071330 | A1 | 3/2007 | Oostveen et al. |
| 2008/0235279 | A1 | 9/2008 | Cho et al. |
| 2009/0216761 | A1 | 8/2009 | Raichelgauz et al. |
| 2009/0281118 | A1 | 11/2009 | Bunnelle et al. |
| 2009/0282218 | A1 | 11/2009 | Raichelgauz et al. |
| 2009/0304082 | A1 | 12/2009 | Radhakrishnan et al. |
| 2009/0324199 | A1 | 12/2009 | Haitsma et al. |
| 2010/0066759 | A1 | 3/2010 | Zhang |
| 2010/0205174 | A1 | 8/2010 | Jiang et al. |
| 2010/0250510 | A1* | 9/2010 | Herberger ............ G11B 27/34 707/705 |
| 2019/0243851 | A1 | 8/2019 | Pereira et al. |
| 2019/0251113 | A1 | 8/2019 | Pereira et al. |

OTHER PUBLICATIONS

Marco La Cascia, "JACOB: Just A Content-Based Query System for Video Databases", IEEE, pp. 1216-1219. (Year: 1996).*

La Cascia, M., et al., "JACOB: Just a Content-Based Query System for Video Databases", "IEEE", 1996, pp. 1216-1219.

Lowe, D.G., "Object Recognition from Local Sale-Invariant Features", "Proceedings of the International Conference on Computer Vision", Sep. 1999, pp. 1150-1157, vol. 2.

Sivic, J., et al., "Video Google: A Text Retrieval Approach to Object Matching in Videos", "Proceedings of the Ninth IEEE International Conference on Computer Vision", Oct. 13-16, 2003, pp. 1470-1477, vol. 2.

Joly, A., et al., "Statistical Similarity Search Applied to Content-Based Video Copy Detection", "Proceedings of the 21st International Conference on Data Engineering (ICDE)", 2005, pp. 1285-1294, Publisher: IEEE Computer Society.

Fechteler et al., Fast And High Resolution 3D Face Scanning, IEEE International Conference, San Antonio, Texas, Nov. 12, 2007, vol. III.

Law-To et al., Video Copy Detection: a Comparative Study, ACM CIVR '07, Jul. 9-11, 2007, pp. 371-378.

Lee et al., Robust Video Fingerprinting for Content-Based Video Identification, IEEE Transactions On Circuits and Systems for Video Technology, Jul. 2008, 18(7):983-988.

Oostveen et al., Feature Extraction and a Database Strategy for Video Fingerprinting, Springer Publishing, VISUAL 2002 (2002), LNCS 2314, pp. 117-128.

Sivic et al., Video Google: A Text Retrieval Approach to Object Matching in Videos, Proceedings or the Ninth IEEE International Conference on Computer Vision, 2003, http://doi.ieeecomputersociety.org/10.1109/ICCV.2003.1238663.

Non-Final Office Action for U.S. Appl. No. 12/788,796 dated Feb. 9, 2012.

Notice of Allowance for U.S. Appl. No. 12/788,796 dated Aug. 16, 2012.

Su et al., "Robust Video Fingerprinting Based On Visual Attention Regions", 2009, IEEE Int'l Conf. on Acoustics Speech and Signal Processing, pp. 1525-1528. (2009).

Hoad et al., "Detection of Video Sequences Using Compact Signatures", ACM Transactions on Information Systems, Jan. 2006, pp. 1-50. (Year: 2006).

Hoad et al., "Fast Video Matching with Signature Alignment", MIR '03: Proceedings of the 5th ACM SIGMM international workshop on Multimedia Information Retrieval, Nov. 2003, pp. 262-269. (Year: 2003).

Wang Xinli, "Study on Authentication for Live Streaming Media Over P2P-Based Network", 2009 International Forum on Computer Science-Technology and Applications, pp. 247-250. (Year: 2009).

* cited by examiner

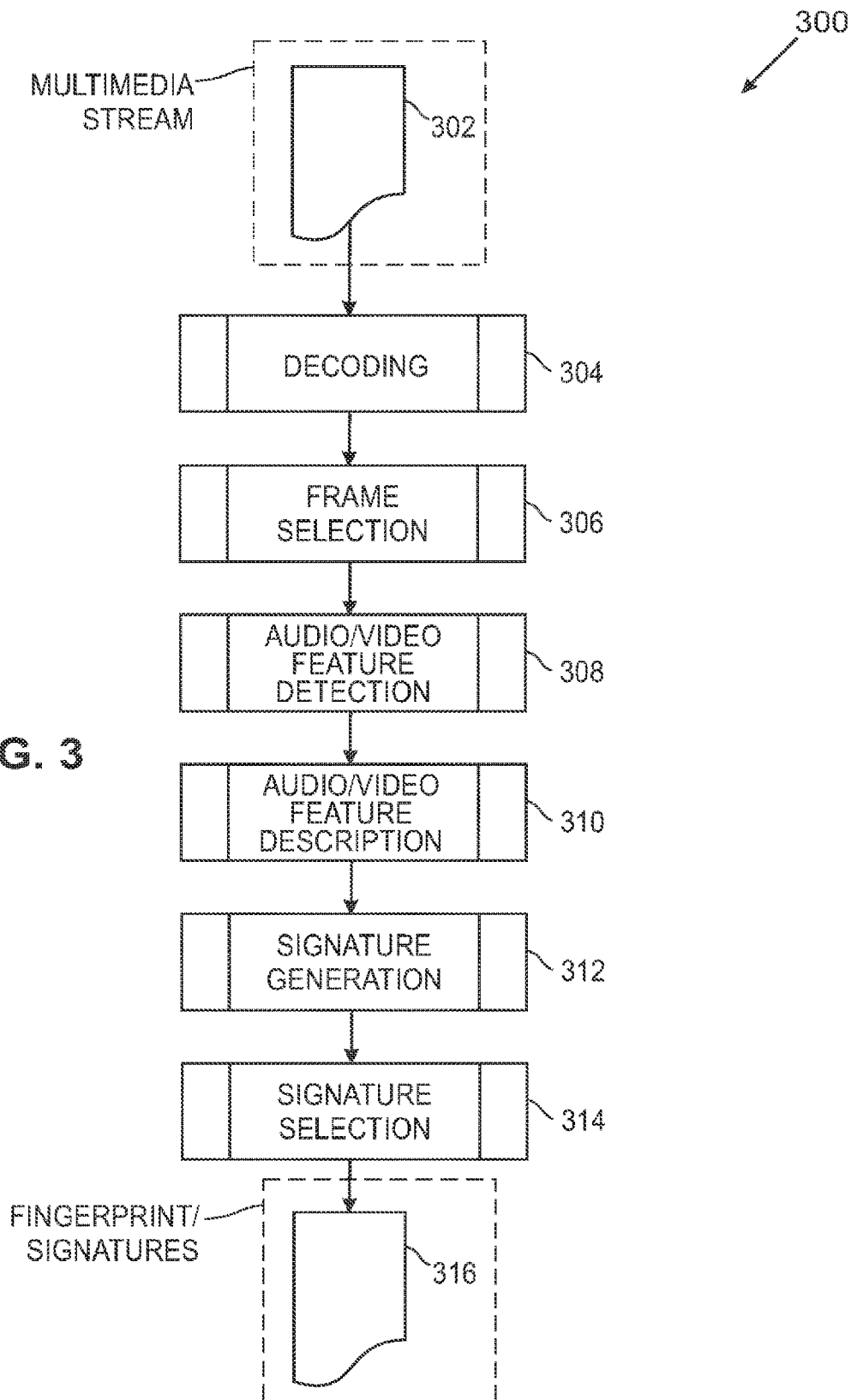

Sector and Ring based
histogram around a
feature;
Alternately Square Grid

Global Signatures
    Color Histogram
    Texture Histogram
    Intensity Histogram
Local Signatures
    First and second
order gradients
    Gradients + phase
correlation, linearity Descriptors for a detected feature Video / Media / Object Database Organization and Sequence / Object Detection Video / Media / Object Database Organization and Sequence / Object Detection in a Distributed System Similarity Search Process Object Detection

MEDIA FINGERPRINTING AND IDENTIFICATION SYSTEM

This application is a continuation of U.S. patent application Ser. No. 15/265,002 entitled "Media Fingerprinting and Identification System" filed Sep. 14, 2016 issued as U.S. Pat. No. 10,402,443, which is a continuation of U.S. patent application Ser. No. 15/073,858 entitled "Media Fingerprinting and Identification System" filed Mar. 18, 2016 issued as U.S. Pat. No. 9,471,674, which is a continuation of U.S. patent application Ser. No. 14/885,110 filed Oct. 16, 2015 issued as U.S. Pat. No. 9,323,754, which is a continuation of U.S. patent application Ser. No. 14/711,054 filed on May 13, 2015 issued as U.S. Pat. No. 9,195,663, which is a continuation of U.S. patent application Ser. No. 14/059,688 filed Oct. 22, 2013 issued as U.S. Pat. No. 9,053,104, which is a continuation of U.S. patent application Ser. No. 13/719,603 filed Dec. 19, 2012 issued as U.S. Pat. No. 8,688,731, which is a continuation of U.S. patent application Ser. No. 13/463,137 filed on May 3, 2012 issued as U.S. Pat. No. 8,364,703, which is a continuation of U.S. patent application Ser. No. 12/772,566 filed on May 3, 2010 issued as U.S. Pat. No. 8,195,689, which claims the benefit of U.S. Provisional Patent Application Ser. No. 61/856,670 entitled "A Highly Scalable, Accurate and Distortion-Robust Media Fingerprinting and Identification System" filed on Jun. 10, 2009 all of which are hereby incorporated by reference in their entirety.

CROSS REFERENCE TO RELATED APPLICATIONS

U.S. application Ser. No. 12/141,163 filed on Jun. 18, 2008 issued as U.S. Pat. No. 8,229,227 entitled "Methods and Apparatus for Providing a Scalable Identification of Digital Video Sequences", U.S. application Ser. No. 12/141,337 filed on Jun. 18, 2008 issued as U.S. Pat. No. 8,171,030 entitled "Method and Apparatus for Multi-dimensional Content Search and Video Identification", U.S. application Ser. No. 12/491,896 filed on Jun. 25, 2009 issued as U.S. Pat. No. 8,385,644 entitled "Digital Video Fingerprinting Based on Resultant Weighted Gradient Orientation Computation", U.S. application Ser. No. 12/612,729 filed Nov. 5, 2009 issued as U.S. Pat. No. 8,189,945 entitled "Digital Video Content Fingerprinting Based on Scale Invariant Interest Region Detection with an Array of Anisotropic Filters", U.S. application Ser. No. 12/788,796 filed on May 24, 2010 issued as U.S. Pat. No. 8,335,786 which claims priority from U.S. Provisional Application Ser. No. 61/181,806 filed on May 28, 2009 entitled "Multi-Media Content Identification Using Multi-Level Content Signature Correlation and Fast Similarity Search", and U.S. application Ser. No. 12/955,416 filed on Nov. 29, 2010 which claims priority from U.S. Provisional Application Ser. No. 61/266,668 filed on Dec. 4, 2009 entitled "Digital Video Content Fingerprinting Using Image Pixel Intensity and Color Information" have the same assignee as the present application, are related applications, and are hereby incorporated by reference in their entirety.

FIELD OF THE INVENTION

The present invention relates generally to improvements in representing and identifying multimedia information. More particularly, the present invention addresses a scalable and accurate audio and video fingerprinting and identification system that is robust to many classes of audio and video distortions.

GENERAL BACKGROUND OF THE INVENTION

Media applications which include video and audio database management, database browsing and identification are undergoing explosive growth and are expected to continue to grow. To address this growth, there is a need for a comprehensive solution related to the problem of creating a video sequence database and identifying, within such a database, a particular video sequence or sequences that are tolerant of media content distortions. Multiple applications include video database mining, copyright content detection for video hosting web-sites, contextual advertising placement, and broadcast monitoring of video programming and advertisements.

Multimedia fingerprinting refers to the ability to generate associated identifying data, referred to as a fingerprint, from the multimedia image, audio and video content. A fingerprint ideally has several properties. First, the fingerprint should be much smaller than the original data. Second, the fingerprint should be designed such that it can be searched for in a large database of fingerprints. Third, the original multimedia content should not be able to be reconstructed from the fingerprint. Fourth, for multimedia content that is a distorted version of another multimedia content, fingerprints of the original and distorted versions should be similar. Examples of some common multimedia distortions include, selecting a clip of video content temporally, cropping the image data, re-encoding the image or audio data to a lower bit-rate, changing a frame rate of the video or audio content, re-recording the multimedia data via some analog medium such as a camcorder in a movie theatre, and changing the aspect ratio of the image content. A fingerprint with the fourth property is deemed to be robust against such distortions.

Such a system of fingerprinting and search is preferable to other methods of content identification. For example, multimedia watermarking changes the multimedia content by inserting watermark data. Unlike multimedia watermarking, fingerprinting does not change the content. Fingerprinting is, however, a very challenging problem.

Increasing demand for such fingerprinting and search solutions, which include standard definition (SD) and high definition (HD) formats of video, requires increasing sophistication, flexibility, and performance in the supporting algorithms and hardware. The sophistication, flexibility, and performance that are desired exceed the capabilities of current generations of software based solutions, in many cases, by an order of magnitude.

SUMMARY OF THE INVENTION

In one or more of its several aspects, the present invention recognizes and addresses problems such as those described above. The present invention describes a system that is highly scalable to very large multimedia databases, highly accurate in finding a closest matching multimedia clip and not misidentifying a wrong clip, and highly robust to many types of distortion. It is also very efficient in terms of the computer hardware resources necessary to fingerprint and search. To such ends, an embodiment of the invention addresses a method of searching reference multimedia signatures that represent audio and video content of reference multimedia clips for a corresponding query multimedia clip. An N dimension signature based on an N dimension descriptor and a traversal hash signature based on a combination of dimensions of the N dimension descriptor are generated for each feature identified in a set of reference multimedia clips.

Each N dimension signature and a link to a corresponding reference multimedia clip are stored at a location in a reference signature database addressable by the traversal hash signature. An N dimension query signature based on an N dimension query descriptor and a traversal hash query signature based on a combination of dimensions of the N dimension query descriptor are generated for a query multimedia clip. The reference signature database is searched using the traversal hash query signature to find similar signatures that are within a specified signature distance, wherein the similar reference multimedia clips are aggregated in a candidate list of closely matching signatures that correspond to similar reference multimedia clips.

Another embodiment of the invention addresses a method of forming accurate descriptors of features in multimedia clips. A scale and a location of the center parameters are determined for each feature of a plurality of features selected from a frame from a multimedia clip. A Bx by By grid is created having Bx*By blocks located at the center of each feature and each block having a Cx by Cy pixel grid. For each block, functions of multiple intensity differences are computed between each pixel in a block's Cx by Cy pixel grid and another pixel for a specified pixel offset that is greater than 1 and based on the scale and location of center parameters. A first N dimension descriptor is generated as a concatenation of the functions for each block of the Bx*By blocks. The scale and location of center parameters are individually adjusted to account for an expected error margin due to image distortions to generate at least a second N dimension descriptor as a concatenation of the functions for each block of the Bx*By blocks as adjusted according to the expected error margin.

Another embodiment of the invention addresses a computer readable medium storing a computer program which causes a computer system to perform a method of searching reference multimedia signatures that represent audio and video content of reference multimedia clips for a corresponding query multimedia clip. An N dimension signature based on an N dimension descriptor and a traversal hash signature based on a combination of dimensions of the N dimension descriptor are generated for each feature identified in a set of reference multimedia clips. Each N dimension signature and a link to a corresponding reference multimedia clip are stored at a location in a reference signature database addressable by the traversal hash signature. An N dimension query signature based on an N dimension query descriptor and a traversal hash query signature based on a combination of dimensions of the N dimension query descriptor are generated for a query multimedia clip. The reference signature database is searched using the traversal hash query signature to find similar signatures that are within a specified signature distance, wherein the similar reference multimedia clips are aggregated in a candidate list of closely matching signatures that correspond to similar reference multimedia clips.

A further embodiment of the invention addresses method for creating a media database. A plurality of signatures are generated from descriptors of selected media content. A signature is selected from the plurality of signatures based on a distribution of bit values in the selected signature and on values of a corresponding descriptor. A traversal hash signature is generated from the corresponding descriptor. The selected signature is stored in a media database at a location within a set of contiguous locations based on the traversal hash signature used as a primary index.

These and other features, aspects, techniques and advantages of the present invention will be apparent to those skilled in the art from the following detailed description, taken together with the accompanying drawings and claims.

BRIEF DESCRIPTION OF THE DRAWINGS

FIG. 3 illustrates a multimedia fingerprinting process in accordance with the present invention;

DETAILED DESCRIPTION

Figure 1:
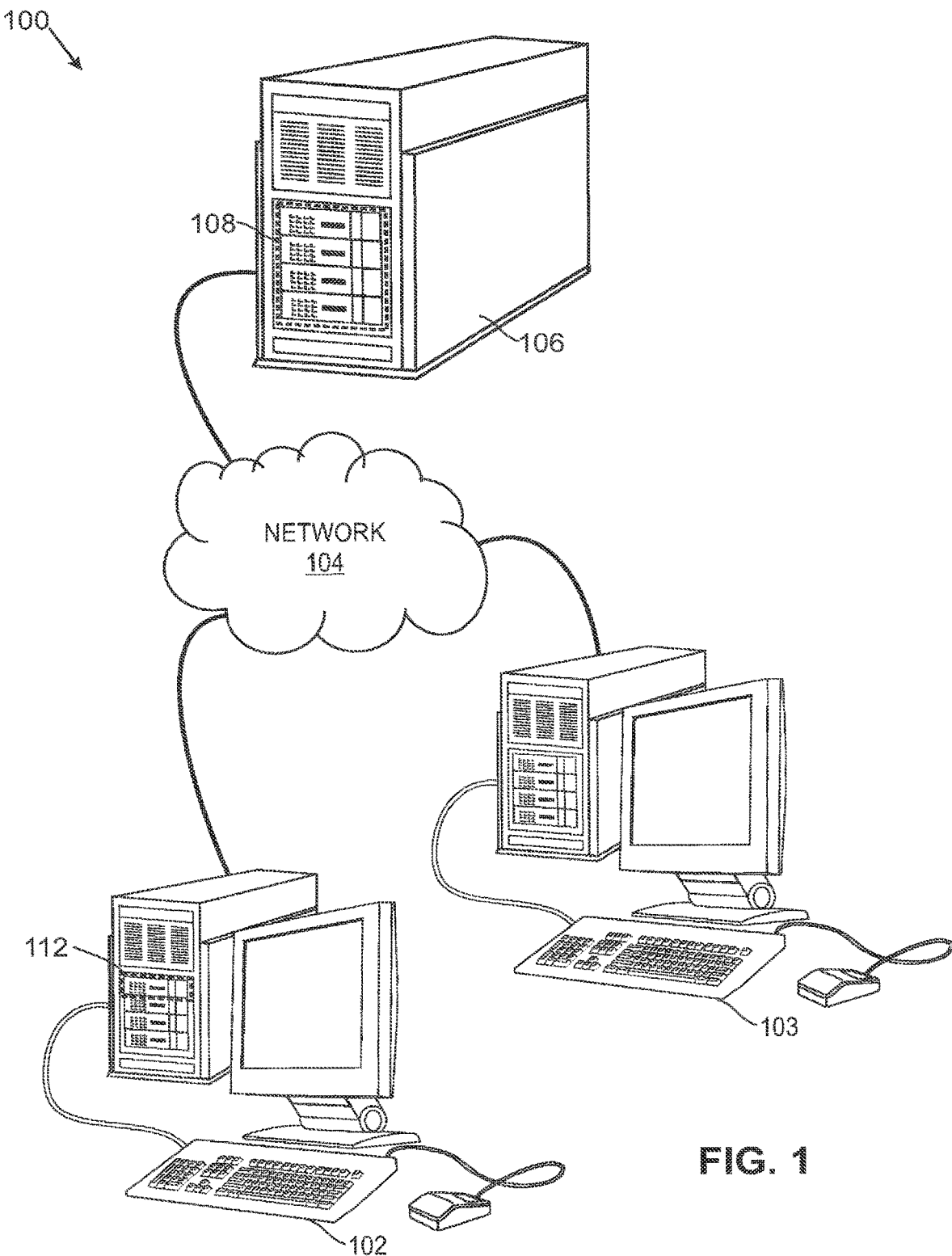
FIG. 1 illustrates a system for media content fingerprinting in accordance with the present invention.

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer-readable storage medium having computer-usable program code embodied in the medium. Any suitable computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript®, Visual Basic®, TSQL, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A computer-readable storage medium may be coupled to the processor through local connections such that the processor can read information from, and write information to, the storage medium or through network connections such that the processor can download information from or upload information to the storage medium. In the alternative, the storage medium may be integral to the processor.

A fingerprint system should be robust to distortions, while allowing for high matching accuracy and low false positive rate. A fingerprinting system should have fast search speed, especially when searching over a large database of content. The fingerprinting system should be able to return a match for a relatively short clip of query content. The fingerprinting system should also be able to generate fingerprints rapidly when generating a reference database or query fingerprints to be searched. These goals tend to compete with each other. For instance, high search speed and support for short query clips can come at the cost of accuracy or robustness to distortion. Generally, accuracy trade-offs against robustness to distortion.

Due to the large size of such databases and the density of media files, high performance, accurate media identification and search technologies are needed. Furthermore, robust video content identification, management, and copyright protection should be resistant to intentional or unintentional video content change or distortion within the limits of parameters, such as, reasonable view-ability. The overall design should be scalable to efficiently handle very large databases of videos and an arbitrary length of a query sequence.

To provide for such needs, FIG. 1 illustrates a system 100 for both media fingerprinting and identification in accordance with an embodiment of the present invention. The system 100 includes user sites 102 and 103, a server 106, a video database 108, and a video fingerprinting and video identification system 112 implemented as a program and operated, for example, by user site 102. A network 104, such as the Internet, a wireless network, or a private network, connects sites 102 and 103 and server 106. Each of the user sites, 102 and 103 and server 106 may include a processor complex having one or more processors, having internal program storage and local user controls such as a monitor, a keyboard, a mouse, a printer, and may include other input or output devices, such as an external file storage device and communication interfaces.

The user site 102 may comprise, for example, a personal computer, a laptop computer, or the like equipped with programs and interfaces to support data input and output and video fingerprinting and search monitoring that may be implemented both automatically and manually. The user site 102, for example, may store programs, such as the video fingerprinting and search system 112 program implementation of a content based video identification process of the present invention or have access to such programs through electronic media, such as may be downloaded over the Internet from an external server, accessed through a universal serial bus (USB) port from flash memory, accessed from disk media of various types, or the like. The system 100 may also suitably include more servers and user sites than shown in FIG. 1. Also, multiple user sites each operating an instantiated copy or version of the video fingerprinting and search system 112 may be connected directly to the server 106 while other user sites may be indirectly connected to it over the network 104.

User sites 102 and 103 may generate user video content which is uploaded over the Internet 104 to a server 106 for storage in a video database 108. The user sites 102 and 103, for example, may also operate a video fingerprinting and video identification system 112 to generate fingerprints and search for video content in the video database 108. The video fingerprinting and video identification system 112 in FIG. 1 is scalable and utilizes highly accurate video fingerprinting and identification technology that checks unknown video content against a database of previously fingerprinted video content, which is considered an accurate or "golden" database. The video fingerprinting and video identification system 112 is different from commonly deployed systems in that it extracts features from the video itself. The video fingerprinting and video identification system 112 allows the server 106 to configure a "golden" database specific to its business requirements. The user site 102 that is configured to connect with the network 104, uses the video fingerprinting and search system 112 to compare video streams against a database of signatures in the video database 108, that has been previously generated.

As used herein, a video fingerprint is a calculated numerical value, alternatively termed a signature, which represents a detected feature of a video frame. In one approach, a feature detection procedure uses a two pass scale space analysis as described in U.S. application Ser. No. 12/612,729 filed Nov. 5, 2009 entitled "Digital Video Content Fingerprinting Based on Scale Invariant Interest Region Detection with an Array of Anisotropic Filters", FIGS. 3, 4, 5, 6A, 6B, 7A, 7B, and 8 and pages 16-26 and 34-36. The first pass uses Laplacian-of-Gaussian second order partial derivative bi-level filters to generate interest regions. These interest regions are further refined in the second pass, using anisotropic filters of sampled elliptic-shaped Gaussian second order partial derivative filters. The detected features, found by interpolating local maxima values, are characterized by the following set of parameters ($s_x$, $s_y$, x, y, peak polarity), where $s_x$, $s_y$ denote the scale in the x and y directions, (x,y) denote the pixel location, and peak polarity denotes whether the feature is a dark or light relative to the image background. For each feature that is detected in a video frame, one or more descriptors are generated according to a global descriptor procedure described below. For each global descriptor, a pair of signatures, a primary signature and a traversal hash signature, are generated as described in more detail below. A collection of signatures drawn from a single video frame with multiple features generates a compact video frame representation, while a collection of signatures associated with each video frame in a video sequence with multiple frames forms the video sequence representation.

The user site 102 has access to the video database 108. The video database 108 may store the video archives, as well as all data related to various video content stored in the video database 108, and a plurality of video fingerprints that have been adapted for use as described herein and in accordance with the present invention. It is noted that depending on the size of an installation, the functions of the video fingerprinting and search system 112 and the capacity and management of the video database 108 may be combined in a single processor system, such as user site 102 or server 106, running separate program threads for each function.

One embodiment of the present invention addresses the problem of matching a query multimedia clip to a reference multimedia clip from a large collection of reference multimedia clips. The multimedia clip and the reference multimedia clips are processed to generate a compact, searchable set of fingerprints and a multimedia fingerprint database is generated to allow for fast, accurate searching using a query fingerprint to search this multimedia fingerprint database.

At the base of the problem of matching a video clip to a video from a large collection of videos, is the problem of reliably matching two digital images when one of them has undergone some form of distortion, such as geometric and optical distortions. Thus, the problem may be restated as what techniques are required to reliably match a distorted query video frame, chosen from a query video clip, to a corresponding undistorted, original video frame residing in a database of original video material. Since the database of original video material may be very large, many video frames in this database could exhibit substantial statistical similarity. Furthermore, many features within a single video frame may also show statistical similarity in both a visual or optical and algorithmic or geometric sense. This fact makes it difficult to clearly distinguish between many possible feature descriptor matches resulting from a database browsing or search activity when a non-exact, similarity measure is used. Hence, a precise, discriminative, and robust video frame feature characterization is desirable having a feature detector and identifier that are well localized in terms of its location spatially and its spatial extent or scale.

This invention describes a system that is readily scalable to very large multimedia databases, accurate in finding a correct clip and not misidentifying a wrong clip, and robust to many types of distortion. A fingerprinting and search system is used, where the fingerprint for a piece of multimedia content is composed of a number of compact signatures, including traversal hash signatures and associated metadata. The compact signatures and traversal hash signatures are constructed to be easily searchable when scaling to a large database of multimedia fingerprints. The multimedia content is also represented by many signatures that relate to various aspects of the multimedia content that are relatively independent from each other. Such an approach allows the system to be robust to distortion of the multimedia content even when only small portions of the multimedia content are available.

Multimedia, specifically audio and video content, may undergo several different types of distortions. For instance, audio distortions include re-encoding to different sample rates or audio quality. Video distortions include cropping, stretching, re-encoding to a lower quality, and image overlays. While these distortions change the digital representation, the multimedia is perceptually similar to a human listener or viewer. Robustness to these distortions refers to the property that content that is perceptually similar will generate fingerprints that have a small distance according to some distance metric, such as Hamming distance for bit based signatures, and content that is perceptually distinct from one another will generate fingerprints that have a large distance, according to the same distance metric. A search for perceptually similar content, hence, is transformed to a problem of searching for fingerprints that are a small distance away from the desired fingerprints.

The overall architecture and details of a highly scalable and accurate video fingerprinting and identification system is described that is robust to many classes of video distortions. In this system, the fingerprint for a piece of multimedia content is composed of a number of compact signatures, along with traversal hash signatures and associated metadata. The compact signatures and traversal hash signatures are constructed so as to be easily searchable when scaling to a very large database of multimedia fingerprints. The multimedia content is represented by many signatures that relate to various aspects of the multimedia that are relatively independent from each other. This allows the system to be very robust under heavy distortion when only small portions of the multimedia content are available.

The content based multimedia identification system consists of a multimedia fingerprinting process and a search process. In order to identify an unknown multimedia clip, these two components are used as described in more detail below.

Figure 2A:
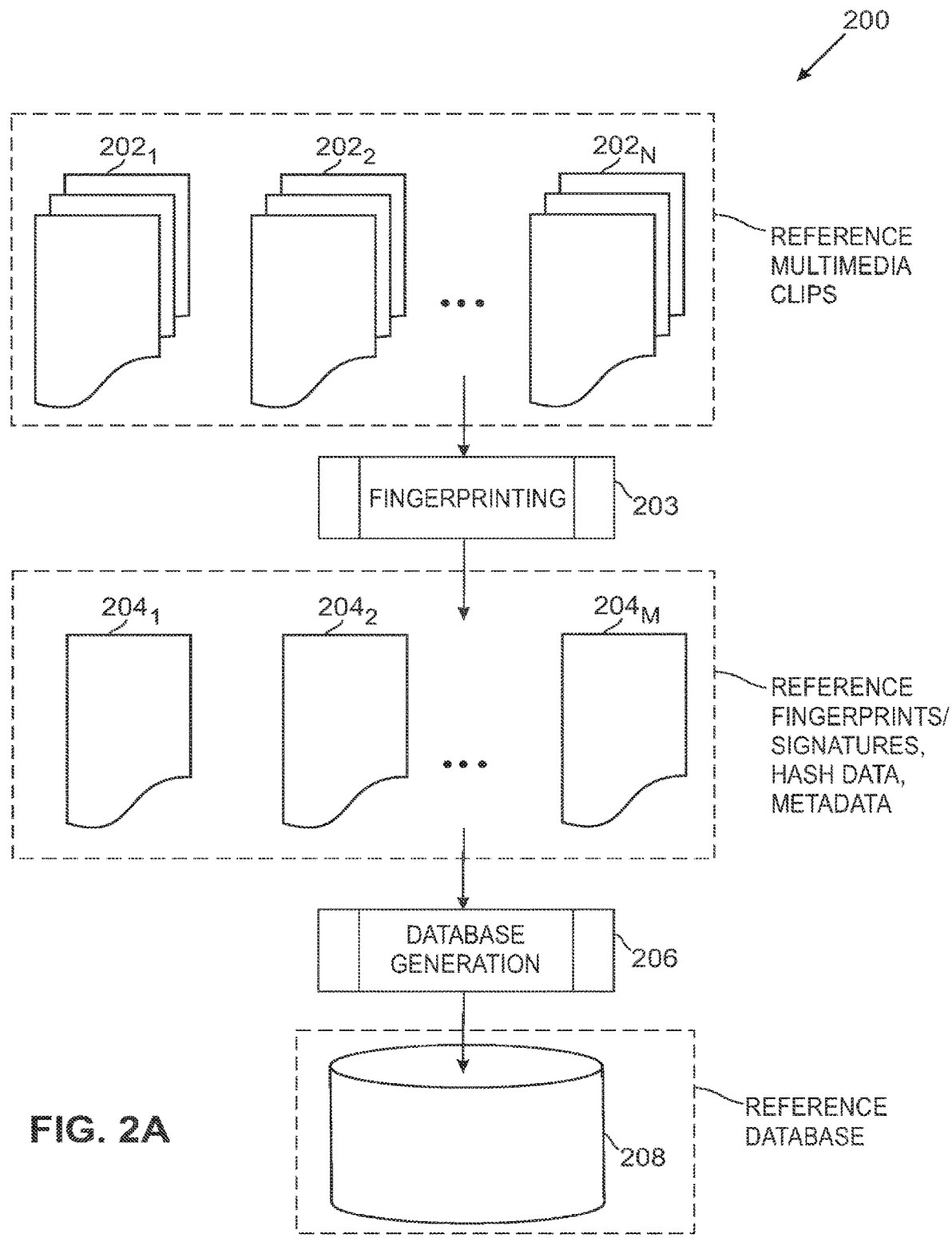
FIG. 2A illustrates a reference media database generation process in accordance with the present invention.

FIG. 2A illustrates a reference media database generation process 200 in accordance with the present invention. Reference multimedia clips $202_1$, $202_2$, ... $202_N$ that are relevant to the application at hand are identified. The clips $202_1$, $202_2$, ... $202_N$ refer to distinct pieces of multimedia content. For example, the clips could be from a movie and represent different temporal portions of the movie, including audio and video content, or they could be from different movies. Using a video fingerprinting function 203 of the video fingerprinting and search system 112, reference signatures $204_1$, $204_2$, ... $204_N$ are generated for the reference multimedia clips $202_1$, $202_2$, ... $202_N$, respectively, along with hashing data and associated metadata. Different pieces of multimedia content may be fingerprinted independently, leading to a parallelizable system. A clip of multimedia content can be broken down into its temporal components, such as frames in the case of video, or temporal audio segments in case of audio. Even more parallelism is possible by independently fingerprinting at the temporal component level, or frame level.

The set of reference signatures $204_1$, $204_2$, ... $204_N$ created in the video fingerprinting function 203 is organized by database generation function 206 into a reference database 208. This set of reference signatures is indexed by the generated hashing data, described in further detail below. The associated metadata, also described in further detail below, is stored along with each reference signature. A set of reference signatures may also be indexed in other ways, for instance, by multimedia identifiers. A single multimedia identifier denotes a distinct piece of multimedia content. For instance, the multimedia clips $202_1$, $202_2$, ... $202_N$ would each be represented by their own multimedia identifier.

Figure 2B:
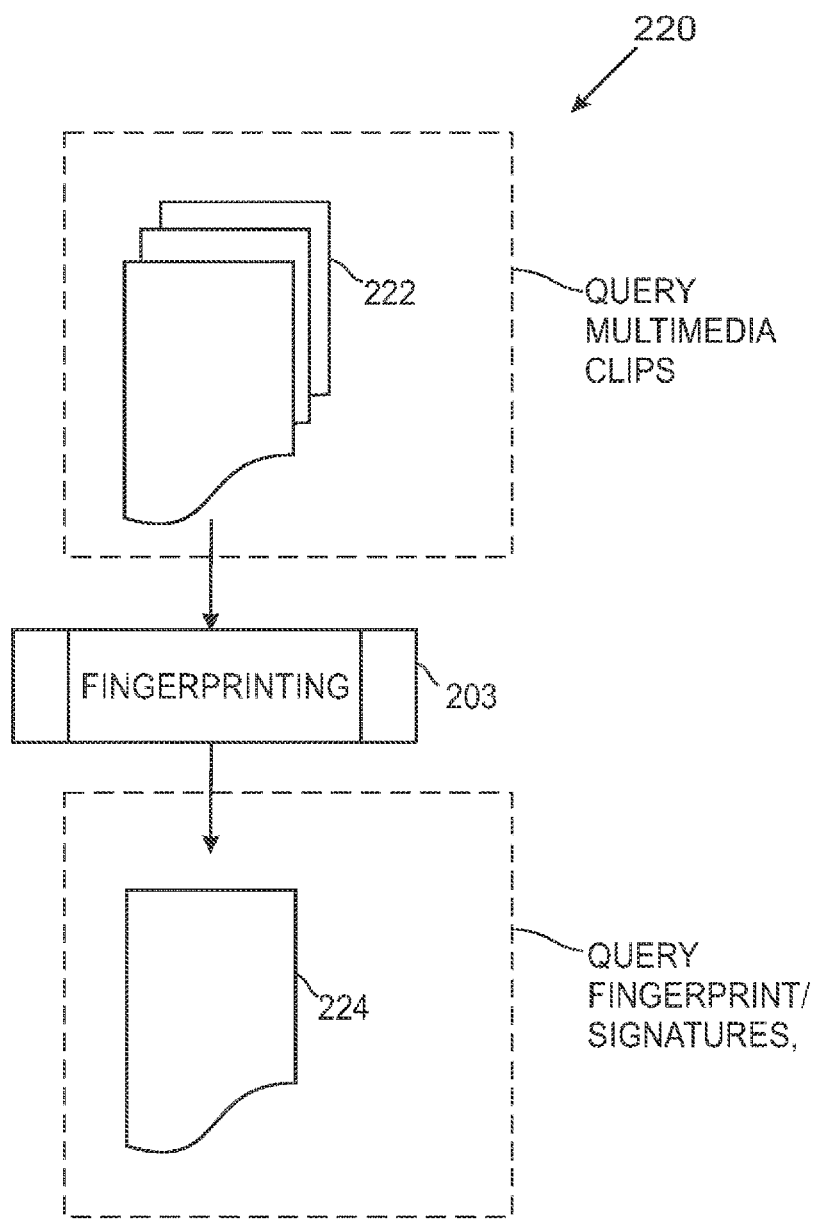
FIG. 2B illustrates a query fingerprint generation process in accordance with the present invention.

FIG. 2B illustrates a query fingerprint generation process 220 in accordance with the present invention. A user requests identification of an unknown multimedia clip 222, including audio and video content, also referred to herein as a query multimedia clip 222. The query multimedia clip 222 is processed by the video fingerprinting function 203 to generate query signatures, hash data, and associated metadata, known collectively as a query fingerprint 224, for the unknown multimedia clip 222.

Figure 2C:
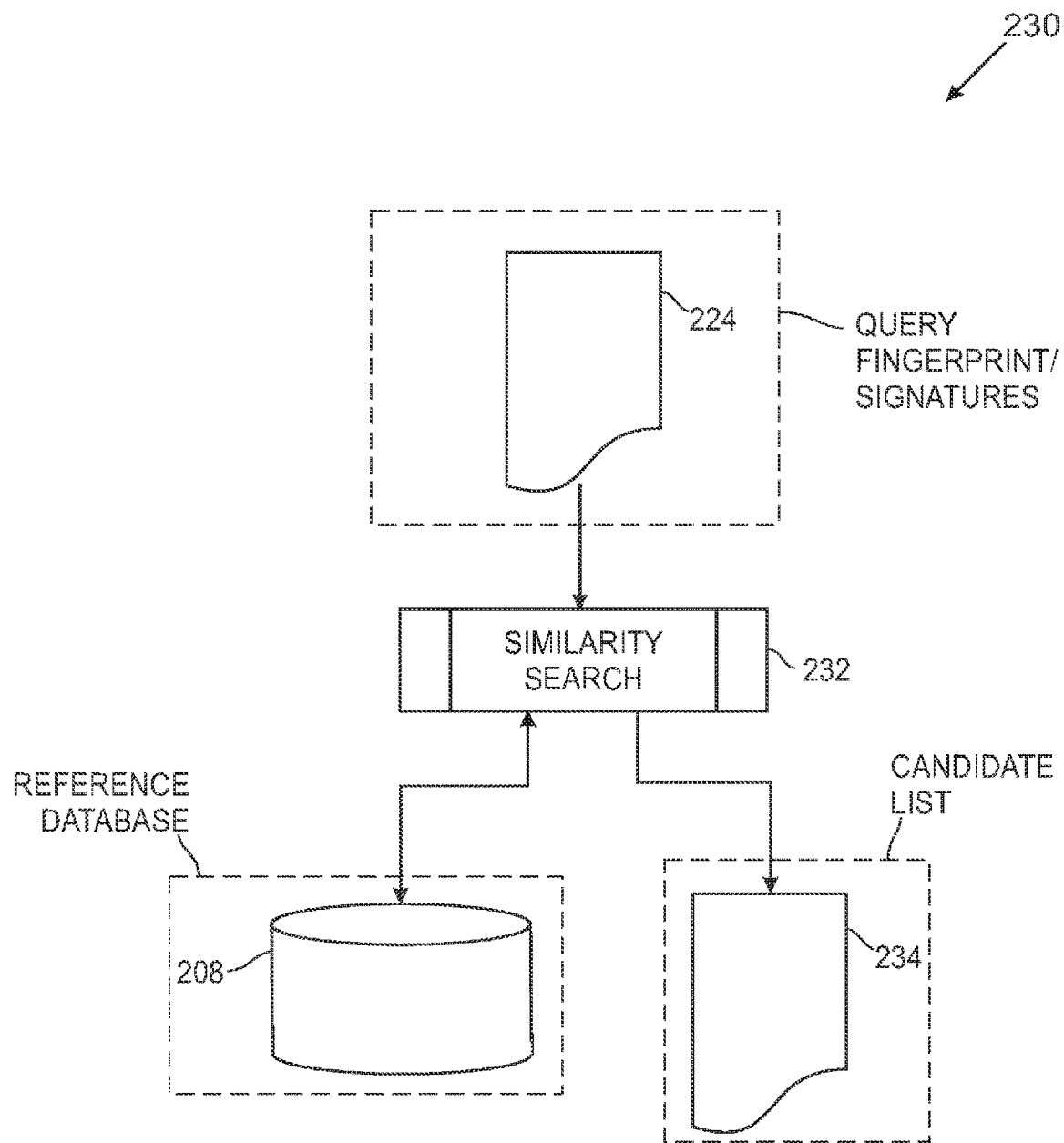
FIG. 2C illustrates a similarity search process in accordance with the present invention.

FIG. 2C illustrates a similarity search process 230 in accordance with the present invention. For each query signature in the query fingerprint 224, a similarity search function 232 is initiated to find similar signatures in the reference database 208. The hash data associated with each query signature is used to restrict the similarity search function 232 to a relatively small portion of the reference data, allowing the similarity search to be extremely fast even for large reference databases. Only reference signatures that are "similar" within a distance measure to the query signature are returned. These classified similar reference signatures are added to a candidate list 234, which contains identifying information regarding which reference multimedia clip $202_1$, $202_2$, ... $202_N$ the similar reference signature belongs.

Figure 2D:
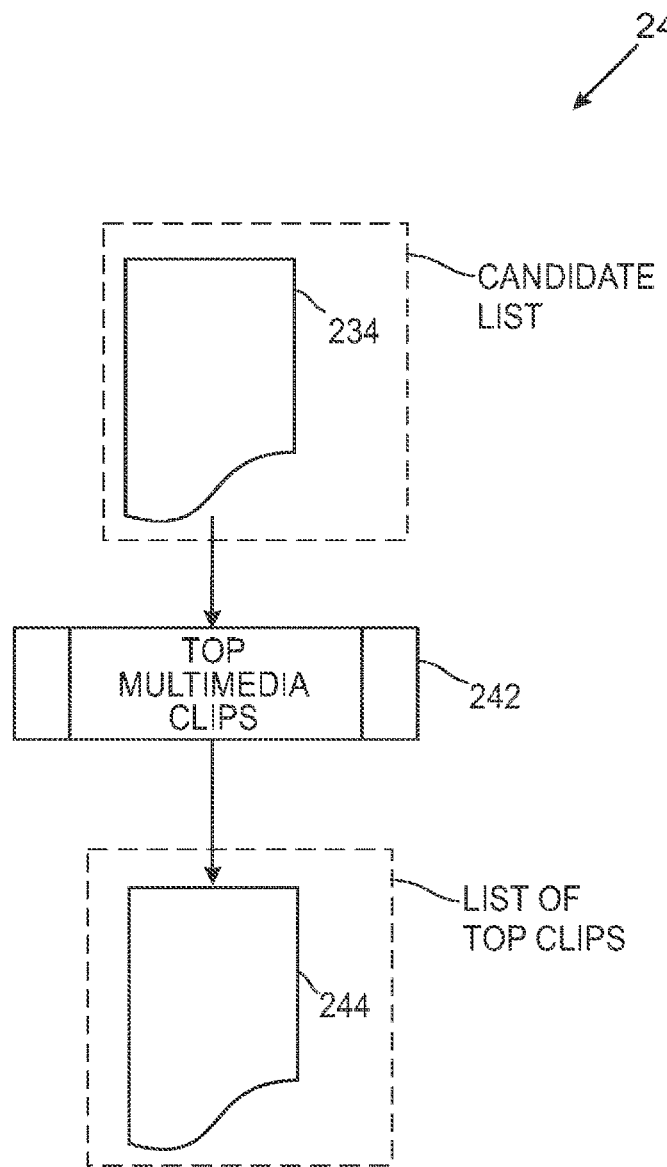
FIG. 2D illustrates a candidate video filtering process in accordance with the present invention.

FIG. 2D illustrates a candidate video filtering process 240 in accordance with the present invention. The video filtering process 240 analyzes the candidate list 234 for the most likely matches in the reference database 208. The candidate list 234 is sorted in top multimedia clips function 242 to find the top most likely matching multimedia clips. The resulting data is stored in a list of top clips 244. The list of top clips 244 includes a multimedia identifier for the similar reference multimedia clip. The matching multimedia clip might be only for a specific portion of the multimedia clip, for instance, a particular time segment, such as seconds 93 to 107 of a video sequence, or spatial locations, such as top left quadrant of the video frames. The temporal identification and spatial locations are also included in the list of top clips.

Figure 2E:
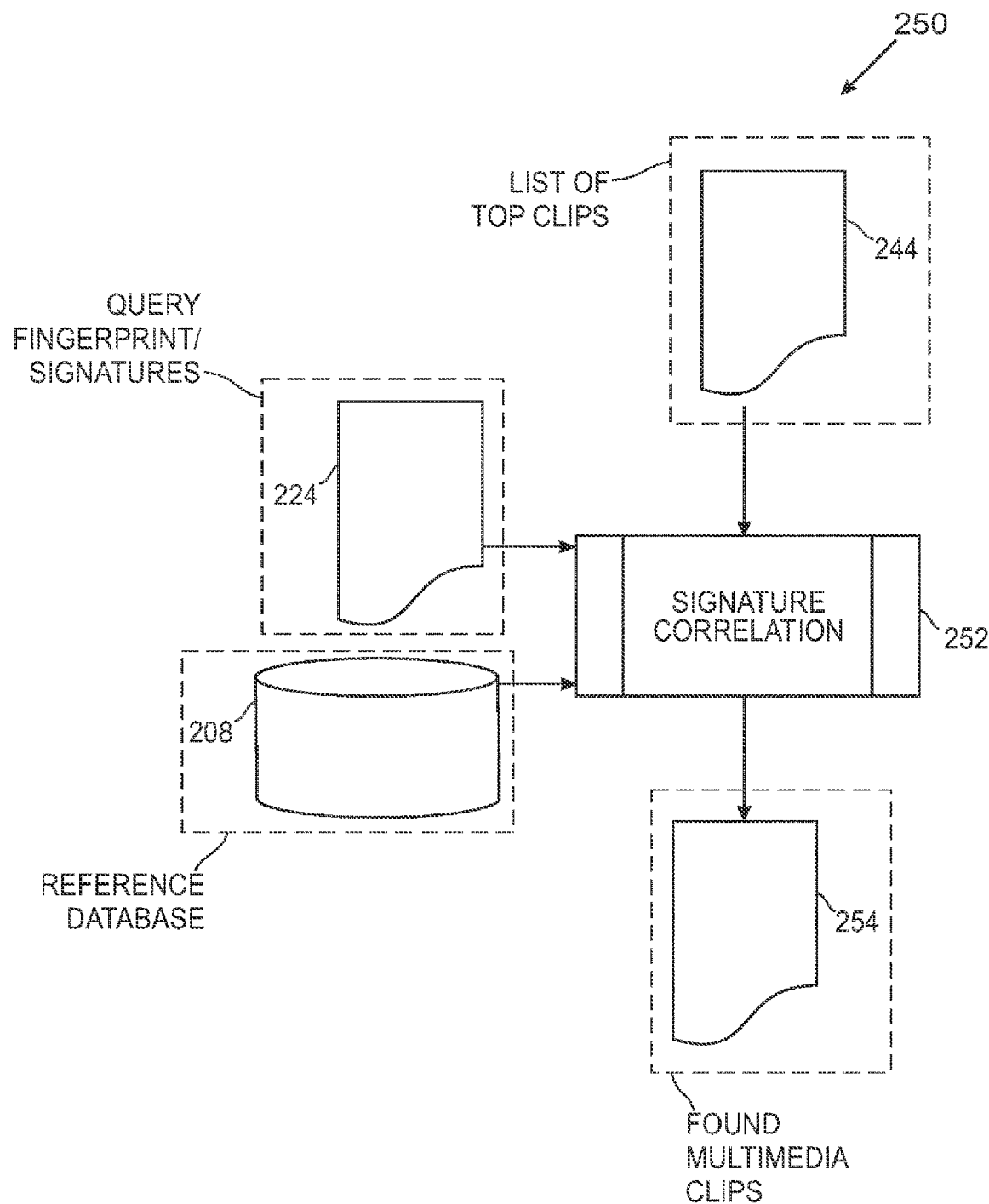
FIG. 2E illustrates a signature correlation process in accordance with the present invention.

FIG. 2E illustrates a signature correlation process 250 in accordance with the present invention. The list of top clips 244 is selected for correlation. For each of the clips in the top clips list 244, a set of signatures is accessed from the reference database 208 given the multimedia identifier and any temporal and/or spatial information. A query could correspond to "all signatures for video number ABC from time 10.4 seconds to 25.7 seconds in the bottom-right quadrant of the frame." These signatures are not restricted have matching traversal hash signatures. The set of query signatures is now compared against this set of reference signatures, using the signature correlation procedure 252. For each query signature, a score is derived based on the distances to the closest signatures in the reference database signature subset, and the number of matches. This could include, for instance, the average distance. These scores are combined, for example, the scores are averaged, for the entire set of query signatures to give an overall score for the database clip. Based on whether this score is over a threshold, the database clip is determined to be a true positive or a false positive. The signature correlation procedure 252 is repeated for all clips in the top clips list 244, to produce a list of matching reference videos, since there may be more than one, if similar content is repeated in the database. FIG. 2A fingerprinting function 203 and FIG. 2B belong to the multimedia fingerprinting system, while FIG. 2A database generation function 206 and FIGS. 2C-2E belong to the search system.

FIG. 3 illustrates a multimedia fingerprinting process 300 in accordance with the present invention. A video clip is decoded from a multimedia source, such as an motion picture experts group (MPEG) compressed audio and video stream, into individual frames and a subset of the frames are selected for processing. For each selected frame, features are detected using a scale-space feature detector. An N-dimensional descriptor is generated based on the image pixels corresponding to the scale and position values from the feature descriptor. An M-dimensional signature and K-dimensional traversal hash signature is generated from descriptor.

The multimedia fingerprinting process 300 encompasses the fingerprinting function 203 shown in FIG. 2A and the query fingerprint generation process 220 of FIG. 2B. As shown in FIG. 3, the multimedia fingerprinting process 300 is comprised of a decoding step 304, a selecting frame step 306, a detecting audio and video features step 308, a describing the detected audio and video features step 310, a generating signatures and hash data step 312, and a selecting signatures step 314.

The decoding step 304 comprises decoding a multimedia stream that may be accessed in compressed form from a distributed source to produce raw or unprocessed image and audio data. This data, which is associated with an identified playout timestamp, can be combined with other contiguous data to form a "frame" of data. For example, for image data, a frame could be a single image, or group of images, decoded from the multimedia stream. For audio data, a frame could be several milliseconds worth of decoded audio.

The selecting frame step 306 comprises selecting a subset of all available frames for further content analysis. Image and audio data exhibit a great deal of temporal coherence which makes it possible to select a limited number of frames from the entire set of data and obtain similar accuracy as if all frames were used. The search system may also be more efficient when fewer signatures are used. The selecting frame step 306 uses an algorithm to select the subset of all available frames to represent the entire multimedia sequence, as described in more detail below.

The detecting audio and video features step 308 comprises further analyzing each selected frame to find audio and video features that should be reproducible under an expected suite of distortions. A reproducible feature implies a high likelihood of having corresponding features in the original content and the distorted content. For an image, this may involve doing scale-space analysis or using a blob detector, to find an x and y location and an x and y scale of the identified blobs in the image.

The describing the detected audio and video features step 310 comprises generating a compact descriptor for each of the features detected in the previous step. For image data, the compact descriptor, such as a vector of real values, could be based on intensity and gradient values in a spatial area surrounding a detected blob. Generally, such a compact descriptor has on the order of 64 or 128 components, based on spatial subdivision and various image spatial and temporal derivatives of zeroth, first and higher orders.

The generating signatures and hash data step 312 comprises, for each generated descriptor of a particular feature of a frame of multimedia, generating an associated signature and a signature hash. The signatures generated typically quantize a descriptor's real value and generate a 1-bit, 2-bit, 4-bit, or 8-bit representation for each of the descriptor's components. For a descriptor that is 64-dimensional, we can use a single threshold value to generate a 64-bit signature. By summing multiple descriptor dimensions, for instance, 4 dimensions, and thresholding the resulting vector, a 16-bit signature hash value can be generated to associate with this signature.

The selecting signatures step 314 comprises selecting signatures that may have greater information content about the multimedia content. For instance, bit-signatures that have nearly all 0's or all 1's tend not to be very unique to a particular multimedia content. Hence, signatures with a count of 0's or 1's that fall below some threshold may be removed. Signatures may also be rejected based on descriptor information, for the descriptor from which the signature is derived. By summing the descriptor values and rejecting those with a sum below a threshold, signatures are eliminated that have corresponding descriptors with their energy concentrated in only a few dimensions.

The multimedia fingerprinting process 300 is described in more detail beginning with the frame selection step 306. The frame selection step 306 includes both static and dynamic selection of frames. In static frame selection, frames are selected in a specified frame selection period of N frames, where, for example, every $N^{th}$ frame is selected without particular regard to frame content. This approach is used for certain applications where processing of every frame, would be difficult due to computational load. In dynamic frame selection, frames are selected based on their audio and video content. Other aspects and further details regarding frame selection may be found in U.S. application Ser. No. 12/141,163 filed on Jun. 18, 2008 entitled "Methods and Apparatus for Providing a Scalable Identification of Digital Video Sequences", FIGS. 3 and 12 and pages 14-16, 25, and 26, and U.S. application Ser. No. 12/491,896 filed on Jun. 25, 2009 entitled "Digital Video Fingerprinting Based on Resultant Weighted Gradient Orientation Computation", FIG. 8 and pages 20-22. For dynamic frame selection, a frame selection period is also specified. The frame selection algorithm and period affects the total processing time, the number of signatures generated, as well as the accuracy of the results.

The detecting audio and video features step 308 involves finding some aspect of the multimedia content for the selected frame that should be reproducible under an expected suite of distortions. In accordance with an embodiment of the present invention, an advantageous approach for finding reproducible image features is described. It is noted that this approach can also be adapted to finding reproducible audio features. Both image and audio features may also be described by a compact descriptor.

Image features, such as blobs in an image, may be identified by location and scale in an x and y direction by using a form of scale-space analysis, also referred to herein as blob detection. Conceptually, scale-space analysis applies Gaussian smoothing filters at a particular scale to the original image, and computes a determinant of the Hessian, to produce a response image for that scale. By appropriately selecting peaks from these response images, x and y locations and scales may be inferred.

Further details regarding scale-space analysis may be found in U.S. application Ser. No. 12/612,729 filed Nov. 5, 2009 entitled "Digital Video Content Fingerprinting Based on Scale Invariant Interest Region Detection with an Array of Anisotropic Filters", FIGS. 3, 4, 5, 6A, 6B, 7A, 7B, and 8 and pages 16-26 and 34-36. Other feature detection techniques may also be alternatively used in the fingerprinting system of the present invention.

The multimedia fingerprinting process 300 continues with step 310 to generate one or more feature descriptors. A rectangular region of interest in the image is computed based on the scale and location of the detected feature. "Global gradient" values, a more general form of gradient values, are computed in the x and y directions over the pixels of the region of interest. The descriptor is computed according to a nonlinear weighting of the global gradient values, producing a result which is accumulated into +x, −x, +y, −y bins, for multiple regions in the region of interest. The end result is an M-dimensional descriptor.

Figure 4:
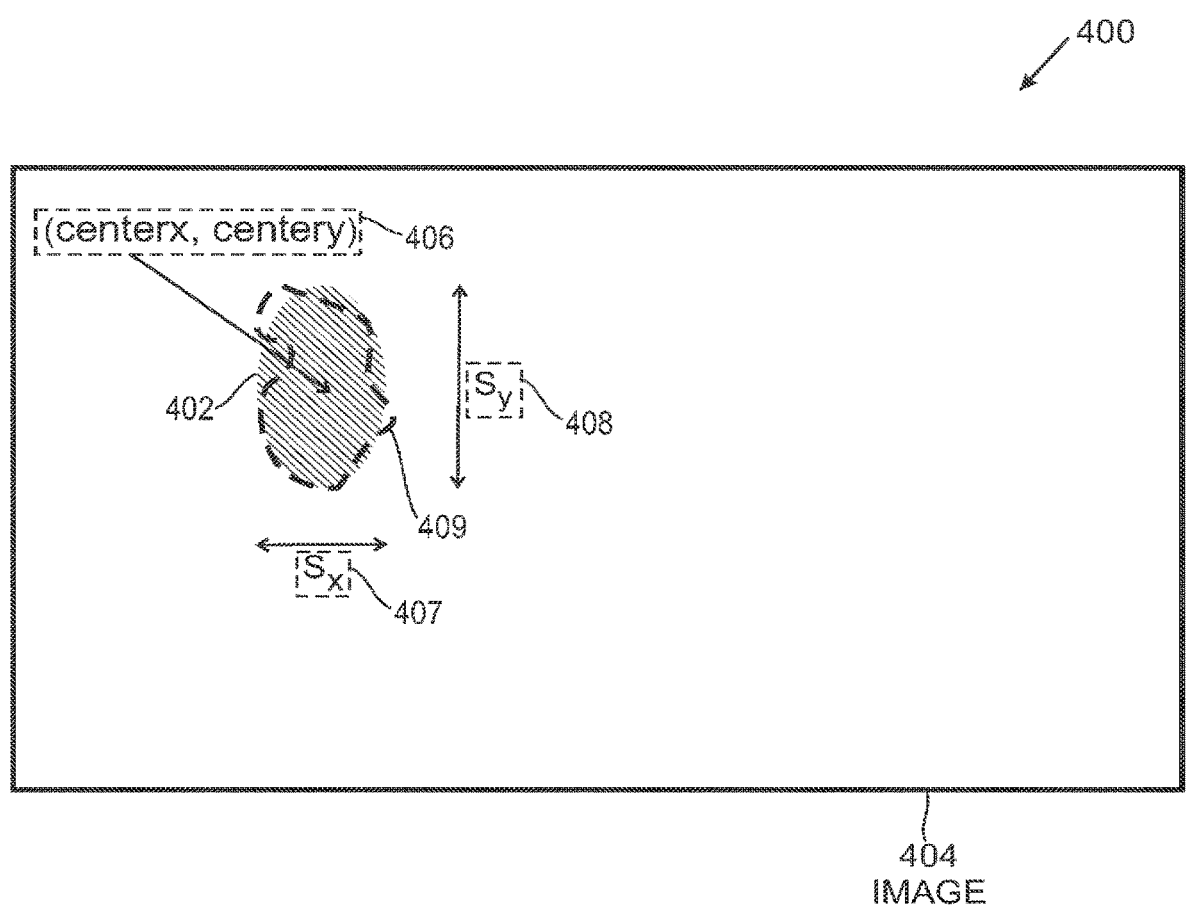
FIG. 4 illustrates a scale-space feature in accordance with the present invention.

An example of a detected scale space feature is shown in FIG. 4. FIG. 4 illustrates a scale-space feature 400 in accordance with the present invention. In FIG. 4, an image feature is represented by dashed outline 409, which could be a contiguous area of near-constant colored pixel that is, for instance, a human face, or part of a picture on a wall. For this image feature, a corresponding image blob 402 is located in an image space 404 by (centerx, centery) coordinates 406 and with a particular $s_x$ 407 and $s_y$ 408 scale reference. A scale-space feature has a few others attributes that describe it relative to the surrounding image pixels. For example, a peak polarity value is a binary value indicating whether a feature is a dark blob on a light background, or a light blob on a dark background. A peak strength value represents a measure of how much a blob stands out from its background. For example, a light gray blob on a dark gray background has a lower peak strength value, as compared to a black blob on a white background which has a higher peak strength value.

Figure 5A:
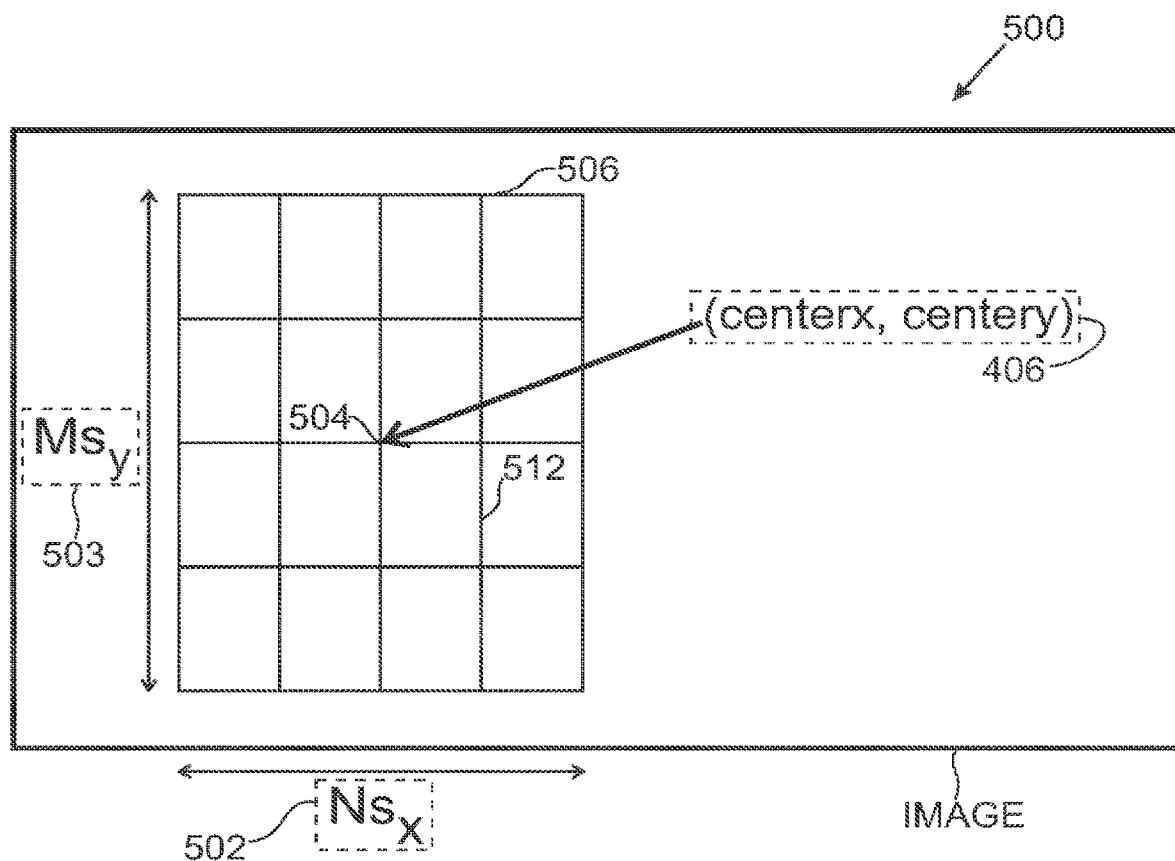
FIG. 5A illustrates an exemplary rectangular descriptor box and coordinates for use in generating a global descriptor in accordance with the present invention.

The step 310 for describing the detected audio and video features includes generating a global descriptor. FIG. 5A illustrates an exemplary rectangular descriptor box and coordinates 500 for use in generating a global descriptor 500 in accordance with the present invention. Other aspects and further details regarding descriptors, such as a phase descriptor, may be found in U.S. application Ser. No. 12/612,729 filed Nov. 5, 2009 entitled "Digital Video Content Fingerprinting Based on Scale Invariant Interest Region Detection with an Array of Anisotropic Filters", FIGS. 9, 10, and 11 and pages 26-28, 38, and 39.

Figure 5B:
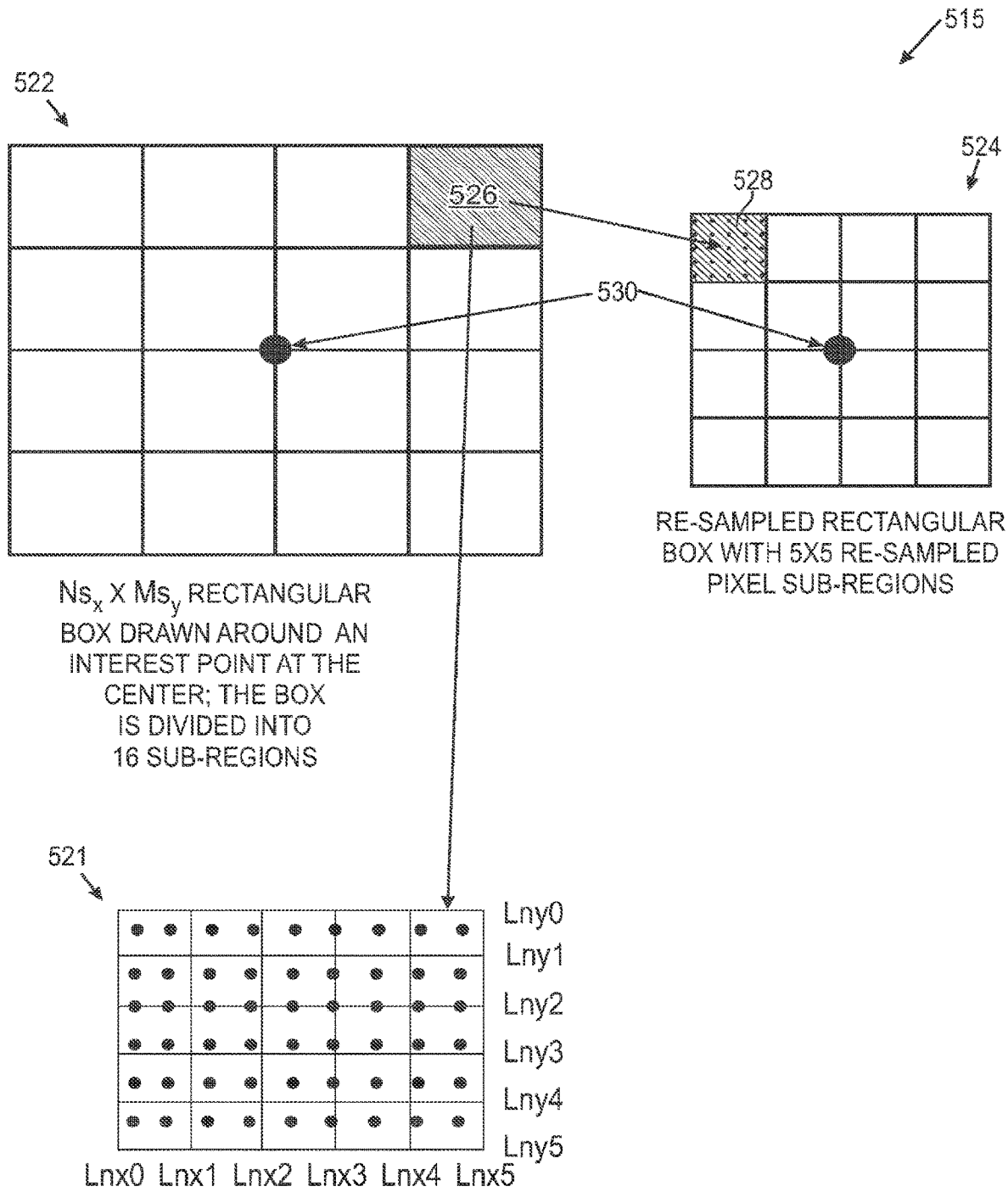
FIG. 5B illustrates an exemplary resampled rectangular descriptor box for use in generating a global descriptor in accordance with an embodiment of the present invention.

The detecting audio and video features step 308 generates four output values which include (centerx, centery) coordinates 406, $s_x$ 407, and $s_y$ 408 which represent the center of an image blob 504 and a spatial extent of the blob. A rectangular box 506 is placed on the image blob with center at the blob (centerx, centery) coordinates 406 and spatial extent ($Ns_x$ 502, $Ms_y$ 503), where N and M are multiplication factors that determines the size of the neighborhood around the blob that the descriptor considers. This rectangular box 506 is subdivided into a Bx by By grid, with, for example, Bx=4 and By=4 providing a 4×4 grid to create Bx*By=16 blocks FIG. 5B illustrates an exemplary resampled rectangular descriptor box 515 for use in generating a global descriptor in accordance with an embodiment of the present invention. In FIG. 5B, an exemplary rectangular descriptor box 522 corresponding to 506 in FIG. 5A, is centered at an interest point 530, with Bx*By=16 sub-regions, where Bx and By both equal 4. In more detail and with specified feature parameters (centerx, centery, $s_x$, $s_y$) a rectangular descriptor box 522 is placed on the image with center at (x, y) interest point 530 and with spatial extent of $Ns_x$, $Ms_y$, where N and M are multiplication factors which determine the size of the neighborhood around the interest point under consideration. The rectangular descriptor box 522 is resampled to generate a resampled grid 524 with (Bx*By)(Rx*Ry), where Rx and Ry equal 5 in this example, pixel regions, such as region 528 for block 526. For each block, such as the block 526, a Rx*Ry pixel grid 521 with associated Rx*Ry re-sampled pixel values in region 528 is computed as follows. First, lines that define the Rx*Ry sub-grid are determined, where these lines are given with sub-pixel accuracy and are not necessarily aligned with the pixel boundaries 521. In the x direction, the lines evenly subdivide the block 521 horizontally and are named Lnx0, Lnx1, . . . , Lnx(Rx). Likewise, in the y direction, the lines evenly subdivide the block 521 vertically and are named Lny0, Lny1, . . . , Lny(Ry). The locations of the pixels contained within rectangle 521 are shown as dots. The pixels contained within each of the Rx*Ry sub-grid areas are combined to produce a resampled pixel. This is done by summing the intensity values and dividing by the number of pixels, within each of the Rx*Ry sub-grid areas, yielding Rx*Ry pixel intensity values. Note that there may be different number of pixels for some or all of the Rx*Ry sub-grid areas. There may also be no pixels in a Rx*Ry sub-grid area, in which case the resampled intensity value is taken as zero.

This Rx*Ry pixel sub-region, computed for each of the Bx*By blocks of the rectangular box drawn around an interest point, is subsequently used to generate a descriptor and, based on this descriptor, a signature for that interest point.

Figure 6:
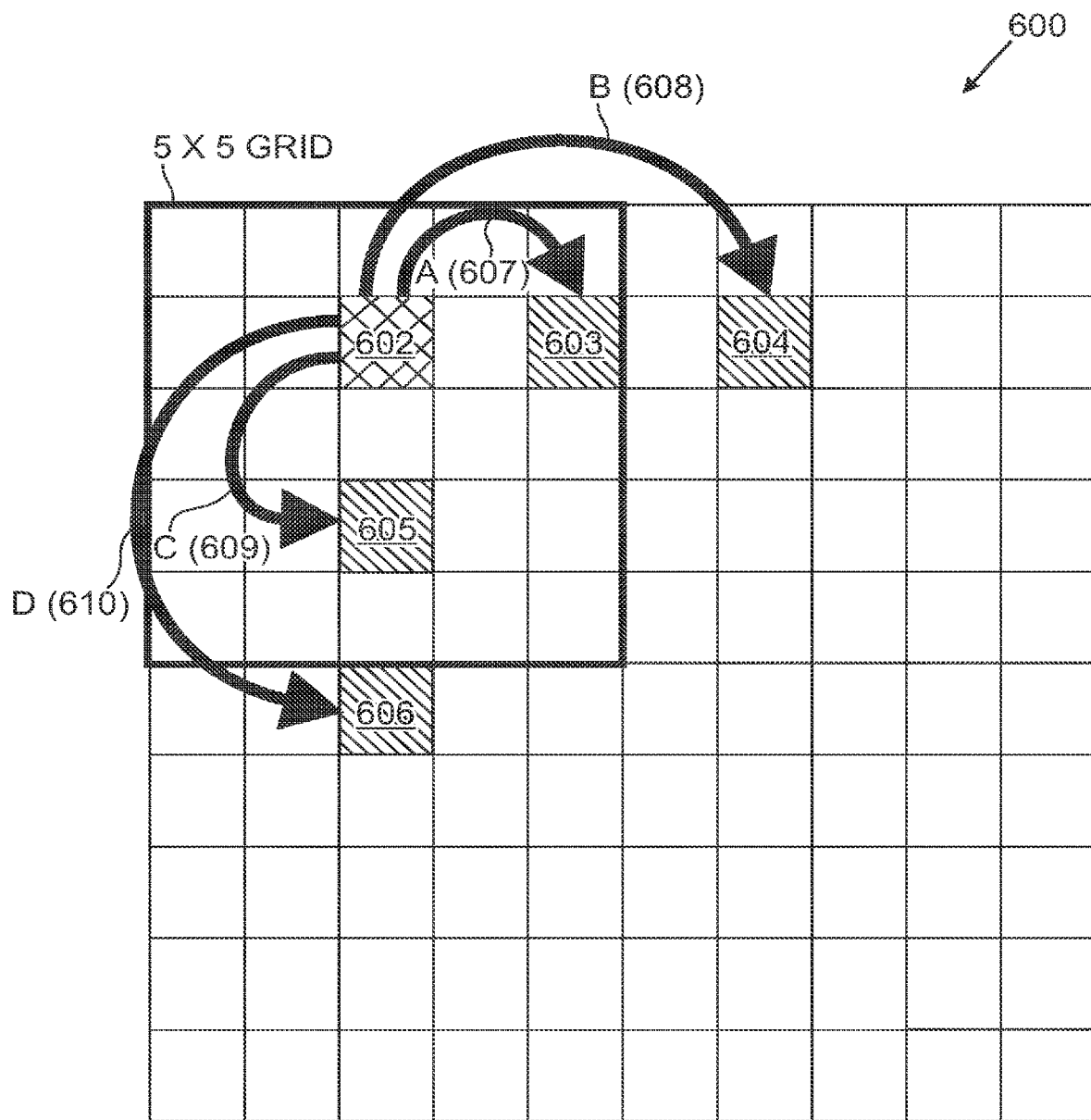
FIG. 6 illustrates aspects of a global descriptor gradient computation process in accordance with the present invention.

FIG. 6 illustrates aspects of a global descriptor gradient computation process 600 in accordance with the present invention. Each Rx*Ry pixel grid that is computed for each of the Bx*By blocks is used to generate 4 values. These values are "global gradient" values computed according to the following procedure. For each pixel in an Rx*Ry grid, the differences from a pixel to several other pixels are computed. FIG. 6 illustrates the pixels on which these differences are taken, for example, from the reference pixel 602, to the target pixels 603, 604, 605 and 606. These target pixels may be chosen arbitrarily. In this example, they have been chosen to be to the right 2 pixels and 4 pixels, as well as down 2 pixels and 4 pixels. Other pixel positions are also possible. Based on these pixels, four difference values are computed, including difference A 607 computed between pixel 603 and pixel 602, difference B 608 computed between pixel 604 and pixel 602, difference C 609 computed between pixel 605 and pixel 602, difference D 610 computed between pixel 606 and pixel 602. Pixels, such as pixels 604 and 606, might not exist in a particular Rx*Ry pixel grid for pixels near to the right or bottom borders, so such pixels will access the appropriate pixel in a neighboring Rx*Ry pixels grid. If a bordering Rx*Ry pixel grid does not exist, an additional block or blocks might need to be computed along the right and bottom borders of the rectangular box 506. This means, for instance, that instead of a Bx by By grid computed, a (Bx+1) by (By+1) grid is computed, with reference pixels within the original Bx by By grid and target pixels potentially accessing the larger (Bx+1) by (By+1) grid.

These difference values are combined into one or more values, using a weighted average of the values. For example, an "x-gradient" is computed as the weighted sum of A and B, $$xgrad = w_1 * A + w_2 * B,$$

and, similarly, a "y-gradient" is computed as the weighted sum of C and D, $$ygrad = w_3 * C + w_4 * D.$$

The weights, $w_1$ to $w_4$, may depend on many factors, but in one embodiment, they depend on an agreement of signs of the difference values A and B, and C and D. For instance, if A and B are of the same sign, then $w_1=1.1$ and $w_2=0.2$, whereas if A and B are of different values, then $w_1=1.2$ and $w_2=0.0$. Different weights can be used for the x and y directions. The weights can also depend on decision factors other than the agreement of signs.

For example, an xgrad value and a ygrad value may be computed for each of the pixels associated with the Rx*Ry pixel grid 521. From this set of values, four sums are computed as global gradient values:

1. −1*sum of xgrad for each pixel, where xgrad is negative
2. sum of xgrad for each pixel, where xgrad is positive
3. −1*sum of ygrad for each pixel, where ygrad is negative
4. sum of ygrad for each pixel, where ygrad is positive In total, a descriptor for the rectangular box 506 consists of 4*Bx*By values that is a concatenation of the 4 "global gradient" values for each of the Bx*By blocks covered by the descriptor. By design, these values are all positive. For example, for global gradient values 1 and 3 in the above list, the sums are of negative values, to produce a negative sum, which is made positive by multiplying by −1 and for global gradient values 2 and 4, the sums are of positive values, producing a positive sum.

Some image distortions may cause the feature detection algorithm to have errors in the detected scale values or location. If the error is large enough, this might result in differences in the descriptor, and subsequently in the signature, that are too large for matching to work correctly. To improve the chances of matching, that is, make the fingerprint more robust with respect to certain image distortions, the following embodiment of generating multiple different descriptors based on the same detected feature may be used. These multiple descriptors may be generated, for example, by perturbing the scale value and/or the location value. For example, the scalex multiplication factor, such as N of FIG. 5A, or the scaley multiplication factor, such as M of FIG. 5A, or both are adjusted to account for an expected error margin of +/−D %, wherein D % represents effects of image distortions.

Figure 7:
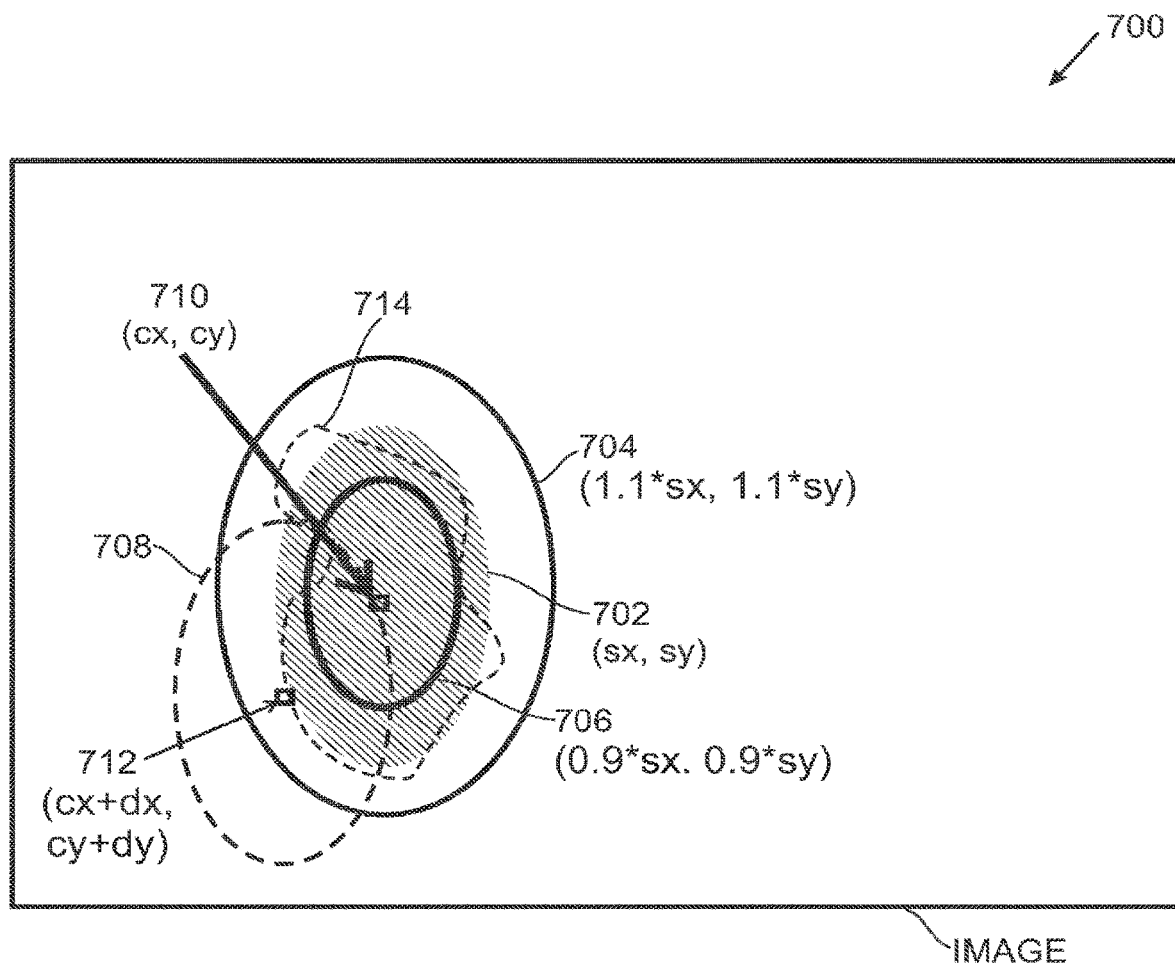
FIG. 7 illustrates multiple robust descriptors in accordance with the present invention.

FIG. 7 shows an image feature 714, which could be a contiguous area of near-constant colored pixel that is, for instance, a human face, or part of a picture on a wall. This is detected as a blob at location (cx,cy) 710 and scale (sx,sy) represented by ellipse 702. These location and scale values are used in the global descriptor generation procedure previously described above. FIG. 7 shows that two additional descriptors may be generated by first multiplying the scale by 0.9 and 1.1 to generate the representative ellipses 706 and 704, respectively. For these two descriptors, the location is kept constant and the scale is perturbed by the 0.9 and 1.1 multipliers. Alternatively, the scale may be kept constant and the location is moved by a delta amount in the x and y directions (dx,dy) to move the representative ellipse 702 to a new center location (cx+dx,cy+dy) 712 with representative ellipse 708. An additional descriptor for the representative ellipse 708 may be generated using this new center location.

In addition, these multiple descriptors can be generated either for reference clips, the reference side, or for query clips, the query side, or both. By increasing the number of descriptors on either the reference side or the query side the chances of detecting a match are improved, as long as the multiple descriptors cover the errors in the feature detection. Using multiple descriptors on both the reference side and query side tends to further improve the chances for matching. While some multimedia content may experience an increase in the number of false matches with use of multiple descriptors, generally the use of multiple descriptors improves the chances of detecting matches. Using multiple descriptors on the reference side increases the size of the reference database, while using multiple descriptors on the query side increases the query fingerprint size. While the use of multiple descriptors on both the reference side and the query side may lower the search speed, detecting matches is generally improved. In one approach, these increases may be compensated through use of parallel processing techniques.

The technique of generating multiple descriptors is applicable to other descriptor generation procedures, in addition to the global descriptor procedure described above. A descriptor generation procedure that takes as input a scale-space feature with a specified location and scale, generating a compact N dimension vector for a rectangular area of pixels, may also be used.

To enable efficient search capabilities, the descriptors are processed to generate a compact representation that is referred to as a signature. These signatures are implemented as bit vectors. In one embodiment, each dimension of an M-dimensional descriptor generates a single bit in an output signature. For example, a 64-bit signature would be generated for a 64-dimensional descriptor. In other embodiments, two or more bits may be used per dimension of the descriptor. A traversal hash signature is generated to facilitate a fast lookup mechanism. In one embodiment, multiple dimensions of the M-dimensional descriptor are combined to generate a single bit in the traversal hash signature. In other embodiments, multiple dimensions of the M-dimensional descriptor are combined to generate multiple bits in the traversal hash signature.

The signature bits are produced by quantizing each dimension of the descriptor independently. First, the descriptor is normalized in some way, such as made into a unit norm. For example, a unit norm vector may be generated by dividing each component of the vector by the square root of the sum of the squares of each component, using a technique commonly referred to as the L2-norm. For a one-bit-per-dimension signature, the value of each dimension of the normalized descriptor is compared against a pre-specified threshold value. The resulting bits in the signature represent whether the descriptor dimension is above (1) or below (0) the threshold. In another embodiment, which may be more efficient, the descriptor is not normalized, but rather the threshold is scaled according to an L2-norm of the descriptor. In yet another embodiment, the threshold may be simply set to an average value of all the components of the descriptor.

Figure 8A:
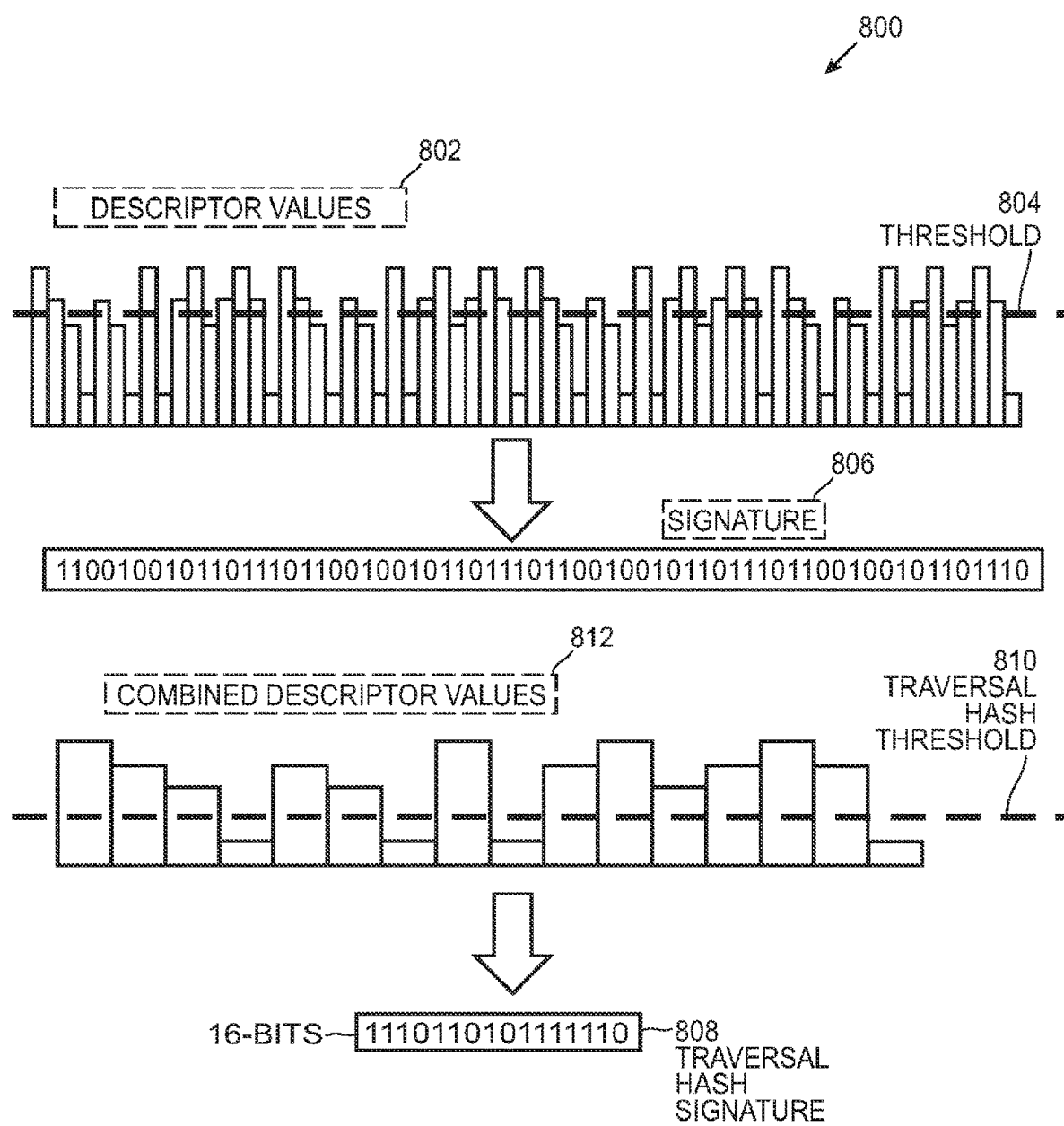
FIG. 8A illustrates an exemplary signature generation process in accordance with the present invention.

FIG. 8A illustrates an exemplary signature generation process 800 in accordance with the present invention. All positive global descriptor values 802 are shown as vertical bars with a threshold 804 shown as a dashed line. The threshold 804 is either set according to prior empirical data or determined by the descriptor values. Descriptor values greater than the threshold 804 produce a '1' and less than or equal to the threshold 804 produce a '0' generating signature 806.

Choosing the threshold 804 may be done empirically. The goal is to generate unique signatures, which are more likely unique when the numbers of ones and zeros are approximately equal. A threshold that is set too high may generate signatures that are mostly zeros, whereas a threshold that is set too low may generate signatures that are mostly ones. The threshold should be chosen so as to avoid either extreme.

In order to facilitate fast search, a mechanism to search over only a small part of the database is required. We enable this by generating a shorter signature, which acts as a direct hash value for the primary signature. This shorter signature is termed a "traversal hash signature" and is associated with a set of signatures that tend to be similar to one another. The traversal hash signature may also be generated at the same time as the primary signature. For example, for a 64-dimensional descriptor, in addition to a 64-bit signature, such as signature 806, an H-bit traversal hash signature 808 may be generated, where H<64. This traversal hash signature 808 may be based on combining the values of various dimensions into a single combined value and then, similar to the signature generation process, thresholding the combined values with a traversal hash threshold 810. For example with H=16, the values of the dimensions in groups of four are combined by either taking the sum of the four values, the average of the four values, or the sum of the square of the four values. For the global descriptor values 802, a meaningful group of four is the four values for a block which when combined produce the combined descriptor values 812. For rectangular blocks, such as the rectangular block 506, there are 16 blocks with each block corresponding to one bit in the traversal hash signature 808.

A traversal hash signature may be augmented with additional bits that relate to an underlying feature, or perhaps to another description of the image data. For an underlying feature, additional bits may be added that identify the spatial location of the underlying feature, the scale of the underlying feature, or the peak polarity of the underlying feature. For example, the spatial location of the underlying feature may be described by two bits representing the quadrant where the center of the underlying feature is located. A quadrant may be indicated by having one bit indicate top or bottom half and the other bit indicate left or right, such that the quadrant is identified with the two bits. The scale of the feature may be quantized to either one or two bits, by setting one or more thresholds.

Figure 8B:
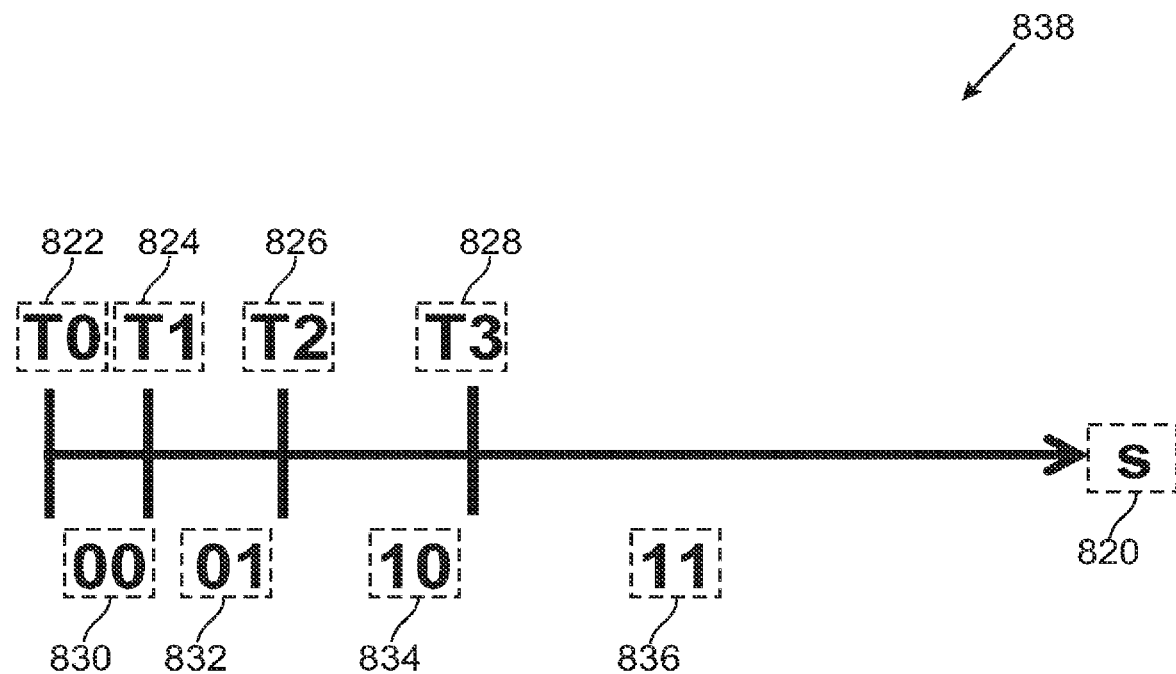
FIG. 8B illustrates a threshold scale used in a procedure to augment a traversal hash signature in accordance with the present invention.

FIG. 8B illustrates a threshold scale 838 used in a procedure to augment a traversal hash signature in accordance with the present invention. From the scale values sx and sy, a normalized scale value s may be computed according to the equation: $s=sqrt(sx*sx+sy*sy)$, represented on the threshold scale 838 as a value on a linear scale s 820. This is evaluated against multiple thresholds. If s is between thresholds T0 822 and T1 824, with threshold T0 822 inclusive, then the scale hash bits are set to "00" 830; if s is between thresholds T1 824 and T2 826, with threshold T1 824 inclusive, then the scale hash bits are set to "01" 832; if s is between thresholds T2 826 and T3 828, with threshold T2 826 inclusive, then the scale hash bits are set to "10" 834; if s is greater than or equal to threshold T3 828, then the scale hash bits are set to "11" 836. The peak polarity of the underlying feature may be indicated by the feature detection algorithm which indicates whether a feature based on a contrast polarity threshold is a light coloring on a dark background or vice-versa using one bit to represent this characteristic.

The additional bits to augment the traversal hash signature may be based on other descriptors of image data or other data, such as texture or motion. For example, an intensity histogram may be derived for the pixel area 506 in FIG. 5A corresponding to the feature. The intensity histogram may be heavily quantized to produce a small number of bits. Another approach would be to use motion analysis to indicate whether a blob is moving from frame to frame. One bit can indicate whether there is motion or not. The approximate direction of motion may also be quantized to a small number of bits.

The overall hash traversal hash signature is a concatenation of the traversal hash signature generated by appropriately combining and thresholding the descriptor, as illustrated in FIG. 8A, with additional bits generated from scale, as illustrated in FIG. 8B, x/y, peak polarity, or the like.

An advantageous feature of the present invention is the ability to select signatures for inclusion in the fingerprint database and eliminate certain signatures that do not improve identification accuracy and lead to false positives. Various criteria, such as the distribution of ones and zeros in the primary signature and the traversal hash signature, are used to determine whether a signature should be included in the database. Good signature selection may reduce the size of the fingerprint database, reduce the false positive rate and improve or maintain the overall accuracy. In a similar manner, the number of signatures produced for a query multimedia clip may be reduced. As described in more detail below, these advantageous features may be achieved by examining both the signatures and descriptors, individually and in aggregate. This examination is based on multiple criteria, such as descriptor information, signature information, temporal robustness, and spatial diversity.

Figure 8C:
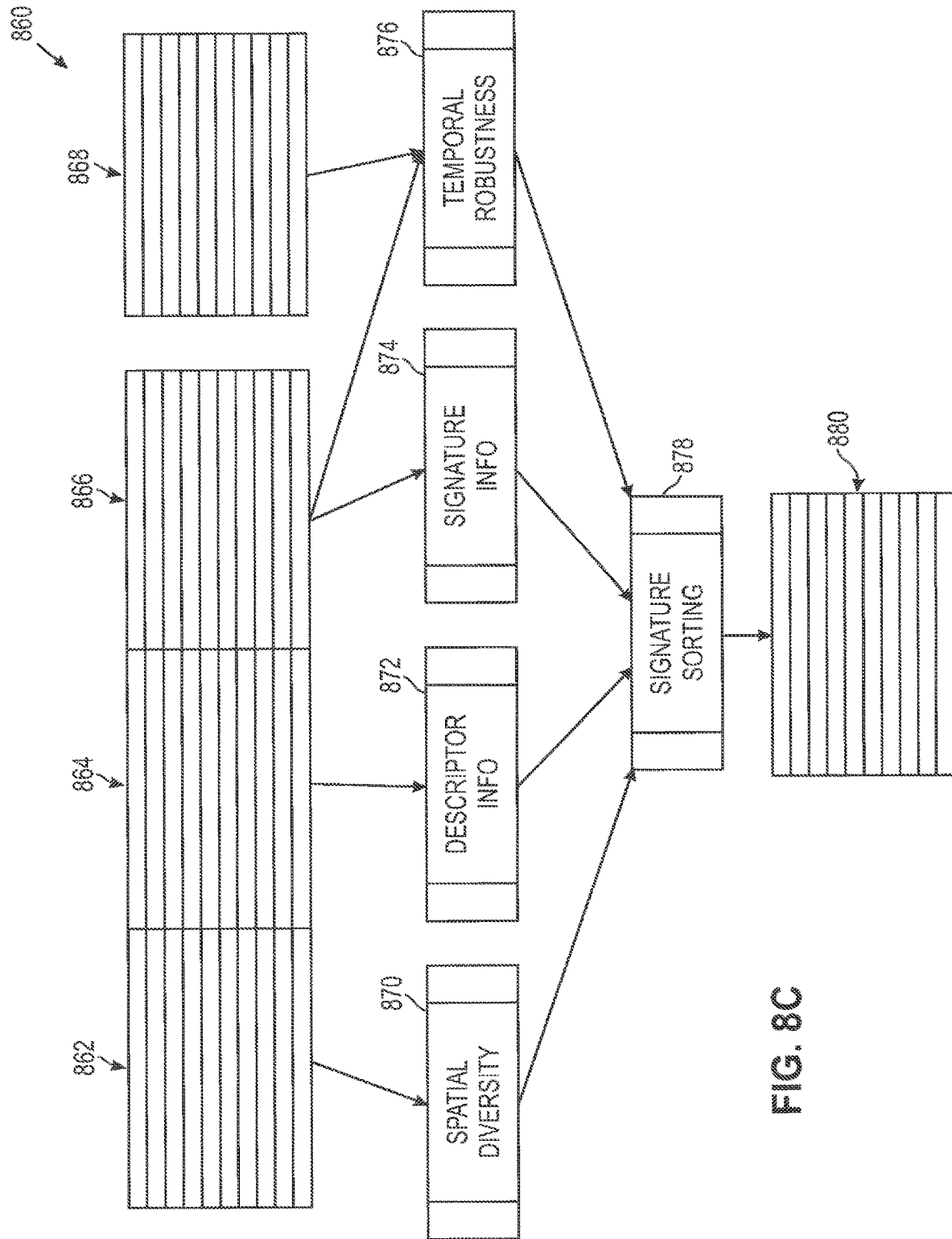
FIG. 8C illustrates a signature selection procedure which selects signatures for a particular frame of video in accordance with the present invention.

FIG. 8C illustrates a signature selection procedure 860 which selects signatures for a particular frame of video in accordance with the present invention. The inputs for a frame of video are a set of signatures and associated traversal hash signatures 866, a set of descriptors 864 associated with the set of signatures 866 for the frame, a set of scalex, scaley, centerx, centery values 862 associated with the set of signatures 866; and sets of signatures and associated traversal hash signatures 868 for a previous frame. For each signature in the set 866, there is a corresponding descriptor in the set 864 from which the signature is derived, as well as a corresponding set of scale and location values in the set 862, from which the descriptor is derived. The sets of signatures 868 do not necessarily have any correspondence to the signatures in the set 866. Various computations described below are performed based on the inputs above.

For each descriptor in the set 864, descriptor information 872 is computed. The descriptor information 872 is associated with the corresponding signature. Descriptor information may include a sum of the descriptor values after normalization to unit norm. Descriptors that tend to produce false positives have energy concentrated in only a few dimensions and hence have a lower "descriptor information" value. As an example, this tends to happen, for instance, where a descriptor pixel region of interest contains a bright blob on a dark background of constant intensity. Such regions of interest can be confused with other regions with similar characteristics and lead to false matches. These regions of interest lead to descriptors with energy concentrated in a few dimensions, with those dimensions corresponding to the blob center.

For each primary signature in the set 866, signature information 874 is computed. The signature information 874 is associated with the corresponding signature. Signature information may include a count of the number of 1's in a signature. Signatures that tend to produce false positives have only a few bits turned on and hence have lower "signature information" value. This tends to happen for the same reasons as the descriptor. While "signature information" and "descriptor information" are related, their thresholds can be picked independently to provide more flexibility.

Figure 8D:
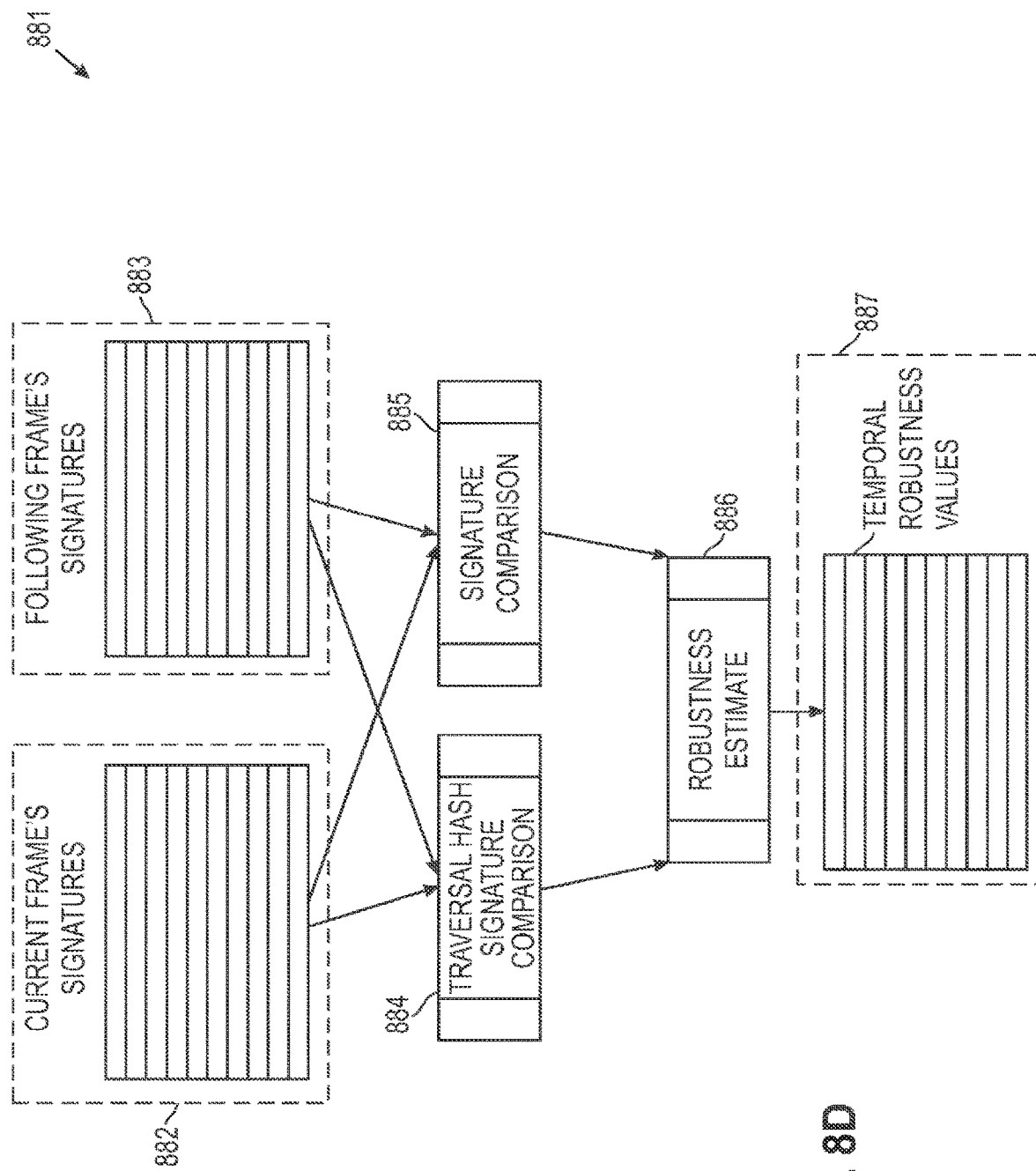
FIG. 8D illustrates a procedure to generate the temporal robustness estimate in accordance with the present invention.

For each signature in the set 866, a temporal robustness value 876 is computed, using the sets of signatures 868. The computed temporal robustness value 876 is associated with the corresponding signature in the set 866. Temporal robustness may include a measure of whether a feature appears in a following frame. The frame lag between a frame under consideration and the following frame may be one frame, the immediately following frame, or more than one frame. An estimate is generated to indicate whether a feature appears in a following frame based solely on the signature and traversal hash signature. FIG. 8D illustrates a procedure 881 to generate the temporal robustness estimate in accordance with the present invention. A set of signatures and traversal hash signatures for the current frame 882, is compared against all signatures and traversal hash signatures from following frame 883 by computing the bit distance between the respective signatures in traversal hash signature comparison computation 884 and the bit distance between the respective signatures in signature comparison computation 885. The bit distances are computed for each signature in 882, and the bit distances are compared against a robustness estimate threshold computation 886 to produces a set of temporal robustness values 887, one value corresponding to each signature in 882. Specifically, a signature is considered "temporally robust" if there exists at least one pair of signature and traversal hash signature found in the traversal hash signature comparison computation 884 and in the signature comparison computation 885 with a signature bit distance ≤R and a traversal signature bit distance ≤Q. The values R and Q are integer-valued parameters that can be specified. In one embodiment, a temporal robustness value is either 0 or 1, based on whether the signature is "temporally robust".

For each feature scale and location value in the set 862 in FIG. 8C, a spatial diversity value 870 is computed by comparing its own value against the entire list of feature scale and location values in the set 862. The computed spatial diversity value 870 is associated with the corresponding signature. Spatial diversity may include a measure of whether a feature is located close to other features. For example, the distance between any pair of feature locations can be computed for the set 862, and used to compute the average distance between a feature center location and the M near features' center locations, where M may be pre-specified. This average distance, or "closeness" indicates the density of features in terms of location. Ideally, the features would be spread out and those features that are concentrated too close together would be penalized. By incorporating this "closeness" criterion, features that are spread out are preferred, according to a procedure described in more detail below.

Each signature in the set 866 is now associated with the results of the computations in blocks 870, 872, 874, and 876. The results are input to the signature sorting and selection block 878. Signatures that fail to meet some minimum level of criteria are eliminated. For descriptor information, a minimum threshold may be used. Likewise, for signature information, another minimum threshold may be used. For temporal robustness, Q and R bit distance parameters may be set, and signatures that are not considered temporally robust according to this criterion are eliminated. Similarly, for spatial diversity, a threshold can be established for "closeness", and signatures that are too close based on this threshold are eliminated.

Signatures may also be sorted, for example, according to the descriptor information, the signature information and the spatial diversity, descending, in that order. The sorting provides a list of signatures in approximate order of strength. Then, all but the T top signatures are eliminated, where T is a parameter that can be pre-specified. The result is a set of signatures 880 that satisfy the minimum criteria and/or are the top T signature according to some criteria.

The selected signatures including the signature and traversal hash signature pairs are stored along with associated metadata such as multimedia id, playout timestamp, and scale, and x and y location values to create a signature record that is inserted into the reference signature database. The signature database consists of the set of all signature records for all corresponding reference multimedia along with two indices that are used for different types of access of the signature records. These indices are a hash signature index and an index based on the multimedia id and playout timestamp. There may be a single set of signature records pointed to by both indices, or two sets of signature records, with identical data, for example, one for each index.

Figure 9A:
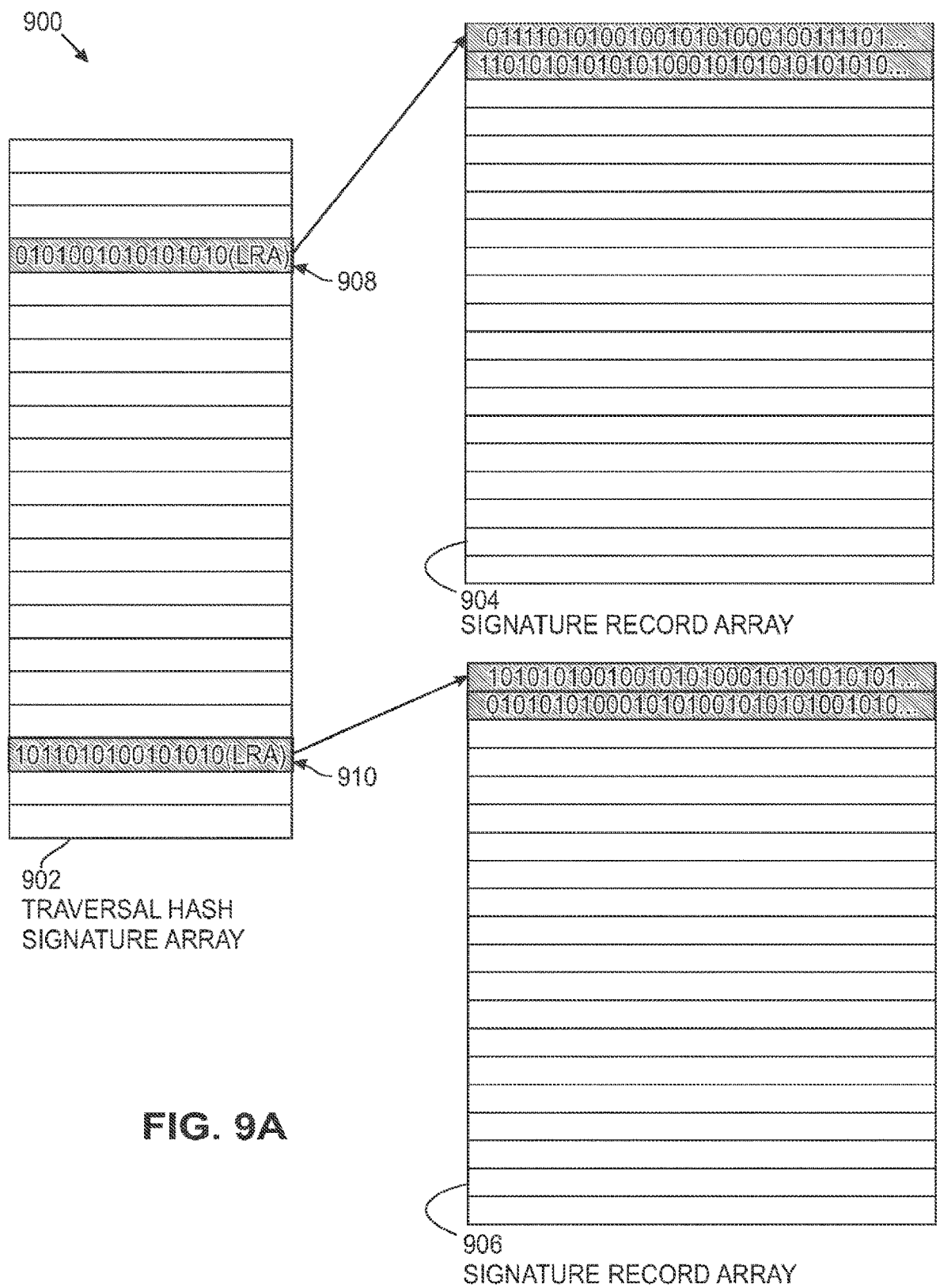
FIG. 9A illustrates an exemplary signature database organized by a primary hash signature index in accordance with the present invention.

FIG. 9A illustrates an exemplary signature database 900 organized by a primary hash signature index in accordance with the present invention. The signature records for all the multimedia content that is to be put into the database is collected together and grouped by the traversal hash signature. At this stage of processing, the number of signatures that belong to particular traversal hash signature is known so the memory for the signature records can be allocated and signature records may be stored in memory. It is advantageous for search operations that the signature records for a particular traversal hash signature be stored contiguously. The set of signatures belonging to a traversal hash signature is called a cluster. For example, 100 signatures and corresponding traversal hash signatures may be generated having 50 signatures with a traversal hash signature A, 30 signatures with a traversal hash signature B and 20 signatures with a traversal hash signature C. Thus, the 100 signatures are organized into three clusters, cluster A with 50 signatures, cluster B with 30 signatures and cluster C with 20 signatures, that are stored in memory.

For each traversal hash signature, the number of signatures and a pointer to the location where the corresponding signature records begin is stored for processing. Since the space of traversal hash signatures may be relatively small, for example, a 16-bit traversal hash signature implies a maximum 65,536 entries, all possible traversal hash signatures can be indexed in an array. A traversal hash signature array 902 is shown in FIG. 9A storing one element for each possible traversal hash signature. The index into the traversal hash signature array 902 is the integer interpretation of the traversal hash signature as a binary number. Thus, given a traversal hash signature, direct addressing into the array retrieves the number of matching signatures and where corresponding signature records are located, such as a link reference to a list of signature records 904 or 906. In FIG. 9A, for example, traversal hash signature "0101001010101010" is located at entry 908, which links to the array of signature records 904, and traversal hash signature "1011010100101010" is located at entry 910, which links to the array of signature records 906. Each entry in traversal hash signature array 902, such as entries 908 and 910, have an additional field included in the entry that stores the link reference address (LRA) to a signature record array, such as signature record arrays 904 and 906.

Figure 9B:
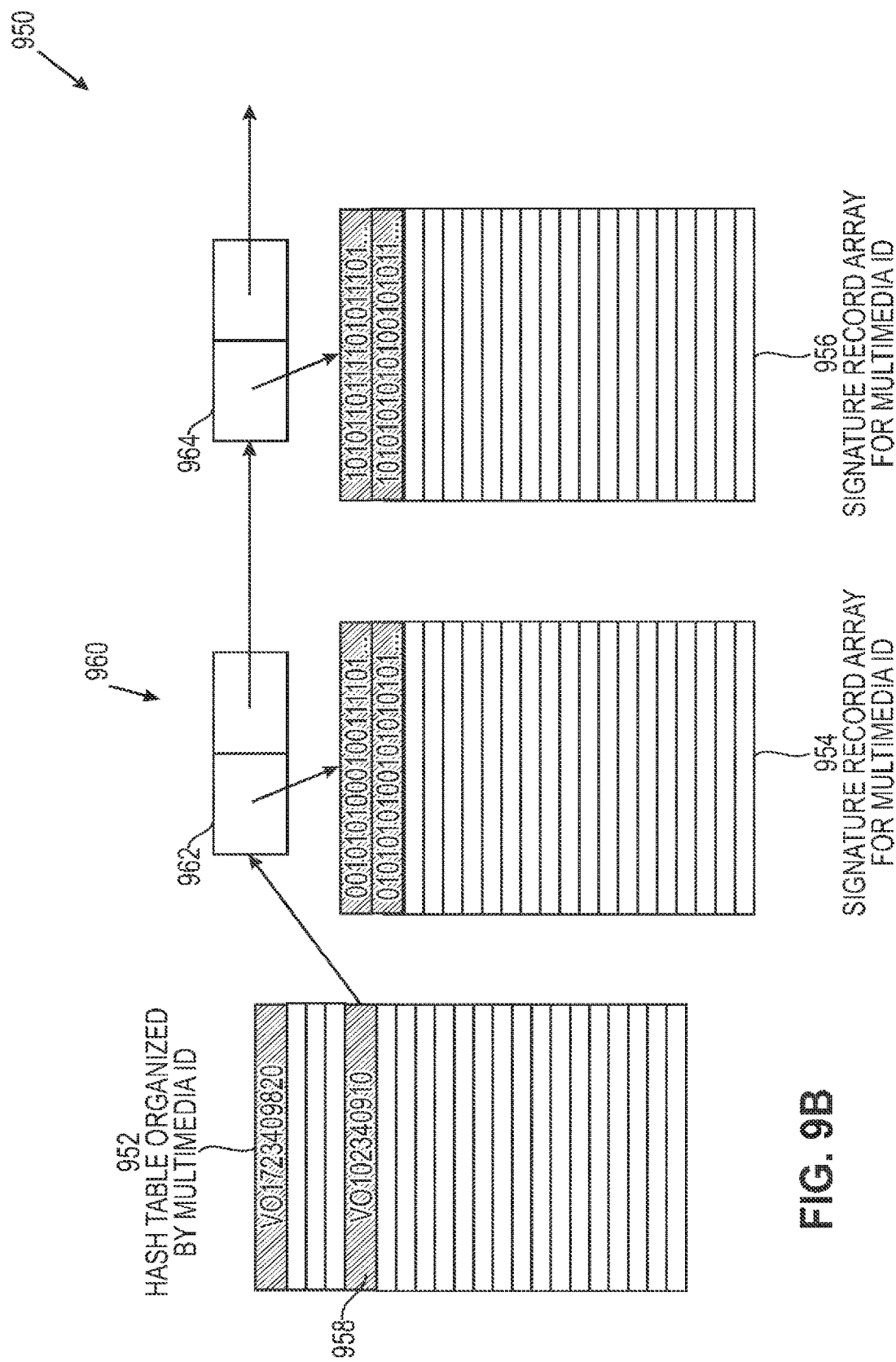
FIG. 9B illustrates an exemplary signature database organized by secondary index in accordance with the present invention.

FIG. 9B illustrates an exemplary signature database 950 organized by secondary index in accordance with the present invention. The secondary index supports accesses of the signature records corresponding to a multimedia id, from a starting playout time to an ending playout time. The secondary index is useful for the signature correlation process, discussed in more detail below. The secondary index is based on a hash table 952 organized by multimedia id. For example, a hash table entry 958 corresponding to multimedia id "vo102340910" points to a linked list 960. Each entry in the linked list, for example, 962 and 964, points to an array of signature records, for example, 954 and 956. The signature records are stored in playout timestamp order within each array, and the linked list is organized with arrays in playout timestamp order. Alternatively, instead of 954 and 956 representing an array of signature records, they may represent an array of pointers to signature records, already stored according to the primary index. Hence, the secondary index does not store the signature records again, but rather points to the signature records of the first index. This is the case where both indices shared a common set of signature records, as mentioned above. Such an alternative approach can be more space efficient, but may be slower to access due to signatures that are randomly distributed relative to the second index.

The secondary index allows for searches such as 'all reference signatures for multimedia id "vo102340910" between time period 817000 milliseconds and 1048500 milliseconds'. In this case, the entry 958 corresponding to "vo102340910" is first accessed, retrieving the linked list 960, starting with the linked list entry 962. The array of signatures 954 can be examined as to whether the time period 817000 to 1048500 milliseconds is contained. Any matching signatures are returned. The subsequent entries on the linked list, for instance 964, are processed, until there are no more entries, to ensure that all matching signatures within the time period are retrieved. This search can be made faster by keeping the starting and end timestamp of an array of signatures within the corresponding linked list entry itself, so that the signatures themselves do not need to be accessed unnecessarily. Also, the requested signature record for the desired starting timestamp is found by binary search through the array. From there, signature records in the array are processed linearly until the desired ending timestamp is reached.

The video database structure may be stored either in the local computer's main memory (its RAM) or on a hard disk drive. One embodiment is to store the signature database in main memory as access speeds are significantly faster. The trade-off is the smaller capacity of main memory versus the hard drive.

A query multimedia clip is processed to generate signatures as described above and using the process of similarity search against a reference database, the most likely candidate clips may be identified. The beginning step in a similarity search is to find all near-matching signature records in the video database for a query multimedia clip. The similarity search process begins with generating signature and traversal hash signature pairs for the query multimedia clip. A playout timestamp is also associated with each signature and traversal hash signature pair. The traversal hash signature is used to dramatically speed up this portion of the search. The result of this initial search is a list of matching signatures and their associated metadata called the candidate list. In a following step, the number of times a multimedia clip appears in the candidate list is counted to generate a frequency list of multimedia clip identifications (ids), which is then sorted from most frequent to least frequent. The most frequent clip ids on this list are the likely matching multimedia clips. In a correlation step, the top matching multimedia clips are analyzed to find the closest matching clip. In the correlation step, signatures of the top matching clips are used instead of matching traversal hash signatures, and a score is computed based on the amount of signature bit error. This score is compared against prespecified thresholds to decide whether the corresponding multimedia clip is a good match to the query clip. Thus, one or more closest matching multimedia clips from the reference database may be chosen for presentation as a result of the search.

Figure 10:
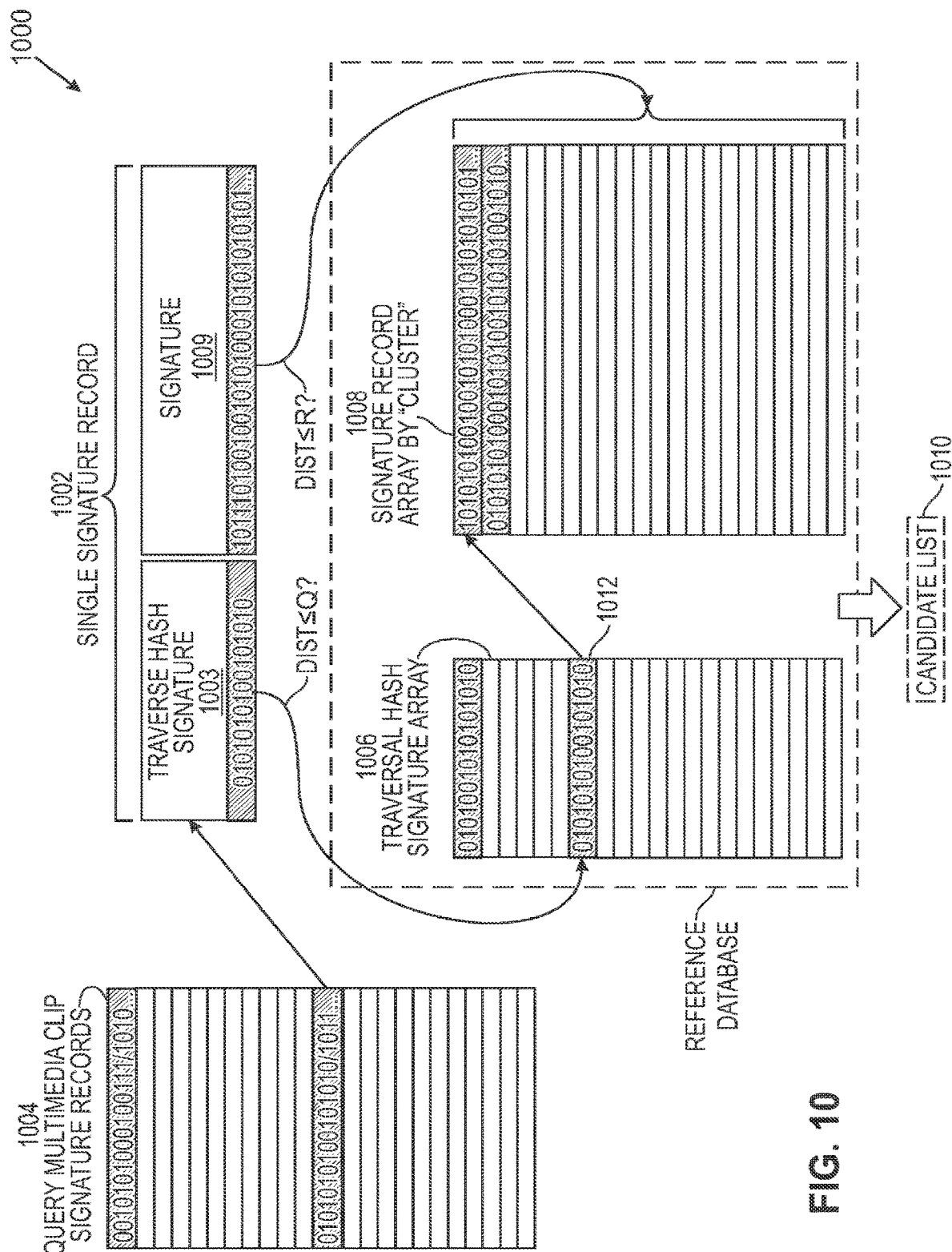
FIG. 10 illustrates an exemplary similarity search process in accordance with the present invention.

FIG. 10 illustrates an exemplary similarity search process 1000 in accordance with the present invention. For each signature and traversal hash signature pair 1002 in a list of query signatures 1004, a similarity search is performed given the parameters of signature distance R and traversal hash signature distance Q. A traversal hash signature distance of Q=0 means that only an exact match of the traversal hash signature is allowed, thus only a single cluster needs to be searched, which is one of the embodiments of the present invention. A traversal hash signature distance of Q=1 means that traversal hash signatures which are a maximum of 1 bit distance from the specified traversal hash signature are searched. For an K-bit hash signature, this would mean that a total of K+1 clusters need to be searched including the original cluster, as well as the K clusters that correspond to exactly one of the bits flipped and all other bits unchanged. The number of clusters needed to be searched increases exponentially with Q.

In the case of Q=0, the traversal hash signature "0101010100101010" 1003 in the signature and traversal hash signature pair 1002 obtained from the list of query signatures 1004 is used to look up entry 1012 in the traversal hash signature array 1006 and obtain a set of corresponding signature records 1008. This set contains the potentially matching signatures with the same traversal hash signature. The query signature 1009, shown as 31 bits of a 64 bit query signature "1011101001001010100010101010101 . . . " in the pair 1002 is now compared with each signature in the set 1008. Specifically, the distance between the query signature and each signature in the set to be compared, is computed. This computation may be made more efficient by using bit operands and a bit-count lookup table. The Hamming or bit distance between two 64-bit numbers can be computed by performing an XOR on the two numbers and then count the number of 1's in the result. The counting step may be implemented with a lookup table that maps an 8-bit or 16-bit number to the number of 1's contained. The number of one's in the result of the XOR is then the sum of the lookup table results for all of the 8-bit or 16-bit chunks contained in that XOR result. If the distance computed is less than or equal to the specified signature distance R, then this signature record is inserted into a candidate list 1010.

An entry in the candidate list 1010 consists of a query clip timestamp, a matching database clip multimedia id, a matching database clip timestamp, and a signature bit distance. For each signature and traversal hash signature pair, several entries may be added to the candidate list 1010. Similarity search is repeated for each signature and traversal hash signature pair 1002 in the list of query signature records 1004 corresponding to the query multimedia clip. Depending on the length of the query clip, the candidate list 1010 may have hundreds or thousands of entries.

Figure 11:
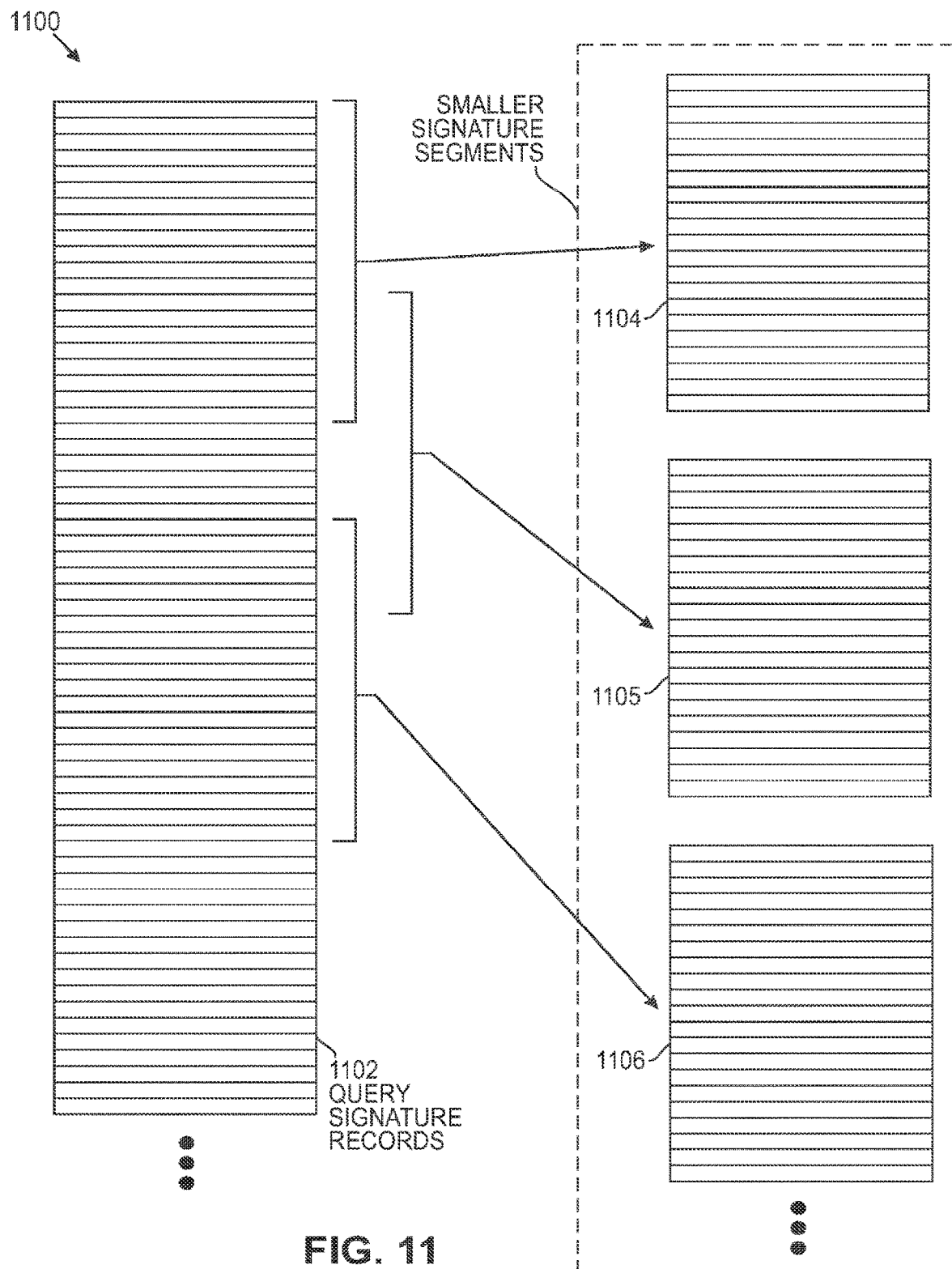
FIG. 11 illustrates a query multimedia clip partitioned into smaller segments in accordance with the present invention.

FIG. 11 illustrates a query multimedia clip partitioned into smaller segments 1100 in accordance with the present invention. The query multimedia clip 1102 may additionally be broken into smaller overlapping segments 1104-1106, and similarity search and a top matches and correlation procedure performed on the smaller segments. This partitioning allows more time granularity in the multimedia clip identification, as well as greater accuracy in identifying matching multimedia clips. In one embodiment, the entire query multimedia clip is broken into small clip segments that overlap by as much as 50% with the neighboring clip segments.

Figure 12:
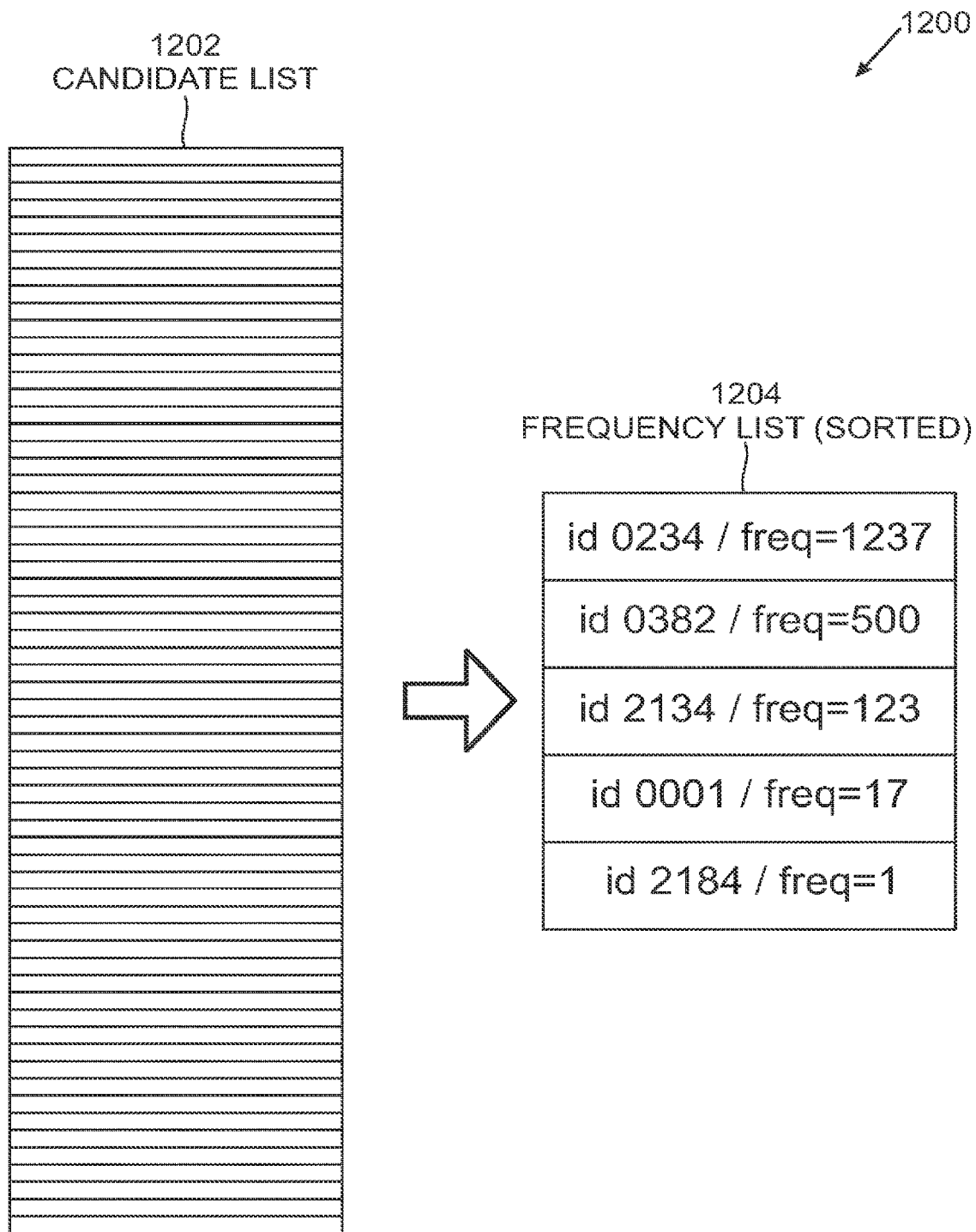
FIG. 12 illustrates an exemplary listing of top matches in accordance with the present invention.

FIG. 12 illustrates an exemplary listing of top matches 1200 in accordance with the present invention. The candidate list 1202 that corresponds to a query multimedia clip, or some small segment of it, may be processed to produce the most likely matching multimedia clips. In a first step, the number of times a database multimedia clip appears in the candidate list is counted, to generate a frequency list of multimedia clip id's and the frequency of that clip's appearance in the candidate list. In a second step, the frequency list is then sorted in descending order of frequency to generate a sorted frequency list 1204 representing the top matches.

For application scenarios that require low computational burden, for instance where a search needs to be extremely fast, or where the query clips are known to have little or no image distortion, due to the nature of the application, the correlation step can be omitted. In this case, the most frequent database multimedia clip, which would be represented by the first multimedia clip id in the sorted frequency list 1204, may be simply output as the identity of the unknown query clip. Alternatively, for other scenarios, by taking the top V most frequent multimedia clips, the first V multimedia clip id's in the sorted frequency list 1204, the candidate list has been focused in on the most likely matches. Next, signature correlation processing is used to eliminate potential false matches and ensure, with greater accuracy, that a correct matching multimedia clip has been found.

Figure 13:
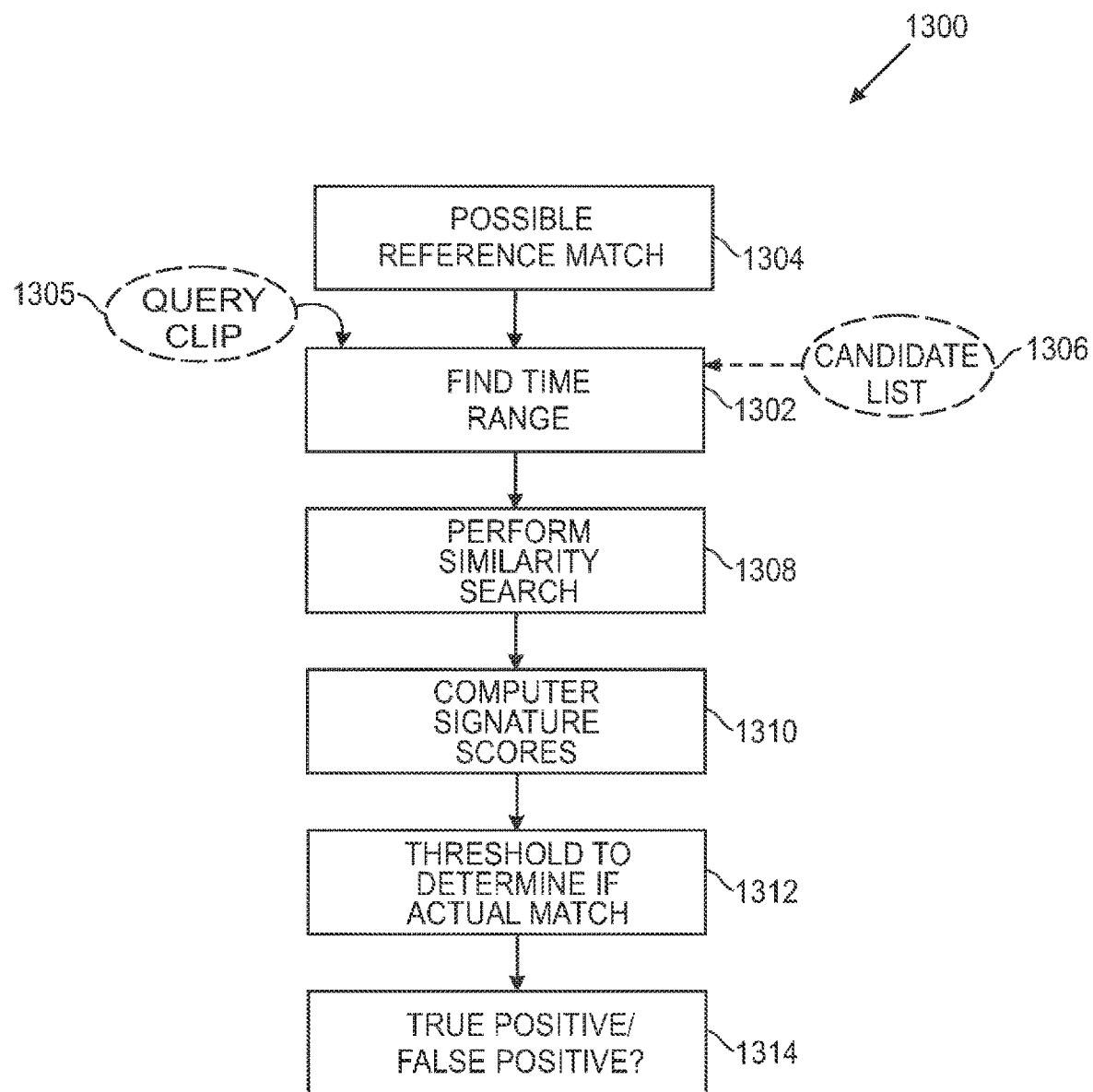
FIG. 13 illustrates a signature correlation process in accordance with the present invention.

FIG. 13 illustrates a signature correlation process 1300 in accordance with the present invention. Further information regarding a procedure for using signature correlation to eliminate false positives and get time-accurate matches may be found in U.S. Provisional Application Ser. No. 61/181, 806 filed on May 28, 2009 entitled "Multi-Media Content Identification Using Multi-Level Content Signature Correlation and Fast Similarity Search", FIGS. 1A, 2A, 2B, 2C, 3A, 3B, 4-6, pages 11-26. The signal correlation process 1300, in the context of a signature database, is described next. One of the goals of the signature correlation process 1300 is to verify that the signatures of a potentially matching reference multimedia clip 1304 do indeed correspond with the signatures of the query multimedia clip 1305.

In a first step 1302, a time range of the potentially matching reference multimedia clip is determined from the reference database. For example, if the potentially matching reference multimedia clip in the reference database is subdivided into smaller clips, then an approximate time range may be determined. Otherwise, and potentially in addition, the matching time range can be inferred from the candidate list 1306 by analyzing a correspondence in time between the database clip and the query clip, using a Hough transform.

In a second step 1308, with a matching time range and the associated database clip, corresponding signatures are accessed from the signature database using the secondary index as illustrated in FIG. 9B. Generally, the corresponding signatures are a small set of signatures. Since only the matching time range is accessed, the size of the set of signatures remains small, even as the size of the database grows, allowing the correlation step to scale with the database size. The signatures for the matching time range of the reference are now compared with the query signatures. For each query signature, a similarity search is performed, with a specified signature distance, within this small set of signatures from the reference database. This step is used to determine the bit distance from each query signature to each reference signature, and is used in the next step to determine scores.

In a third step 1310, for each query signature, a score is derived based on the distances to the closest signatures in the reference database signature subset, and the number of matches. For instance, the score assigned to a query signature may be the minimum bit distance to all the signatures in the reference signature set, with a particular maximum allowable value. The score for each query signature may be averaged for the entire set of query signatures to give an overall score for the particular reference clip match. According to the steps above, a low score implies low bit distance between the query and reference, and hence a good match.

In a fourth step 1312, the overall score is subjected to a threshold test which determines whether the database clip is considered a match 1314. This threshold must be appropriately selected, based on application requirements, to tradeoff between a high match rate and a low false positive rate.

Feature Detection and Signature Generation A keypoint is selected using feature detection methods such as difference of Gaussian (DoG) method or the Hessian-Laplace method which are known methods used in image processing. Advanced feature detection algorithms such as or affine Hessian-Laplace method or fully Gaussian sampled Hessian-Laplace method can be used for feature detection. Alternatively, other corner or keypoint detection algorithms, features detection using segmentation, or motion segmentation may also be used.

The basic concepts of feature detection are described in Lindeberg: "Scale-space for discrete signals", *IEEE Transactions of Pattern Analysis and Machine Intelligence,* 12(3), 234-254, 1990.

In another embodiment, the signature generation process is as follows:
a) generating signature information in the selected region of interest by a weighted combination of various features detected in each region;
b) the features detected in each region can include the following:
 i. intensity gradient,
 ii. phase correlation between pixels or sub-sections,
 iii. good continuation of contours,
 iv. texture classification,
 v. color similarity, and
 vi. second order gradient;
c) obtain the first and second order coefficients to create a weight for each feature that achieves optimal recall or another quality of metric such as product of recall and inverse precision; and
alternately, if the features provide better recall or quality of metric (recall times inverse precision) when they are used separately rather than combined in a single output, multiple signatures need to be created for the selected features or set of combined features.

In another embodiment, a multi-dimensional compact signature is generated by the following steps:

a. for a region of interest, a new image is created that sums up the features extracted at each pixel and a calculated pixel value is generated;
b. the same region of interest is divided into sectors;
c. the features for each region are evaluated in the following ways:
   i) by a calculated sum of features in a sector,
   ii) by a calculated sum of energies in the x and y direction,
   iii) by a calculated gradient of energies in the x and y directions.

In another embodiment, the signature generation process is as follows:
a) for a region of interest, a weighted sum of each feature at a pixel is used to generate an output pixel; and
b) weights for each feature are computed based on the most optimal solution. The metric for the most optimal solution is based on the product of recall and inverse precision.

Some experiments with various features characteristics are described in "Learning a Classification Model for Segmentation", (2003) by Xiaofeng Ren And, Xiaofeng Ren, Jitendra Malik In Proc. 9th Int. Conf. Computer Vision.

In another embodiment the traversal index is generated using the signatures in above methods.

In another embodiment the traversal index combines bits generated from a set of weighted feature outputted pixel region images.

In another embodiment, each of the leaf nodes 110 in FIG. 1A having the associated data and indexes could also include texture information or object location and size information. From among these multiple candidates, one or more of these local objects or area-based shape signatures are selected when a signature term frequency (STF), as described in further detail below with regard to FIG. 4, and FIG. 9 for the particular global signature is large indicating that the signature is not very unique.

Hash Index Generation

A hash is computed from various features of a detailed signature of the information within a region of interest. One embodiment would divide a region of interest into sixteen sectors. Energy associated with each sector are added together providing a total energy for the sector. The total energy of the sector is compared to a threshold value to generate a hash bit value for the sector. With sixteen sectors, a sixteen bit hash value is created. Other features associated with each sector may also be used to generate additional bits for the hash value. Various combinations of hash bits may also be used. A robust hash is defined by a selection of the information and threshold utilized such that the calculated hash value is more immune to noise and disturbances due to distortion in a query video as compared to the original video.

Alternatively, for a selected interest region s divided into n sectors, an n+m bit hash value is created. Useful and practical values of n are 8, 16, 32. Other features associated with the interest regions are used to generate additional m bits for the hash value. Various combinations of hash bits may also be used. A robust hash is defined by a selection of the information and threshold utilized such that the calculated hash value is more immune to noise and disturbances due to distortion in a query video as compared to the original video.

Database Processing

The signature term frequency (STF) in the given document is simply the number of times a given term appears in a given selection and distance is less than a limit. The inverse document signature frequency (IDSF) is a measure of the general importance of the term (obtained by dividing the number of all documents by the number of documents containing the term, and then taking the logarithm of that quotient).

Database Organization and Search

One embodiment of the invention addresses a method of organization of a video or object or multimedia database using a compact hash of multi-dimensional vector signature as a traversal index for each of the signatures generated for the object or video or multi-media source. A robust hash is generated as a traversal index from multiple parameters extracted from a region of interest or keypoint in a frame or from a frame of a video sequence; along with bits generated from global information about the frame such as intensity histogram, or color histogram; and the size or scale of detected keypoint and location of detected keypoint. Multiple associated data or signatures are stored at a leaf node.

In another embodiment, the associated data may include view angle, latitude, longitude and altitude of geographical keypoint.

Similarity Search and Signature Correlation

Another embodiment of the invention addresses a method to post process signatures and associated data between a video sequence of interest or an object region associated with a query object or a video sequence to increase accuracy and confidence of a video sequence match. The distance between the signatures of the query and original video features including a region around a keypoint, or an object or a frame is calculated. Information content in signatures are is evaluated and then used for correlation between a query and a database entry for a matching frame, object, or structure to provide a factor in the sequence correlation score. A sequence correlation in time is provided using differences in frame numbers between pairs of matching query and original video signatures and multiplying with the information content (uniqueness) and matching score.

Sequence Correlation Using Spatial Data

In another embodiment the distance between the signatures of the query and original video features including a region around a keypoint, or an object or a frame is calculated. Information content in signatures are is evaluated and then used for correlation between a query and a database entry for a matching frame, object, or structure to provide a factor in the sequence correlation score. A geometric correlation is performed while using information content and spatial correlation between pairs of matching query and original video signatures.

Correlation Using Frame or Image View Data

Another embodiment of the invention addresses a method of generating a likelihood score for a pair of query frames or regions and correlating between matching frames of a query video and an original video. A correlation score is generated based on an individual frame similarity score. A time correlation is generated using relative differences in frame numbers of the original video and the query video. A correlation between the original video and the query video is generated by using a change in signatures of each sequence of frames in the query video and in the original video, wherein the original video is an entry in a video database.

Figure 14A:
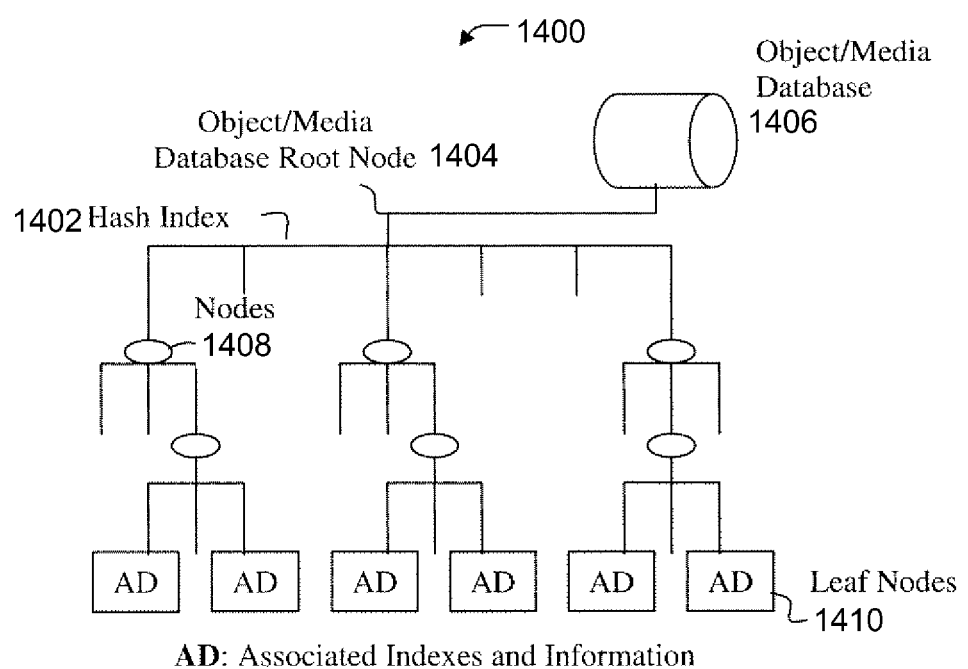
FIG. 14A illustrates a hierarchical representation of a multi-dimensional object or video database with hash indexes for access and traversal nodes and the leaf nodes storing associated data and associated indexes.
Figure 14B:
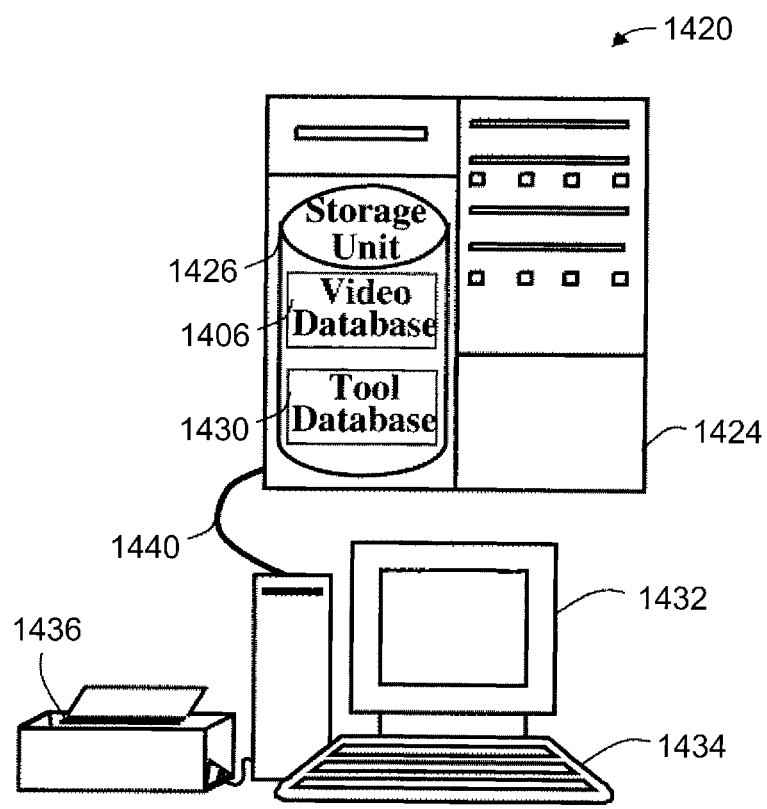
FIG. 14B illustrates a multi-dimensional content search system in accordance with the present invention.
Figure 14C:
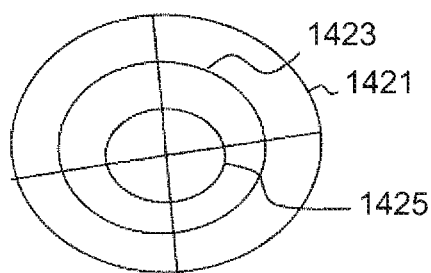
FIG. 14C illustrates some examples of regions of interest, and global and local features of image or video sequence or object used to generate descriptors, traversal indexes, and signatures in accordance with the present invention.

FIG. 14A illustrates a hierarchical representation 1400 of a multi-dimensional object or video database with traversal nodes constructed from differentiating parts of traversal indexes and leaf nodes storing associated data and associated indexes. In FIG. 14A, a traversal index associated with elements, such as video sequences 1404, stored in a multi-dimensional video database 1406, and leaf nodes 1410. The video database is traversed via nodes 1408 to reach the leaf nodes 1410 storing associated data and associated indexes. In a preferred embodiment, the traversal indexes are a direct address or a hash to each leaf node. In this embodiment, all the traversal indexes are equivalent to the hash or direct address of the leaf node.

Figure 15A:
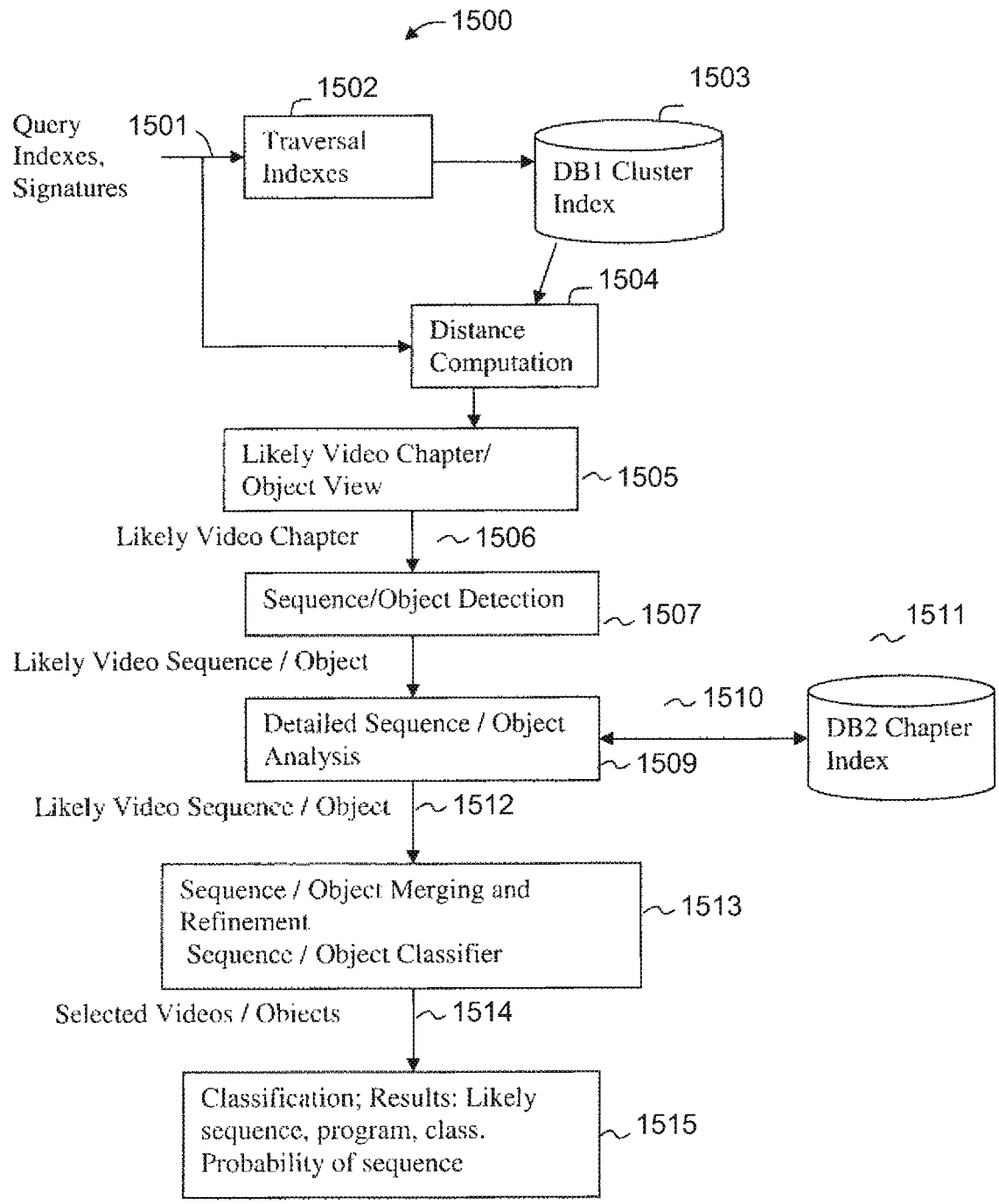
FIG. 15A illustrates a method to identify a query video sequence from video sequences in a database or to identify a query object data cube from the signatures of the views of object cubes in the database in accordance with the present invention.

FIG. 15A illustrates a method 1500 used to identify a query video sequence to the video sequences in a video database or to identify a query object data cube with the object cubes in the database. For every selected frame in the query video sequence, a video database search is performed. The video database search can be performed very efficiently using the hashed indexes. The nearest video signatures from the database collection for each query video frame are correlated to identify the highest likelihood of a video sequence match. Next, all signatures from matching frames from the database for each query are correlated with the subsequent matching database frames for subsequent queries till a high correlation is obtained. One correlation factor relates similar gaps between the query frames to the gaps between the database matching frames. If the likelihood of a sequence match is high, as determined by the correlation, the likely candidate video sequence is selected for further processing.

Multimedia Sequence or Object Identification

In a preferred embodiment, a given set of query indexes and signatures 1501 in FIG. 15A are derived from a query video sequence and used to identify a similar video sequence. For each query video sequence, certain frames are identified. For each of these selected frames signatures are generated for certain extracted features of the frame or frames around the selected frame. For each of the signatures, a traversal index is also generated. This traversal index is used to access the database efficiently. Also, the database of signatures of original videos is also indexed by the traversal indexes computed. The word traverse is typically used to describe the operations that involve the stepping from node to node of the database until the individual elements of the database are reached. The traversal indexes and the signatures are computed from features such as, the shape, motion, first and second order gradients, phase correlation, texture or color correlation in the sectors or other features or combination thereof, to identify likely frames or video sequence in step 1502 of FIG. 15A. For each of the signatures and traversal indexes of the query, a range or a nearest neighbor search/query is performed. This database search operation involves database traversal and similarity search and a list of likely entries in the database are identified that are within the search criteria. At step 1503, a similarity search computation is performed, which involves reading the leaf nodes for associated data. Then, in step 1504, the distance or error between the individual query signatures and database signatures is computed.

The distance measure is generally defined as $L_p$ normalized where $L_1$ normalized is the sum of differences between a query signature vector (Q) and an original video signature vector (O) for each dimension of the signature vector. For example, $L_1$ (Query, Original)=sum (Qi−Oi) for all dimensions in a signature vector. Where Qi is the value of the query vector for the original video feature/frame in a given dimension i, and Oi is the value of the original video feature/frame vector for a given dimension i.

At step 1505, the matching signatures are processed to select the most likely matching videos/audios and their chapters or the most likely objects and their viewpoints. For these selected set of matching video chapters and associated query a longer query is constructed and a fast similarity search performed using only the exact matching cluster hash indexes with the database and the resulting set of candidates are generated. The candidate set for the selected video chapters with extended queries is then correlated. The correlation can be performed using a trend detector such as Hough Transform or a dynamic programming based sequential correlation could be used. The detected sequence is than located in step 1507. The operations of computing a correlation score between any potential segment of a query video sequence or frame of the query video with the original video are performed in step 1509. This step involves further correlations calculations to extend the correlation that is initially found when the signature level correlation for the query and original video is performed in step 1507. This correlation is performed on sequences of query and original video frames or between specific features of the query and original video, or between query video frame and original video frame features. Additional computations can also be performed by using additional indexes or signatures such as texture, motion, and associated data such as location and size. The above correlations will identify a small set of likely matching video sequences or frames. For each likely matching video, the probability of matching between query and original video is calculated and a correlation score is generated in step 1507. As described above, the signature level correlation scores from step 1509 identify similar video frames between a query and an original video. Step 1509 is analogous to a false positive analysis. For every likely matching of the original video with the query video, a more detailed correlation between the query video and original video is performed using the video index database 1511. This false positive analysis is performed between the matching video segments or matching video frames or various video features.

Database Organization

In the preferred embodiment the database of signatures are organized into 2 different ones. The first database is indexed using the above hash based on unique features of detected feature. This first database is used as the first step in identifying sections of matching videos. The second database is constructed from an index based on identified video or object and the location or chapter within the video or viewpoint of the object.

Correlation Ensemble Method to Identify Video or Audio Sequences

In a preferred embodiment, the computation of the correlation score of a sequence based on time correlation is described below.

corr_score_Q0_DB0 is the correlation score between a query video segment and original video segment.

$$\text{corr\_score\_}Q0\_DB0 = \Sigma(\max(Eij*((Si-\text{sigma})(Sj-\text{sigma})/K)*(1-DTij)^2$$

where Eij=entropy between correlated queries i and j
  Si=the similarity score of item "i" of the matching sequence between query and original video signatures
  Sj=the similarity score of item "I" of the matching sequence between query and original video signatures
  Sigma=the threshold score
    The summation is from the first element to the last of matching signature pairs in a video sequence. Each signature pair consists of a query signature and an original video signature and their associated frame numbers.

DTij=is the frame correlation between queries i and j and the associated original video frames for the queries i and j $$DTij=|(QFRj-QFRi)-(DBFRj-DBFRi)|/((QFRj-QFRi)+(DBFRj-DBFRi))$$

where query j>query i; and where j is the next element that has a valid DB match in the query series: 0, 1, 2, . . . i, . . . j . . .
a valid DB match is defined where (Si−sigma)>0 and the DTij>0.1
and where K is a constant corr_score_Q0_DB0 is the correlation score between a query video segment and original video segment.

$$seq\_score\_Q0\_DB0\_WIN1=\text{sum}(\max(Eij*((Si-\text{sigma})(Sj-\text{sigma})/L)*\text{power}((1-(DTij),2))+A)$$

where L, A are constants
and where for WIN1: is a sequence window length; the sequence length is a programmed value that represents the length of the matching sequence. The threshold values for given sequence window length have been found experimentally or through learning.

Thresholding for sequences defined by a non-linear approximation
For given sequence window W $$\text{Thresh}=RATE*\text{power}((WIN),NL)$$

where RATE is constant;
where NL is constant≈0.5

In a preferred embodiment, the correlation score for a matching video sequence is computed as follows: compute a correlation score between two close matches of database frames of the same video sequence. Use the individual frame similarity score, use the frame distance correlation between query and database, and correlate the direction of change information in the query signatures to that of the candidate frames in the video sequence. Apply an appropriate weight on the query indexes. For unique information content, use the uniqueness of each signature, STF in video database 106 and the distances between the signatures in the queries. Step 1513 includes merging separately detected sequences for a given database video. Step 1514 transfers sequences detected from multiple parallel search systems or search partitions. Step 1515 performs sequence selection across a large set of detected sequences and further performs iterations to extend the detected sequences.

Correlation Ensemble Method to Identify Objects or Images

In a preferred embodiment, the computation of the correlation score of an object based spatial correlation is described below.

corr_score_Q0_DB0 is the correlation score between a query object view and original object.

$$corr\_score\_Q0\_DB0=\Sigma(\max(Eij*((Si-\text{sigma})(Sj-\text{sigma})/K)*(1-DSij)^2$$

where Eij=entropy between correlated queries i and j
Si=the similarity score of item "i" of the matching sequence between query and original object signatures
Sj=the similarity score of item "j" of the matching sequence between query and original object signatures
Sigma=the threshold score
The summation is from the first element to the last of matching signature pairs in a object sequence.

Each signature pair consists of a query signature and an original object signature and their associated frame numbers.
DSij=is the spatial distance correlation between queries i and j and the associated original object for the queries i and j $$DSij=|(QSPj-QSPi)-(DBSPj-DBSPi)|/((QSPj-QSPi)+(DBSPj-DBSPi))$$

where query j>query i; and where j is the next element that has a valid DB match in the query series: 0, 1, 2, . . . i, . . . j . . .
a valid DB match is defined where (Si−sigma)>0 and the DTij>0.1
and where K is a constant corr_score_Q0_DB0 is the correlation score between a query object view and original object.

$$obj\_score\_Q0\_DB0\_VW1=\text{sum}(\max(Eij*((Si-\text{sigma})(Sj-\text{sigma})/L)*\text{power}((1-(SPij),2))+A)$$

where L, A are constants
and where for VW1: is a spatial view window; the spatial view window is a programmed value that represents view window for the matching object. The threshold values for view window and features have been found experimentally or through learning.

Thresholding for object defined by a non-linear approximation
For given view window W $$\text{Thresh}=FEAT*\text{power}((W),NL)$$

where FEAT is constant;
where NL is constant≈0.5

Trend Correlation

The above methods describe a refining adaptive trend correlation that is forgiving to variations occurring due to localized edits. The above method is also very accurate since it gives weight to similarity, trend gaps (in time or space), and optionally to rate of variation in individually correlated signatures in time or space.

In a preferred method the trend correlation is computed as series of iterative correlations using the query and reference signatures. For example in videos the first correlation is between the first matching frame between query and video and the next best matching frame. The next correlation is performed using the first trend line (between first and second frame) and the next best matching frame. So this method iteratively attempts to find the best trend line using actual frames. This method also performs this trend line correlation in parallel for many possibilities, and finally picks the best combination for many overlapping choices.

An alternate method of trend correlation uses Hough Transform where the many bins are created for given trend line. For example, one bin represents, offset of zero on the x-axis and the line x=y. Another bin represents offset of 100 on x-axis and trend line x=2y. For a given query the matching candidates are all allocated to each of the above buckets, and the bucket with the highest score is selected as the trend line. The score calculations can be performed in various ways with the preferred method using a sum of signature correlation scores where each correlation score is the similarity score multiplied by the size or uniqueness of detected feature.

Each of the above methods the embodiment uses a short sample of the query to detect the trend correlation between the query and reference signatures.

In another preferred embodiment of the Hough Transform for fast performance the bins represent a segment of a line and not a line. This is implemented by either organizing the reference into chapters and sections and perform the trend correlation only on the chapter in the reference database.

Figure 15B:
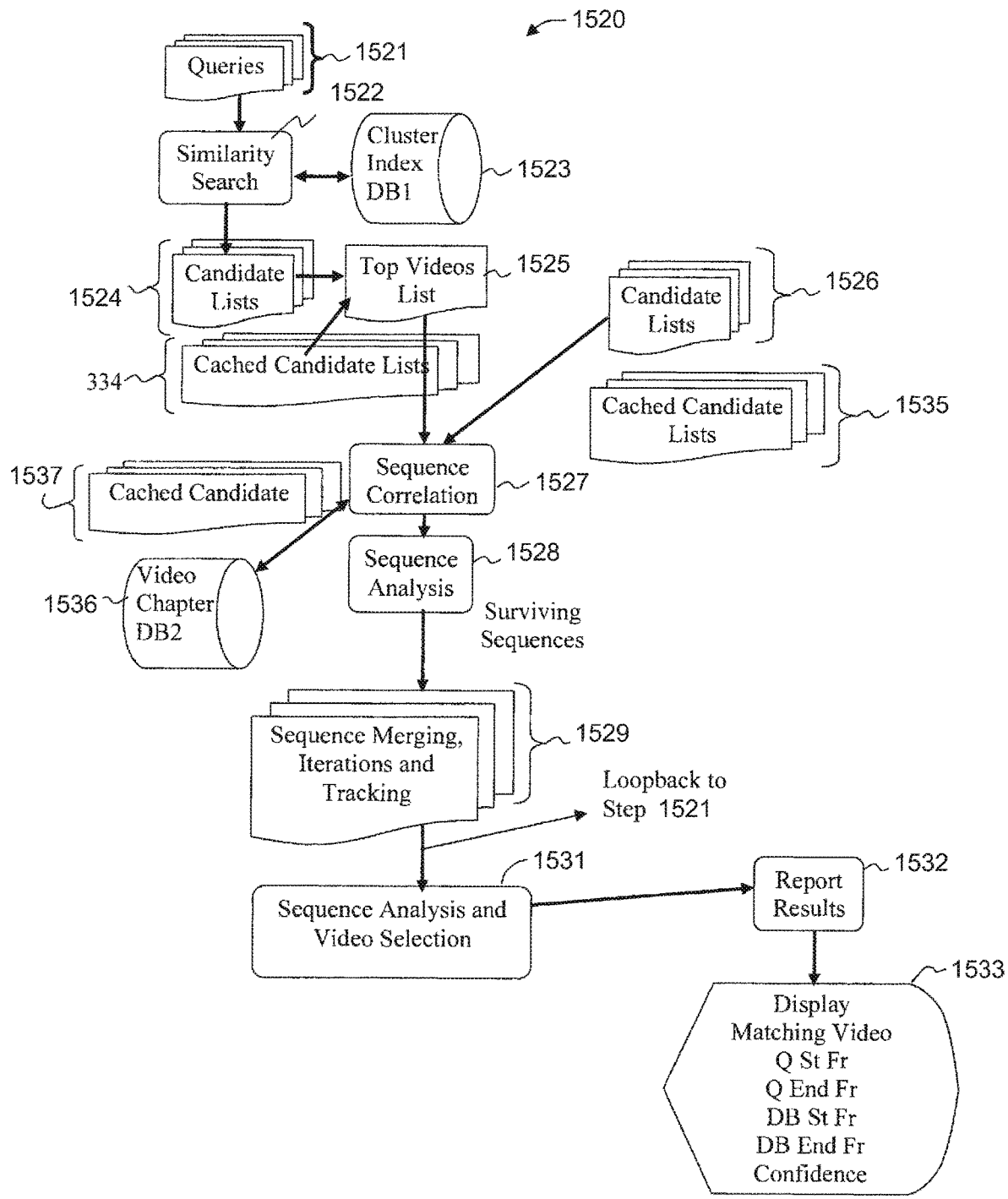
FIG. 15B illustrates an alternate method to identify a query video sequence from video sequences in a database or to identify a query object data cube from signatures of the images of the object cubes in the database in accordance with the present invention.

FIG. 15B illustrates a video search method 1520 used to identify a query signature sequence, obtained from a query video with the signature sequence in a video database. For every query video signature 1521, a video database similarity search 1522 is performed on databases, such as database 1523. The nearest video frames signatures, also referred to as a candidate list in 1524, are combined with candidates from searches with other signatures for a given query frame to identify a selected list of likely videos 1525. A new candidate list 1526 is generated the same or longer query sequence to identify potential sequences. Next, in step 1527, candidates for each query are correlated to identify potential sequences. In step 1528, a detailed sequence or frame analysis is performed by combining various sub-segments of correlated frames or frame segments of the query and the original video. Sequences are merged and combined and evaluated in step 1529. In step 1530, sequences are eliminated based on certain conditions and the likely video(s) are identified and a thresholding decision is made on the likelihood of each matching sequence. The query process for small query sections is repeated by going back to step 1521. Step 1532 reports the results and selected results may be displayed in step 1533 which shows a sample result list having a matching video name, a query start frame (Q St Fr), a query end frame (Q End Fr), an original video start frame (DB St Fr), an original video end frame (DB End Fr), and a likelihood of a match as a confidence value.

In an alternate embodiment the candidates returned from similarity search are stored in cached hash table constructed from video and query id and video and query frame locations. The cached candidate lists are stored at 1534, 1535. The cached lists are accessed first when the similarity overlaps the reference and the frame numbers or locators of query and reference In an alternate embodiment the above video sequence identification method can be used to identify an object where the object views represent a sequence of images similar to a video sequence.

In another alternate embodiment the object views and spatial information is used to correlate with the query signatures from various view points and correlation accounts for this spatial distances.

Figure 15C:
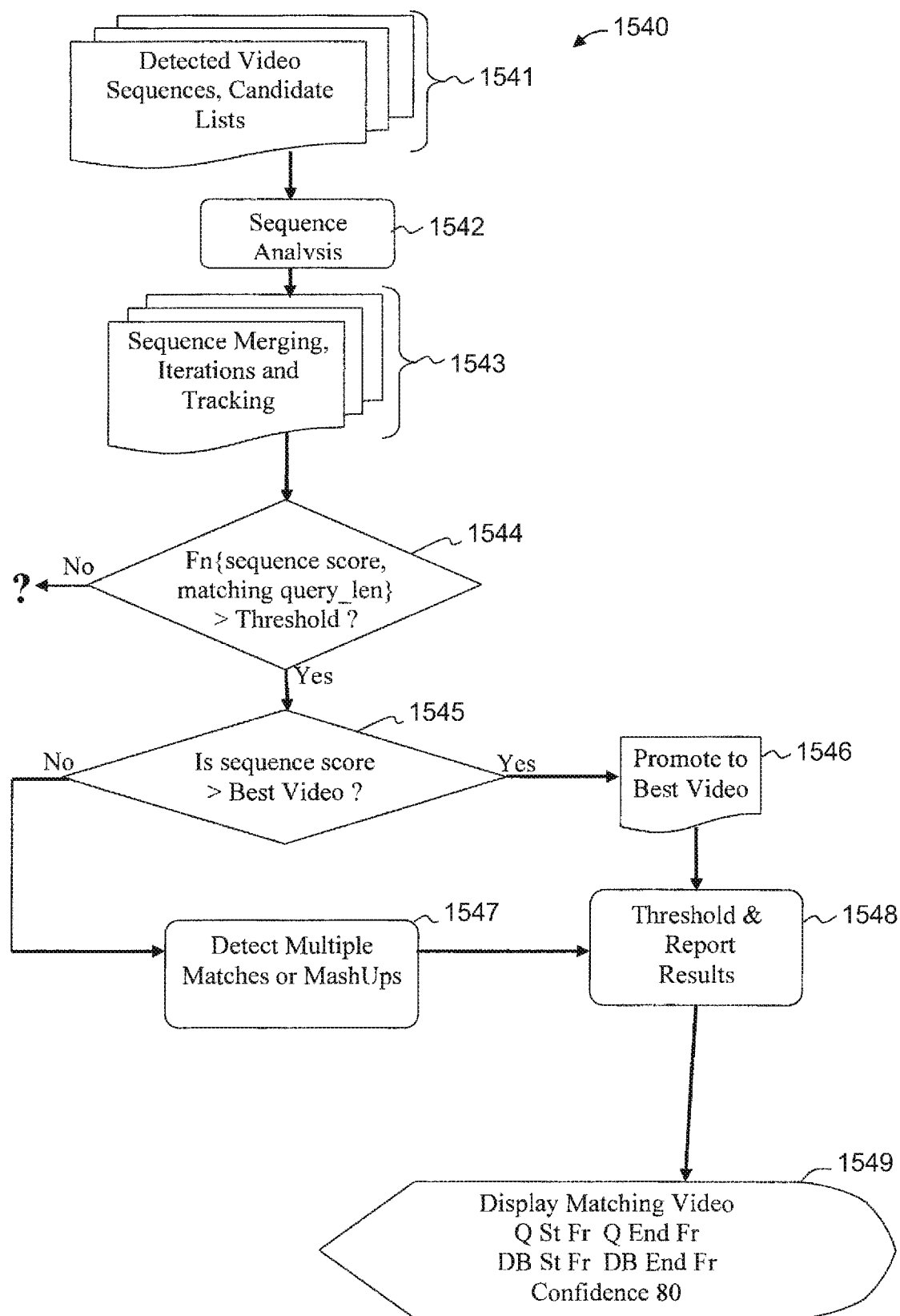
FIG. 15C illustrates an alternate method that takes as an input matching pairs of query and original video segments, and performs correlation and classification on the matching original video segments to the query video in accordance with the present invention.

FIG. 15C illustrates a video search method 1540 used to evaluate a set of matching query signature sequences from a query video and matching original video sequences. For every query video sequence detected in step 1541, a detailed sequence or frame analysis is performed in step 1542 on the sub-segments of correlating frames or frame segments of query and original video. In step 1543, the surviving detected sequences are further processed to consider merging of detected sequences and also if a detected sequence can be extended by iterations process. In step 1544 the each sequence score, and each video is evaluated to determine if it is greater than a threshold. If so, the set of sequences of a given video are selected as a matching video. The scores for each video are evaluated in step 1545 to determine the best matching video. The best matching video list is generated in step 1546. The matching videos are added to a threshold and reporting unit in step 1548. Step 1547 prunes, merges and iterates each matching sequence on a set of best matching sequences. Selected results may be displayed in step 1549.

The merging process for detected sequences is performed for both overlapping and non overlapping sequences. One method performs correlation on a potential merged sequence; and updates the detected sequence to the merged sequence if the relative correlated score of the merged sequence is proportionally greater than the original. Another method uses a frame by frame or locator specific correlation analysis before performing a merge or extension of the sequences.

A sequence refinement method uses an iterative extension of detected sequence. This again considers a potential extended sequence and performs correlation and updates to the extended sequence if the relative correlation score is improved. An alternate method evaluates this extension by performing frame by frame or locator specific correlation before iterating or updating the sequence.

FIG. 3A illustrates a post processing method 300 utilized to determine a confidence factor for a likely video sequence matching candidate of the candidate sequence. All the signatures of the candidate video, starting with an identified start frame, for each frame thereafter, and each identified frame or sequence, are compared with all the database signatures related to the query video sequence and correlation ensemble scores are generated.

One embodiment describes a method to correlate signatures within a video sequence to a database set to identify the likely matching video sequence. The embodiment also describes the method to correlate likely matching video sequences with all related signatures in database to decide a true match or confidence of the match.

Figure 16A:
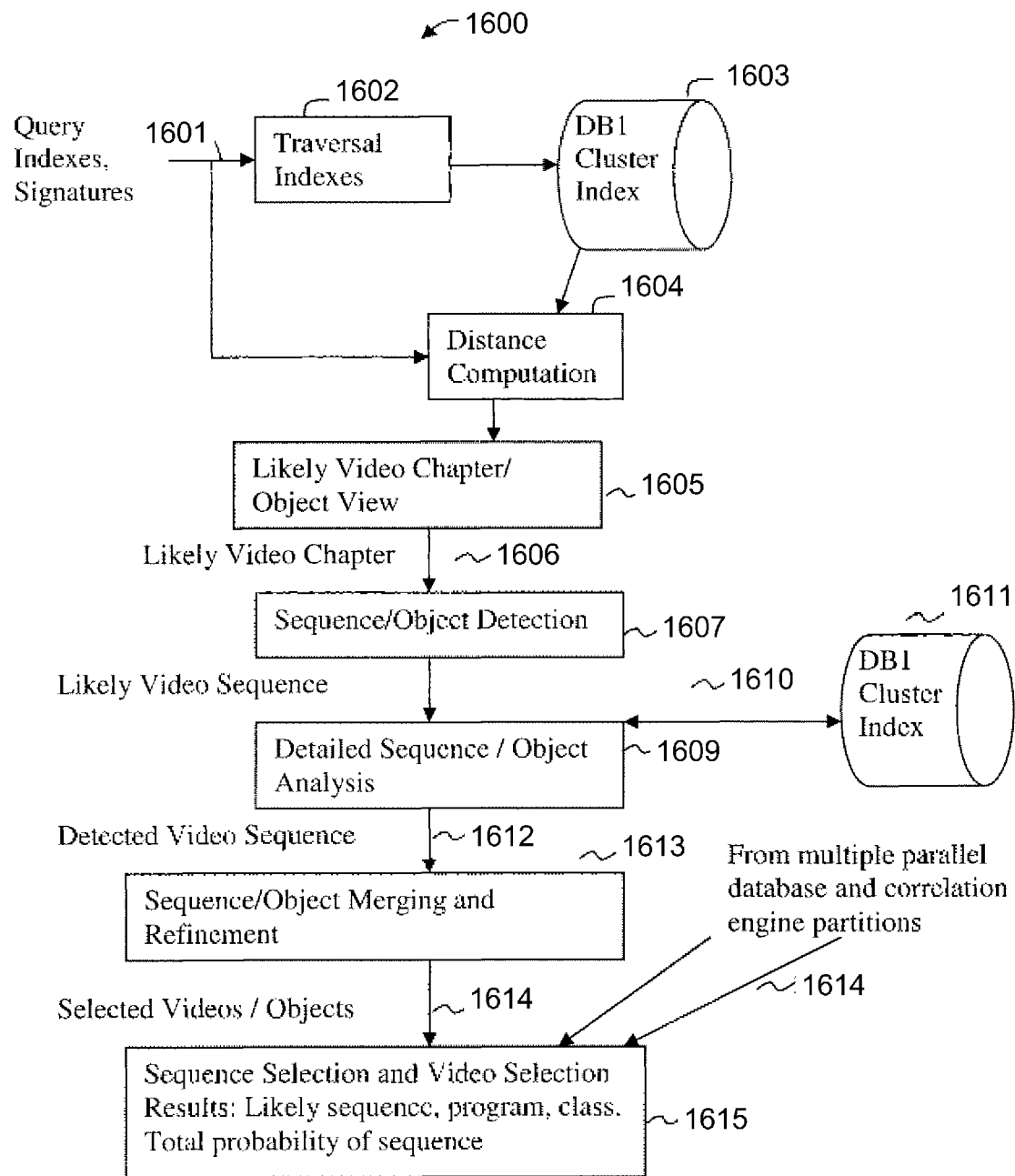
FIG. 16A illustrates a method to identify a query video sequence from the video sequences in a distributed database or partitioned parallelized system or to identify a query object data cube with the object cubes in the database in accordance with the present invention.

A preferred embodiment of the post processing method 1600 to increase the confidence of a video sequence matching candidate from database is shown in FIG. 16A and described below. A given set of query indexes derived from a query video sequence is received in step 1601. In step 1602, a database index is traversed for this set to access leaf nodes for associated data and associated indexes which are stored in step 1603. Then, as described with regard to step 1504 of FIG. 15A above, the distance between the individual query index and candidate database index and associated data is computed in step 1604. An edit distance can be computed to obtain a more accurate correlation. For a shape signature, the edit distance is, for example, the sum of the pixel weights and the distance that needs to be traveled to make two signatures equal. Next, a correlation score for the single index or frame is computed in step 1605 using additional indexes such as texture, motion, and associated data such as location and size to correlate each individual frame. The sequence probability scores for each query sequence or frame are calculated, as well as a correlation score in step 1606 for the candidate sequence from various likely start frame positions. Using the above correlations of matching sequences, a final evaluation of the correlation between the candidate video and the query video is performed in step 1607 to produce a video sequence likelihood. The likelihood is based on a score that is thresholded by a value that is calculated from the length of the sequence or the total information extracted from the video sequence. Using rules based on learning a probability, a confidence value is placed on the likelihood of a match.

Figure 16B:
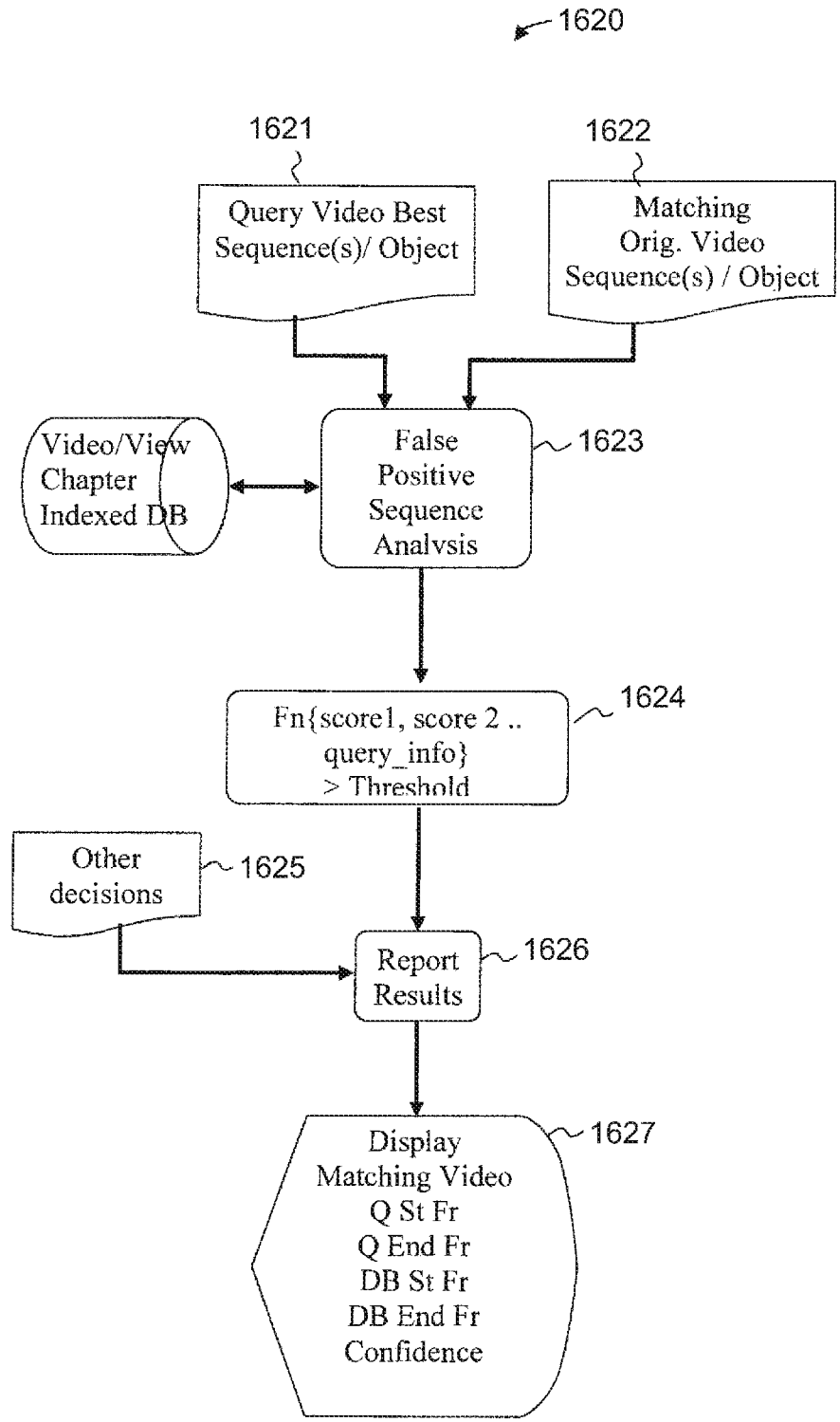
FIG. 16B illustrates a correlation and classification method to determine the likelihood of a match between segments of query video and original video in accordance with the present invention.

FIG. 16B illustrates a post processing method 1620 employed to determine if a matching segment of an original video 1622 and a query video 1621 are similar. All the signatures of the candidate video, starting with an identified start frame, for each frame thereafter, and each identified frame or sequence, are compared with all the database signatures related to the query video sequence and correlation scores are generated.

The sequence probability scores are calculated for each query sequence or frame and a correlation score is also calculated in step 1623 for the candidate sequence from various likely start frame positions. The correlation scores calculated are compared in step 1624 with a threshold that takes into account the total query information, for example Fn{scores, query_dist}>threshold. If the scores of the video sequence are greater than the threshold, the sequence is added to a list of matching sequences. The results are reported in step 1626 and may utilize other analysis and decisions provided by step 1625. Step 1627 operates to display a rendering of results, where Q St Fr represents a query start frame, Q End Fr represents a query end frame, DB St Fr represents an original video start frame, DB End represents an original video end frame.

Figure 17:
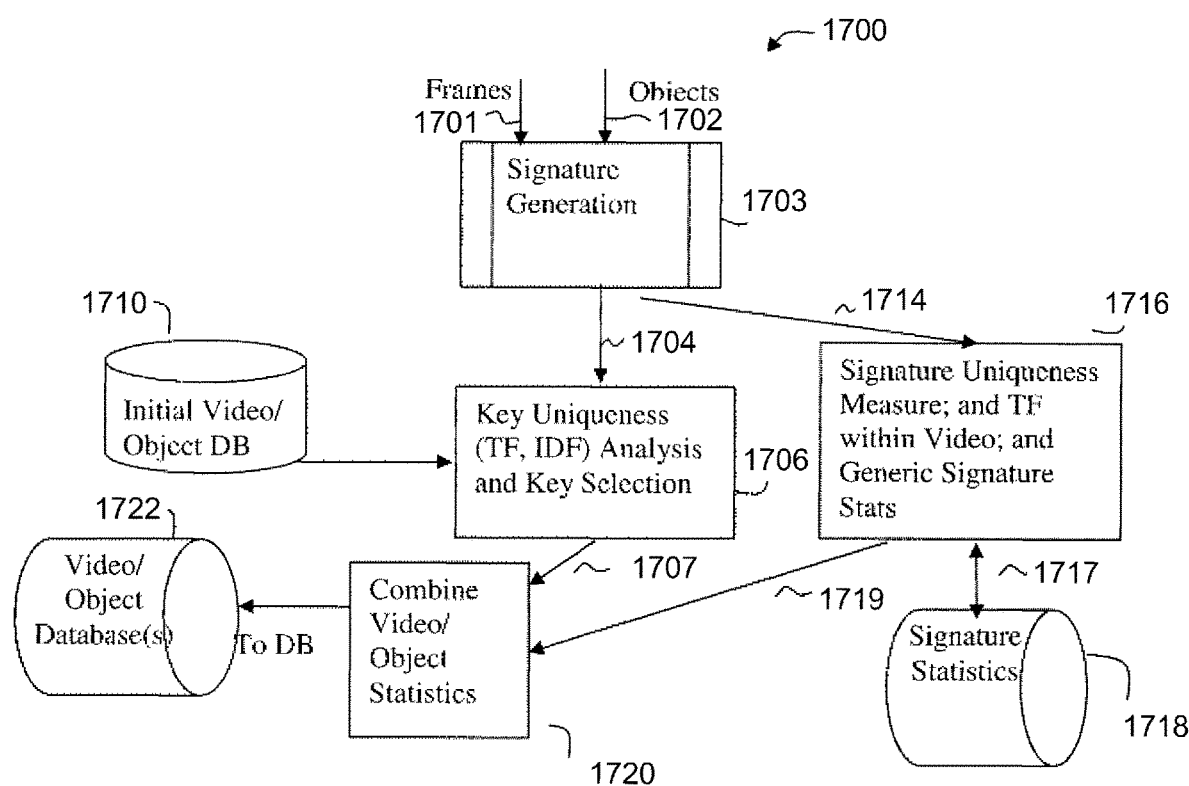
FIG. 17 illustrates a method used to select database signatures to increase information content such that the signatures optimize the likelihood of differentiating between the many video sequences stored in accordance with the present invention.

FIG. 17 illustrates a method 1700 that may suitably be employed to select database signatures that are more unique so as to increase information content. These selected signatures optimize the likelihood of differentiating between the many video sequences stored. In a preferred embodiment to select high information signatures in the database, video frames 1701 or objects 1702, after image processing treatment of the video frames or objects, are further processed in step 1703 to generate signatures. These signatures are compared in step 1706 with database signatures accessed from a video database 1710, for example. Signatures with high information content relative to the rest of the signatures in the video database are retained. Based on the uniqueness of the signatures and other control parameters, such as priority of a video sequence, or total signatures present per video sequence in step 1706, the selected keys are retained at output 1707 and stored video database 1722. The 2 versions of the video database one for fast cluster search and another for fast detailed sequence checking can use different thresholds for signature selection.

One embodiment describes a method to select database information with high uniqueness. If the term frequency (STF) of signatures within a very small distance of the generated signature is large, this signature is not preferred. Another signature that includes more unique information is preferred for selection, the uniqueness is directly related to the number of similar signatures within a given distance measure.

In another preferred embodiment, two pass operations are performed to generate a high information content database. In the first pass, all candidate signatures are generated. Next, the total unique information content of each video sequence is evaluated. In the second pass, all signatures that do not have high information content and at the same time do not diminish the total unique information about each video sequence are not kept in the database. The database retains primarily high information content signatures that retain most of the differentiating information of each database element or video sequence. A measure of the uniqueness of each individual signature and a sum of unique signatures measured for a particular object or video clip are tracked so as to ensure sufficient information content is in database to be able to identify the video clip or object. In order to make a measure of unique information content within a query, or more specifically query video, is important to determine the error bounds of a matching original. For example, if the information content calculated by a summation of uniqueness of individual signatures within a selected segment of the query video is very high then relative error bounds of a matching original video can be relatively high. This form of measurement is based on statistics and can be observed with actual test data.

Alternatively each cluster could be described as a hash or locality sensitive hash value or a cluster centre value. The traversal indexes are built from the cluster signatures or values.

Figure 18:
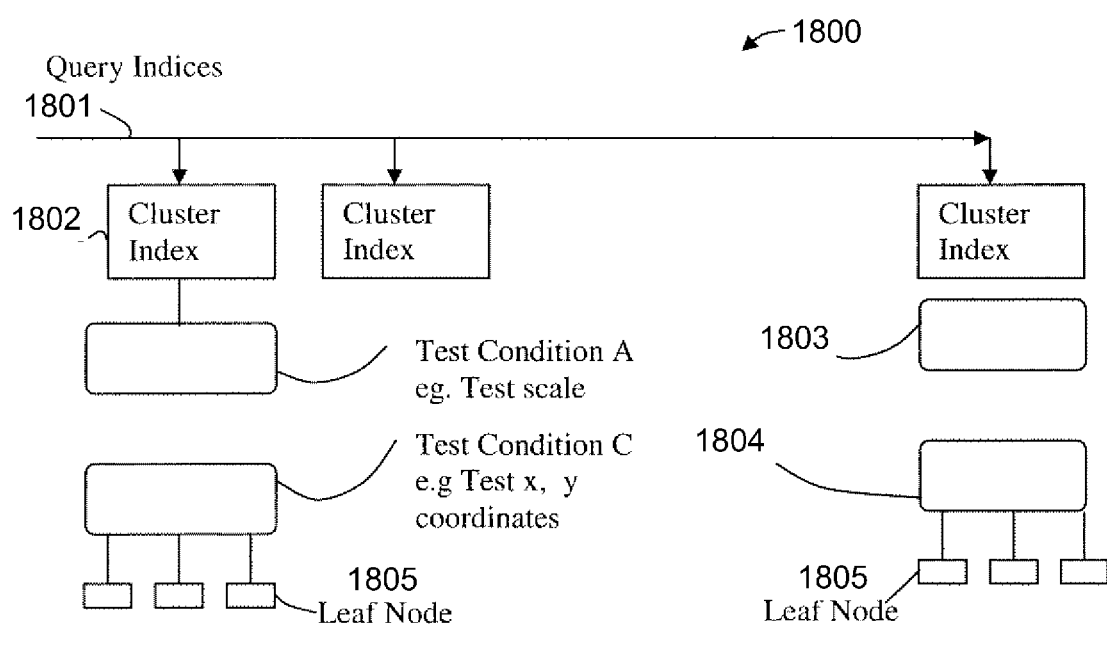
FIG. 18 illustrates a method to perform similarity search on signatures in the database. Similarity search is required during search, correlation and classification operations.

FIG. 18 shows a similarity search operation using the fast cluster search video database. 1800 is a method for similarity search, while 1801 represents the query signature and cluster index set. Each query signature is looked up by using the memory pointed by hash address 1802. All signatures that meet certain conditions such as spatial location, scale size are selected and tested for distance. Signatures within a certain distance alone are retained and placed in to candidate set.

Figure 19:
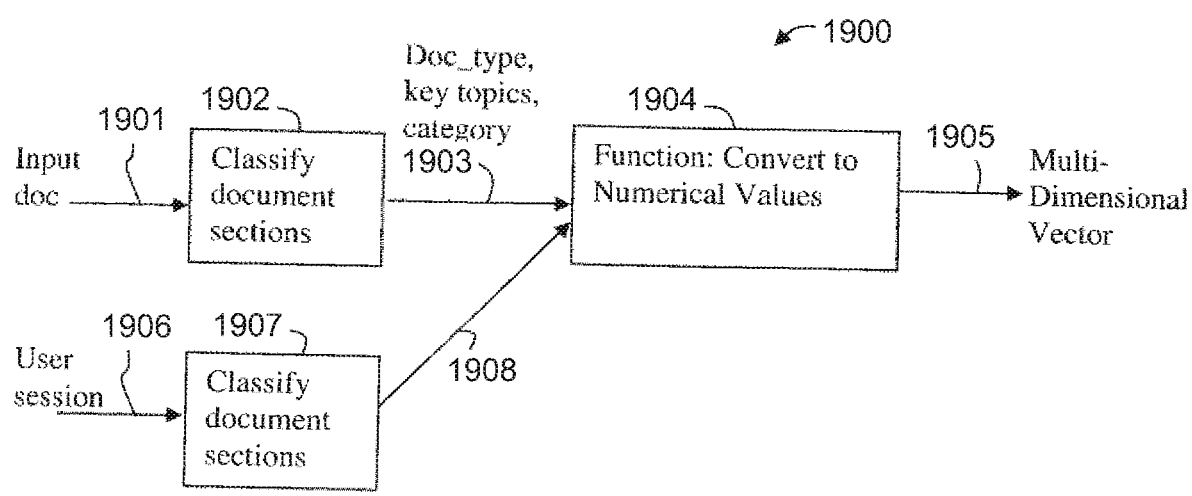
FIG. 19 shows an alternative method of converting documents or user sessions into multi-dimensional vectors which can be used to efficiently perform lookup of similar documents or similar user sessions or similar events in accordance with the present invention.
Figure 20:
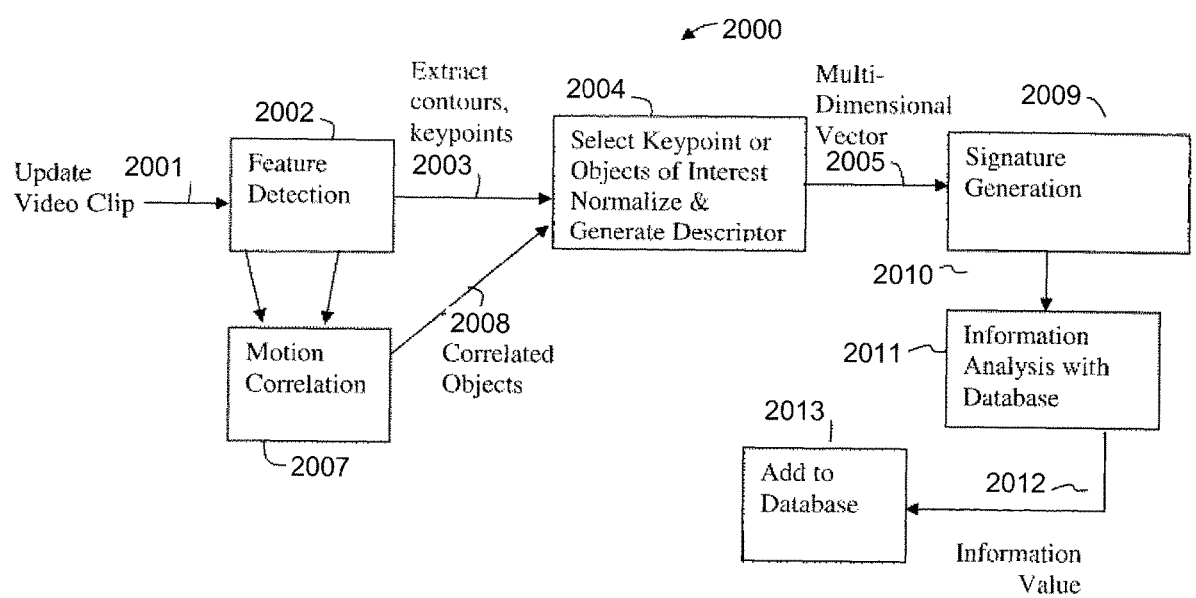
FIG. 20 shows a system application wherein reference content or image sequence is processed to generate multi-dimensional vectors which are further analyzed for information content before adding them to a database in accordance with the present invention.
Figure 21:
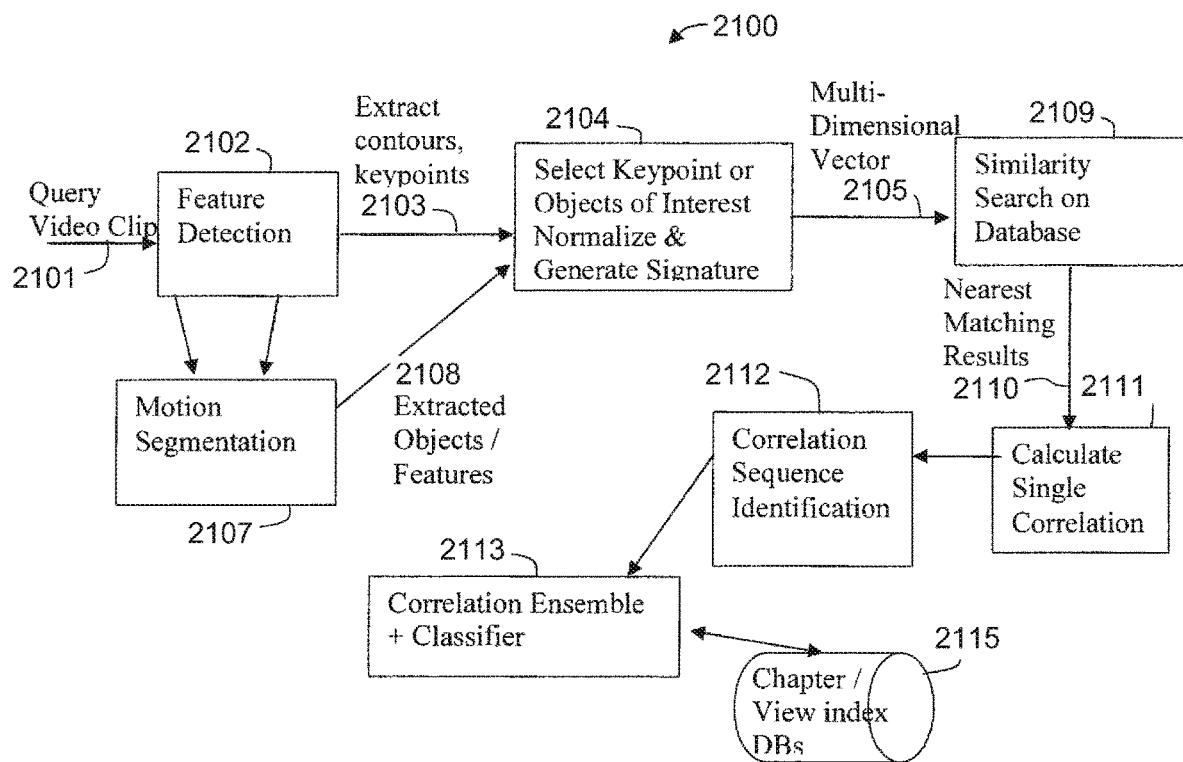
FIG. 21 shows an video identification system wherein reference content or image sequence is processed to generate a database of multi-dimensional vectors; to identify a matching video for a query video clip, a set of similarity search of the above database and correlation and classification in accordance with the present invention.

FIG. 19 shows an alternative method 1900 of converting documents or user sessions into multi-dimensional vectors which can be used to efficiently perform thorough lookup of similar documents or similar user sessions or similar events. This method could be used for any input including documents, events, images, natural situations or the like. The first step in using the input is to classify it into various aspects where each aspect provides a dimension. After classification, a multi-dimensional vector is used to describe the values for each class. For example, such values include a document type, such as a shopping list, a scholarly paper, a product review, a feedback document. In another example, a category may include, for example, a medical scholarly paper or a video of a medical procedure. Further dimensions could apply to personalities, topics, activities and the like.

The alternative method 1900 includes, classifying an incoming document 1901 into different aspects in step 1902. A first set of dimensions 1903 such as document type, category, classification, personalities, topics, activities are transferred as input to step 1904. In a similar manner to step 1902, an user session information 1906 may be classified into various activity types in step 1907. A second set of dimensions 1908 such as a combination of sequence of events, for example, a user session, and a classification of documents selected and of queries are transferred as input to step 1904. The multi-dimensional vectors 1903 and 1908 are converted into numerical terms in step 1904 to generate a multi-dimensional vector 1905. The advantages of this method include a very efficient ability to add new documents to update a database, to find similar documents or duplicates and to perform searches of databases.

One embodiment describes a method to select information from various features to generate signature(s) for each frame. The method describes method to weight the features at corresponding x,y coordinates to generate a weighted segmented output for a set of selected keypoints or regions.

An alternative method 2000 includes, receiving an incoming image sequence 2001 and pre-processing it into different aspects in step 2002. Results of the preprocessing in step 2002 are further processed in step 2007 in which correlation processing is performed to identify information between two images and to extract motion based information, including correlated contours. In step 2002, weighted contours and keypoints 2003 are generated and output for further processing. As used herein, weighted contours describe a weighted sum of various features extracted at a point on the contour. In step 2007, motion segmented objects or correlated objects 2008 are generated and output. Step 2007 includes motion segmentation methods to create real valued contours of the motion segmented objects. In step 2004, the multi-dimensional inputs from steps 2002 and 2007 are used as follows. Step 2004 generates signatures for each region of interest, where a region of interest can be around a selected keypoint or a selected object or bounding boxes of a selected object, or for a frame. Selected signature generation methods, including generating shape signatures or weighted shape vectors, are used in step 2004 to generate a multi-dimensional vector 2005 for selected regions of interest. Step 2009 generates the signatures after evaluating coarsely the information from the descriptors generated for these interest regions. In step 2011, a database search is performed to find uniqueness of each input and to generate information values 2010 which are used to select which values are stored in step 2012 in the final database. The final database 2013 is used for search operations for a query video.

An alternative method 2100 includes, receiving an incoming image sequence 2101 and pre-processing that sequence into different aspects in step 2102. Results of the preprocessing in step 2102 are utilized in step 2107 where correlation processing is employed to identify information between two images and to extract motion based information, including correlated contours. Weighted contours and keypoints 2103 are generated in step 2102 for further processing. Correlated objects 2108 are generated in step 2107. The multi-dimensional inputs are converted using weighted contours and keypoint information to select area or objects of interest and, after normalization for orientation and diameter, are processed into numerical terms in step 2104 to generate a multi-dimensional vector 2105. In step 2109, a database search is performed to find uniqueness. The nearest matching results 2110 are used to generate a correlation scores in step 2111 which are further processed to generate sequence correlation scores in step 2112. The likely matching objects or video clips are again evaluated using all database signatures using the video index database 2115 in step 2113. This step 2113 is generally referred to as false positive analysis. For efficient access of the database for false positive analysis, the database is indexed by video and frame numbers. The best matching results for each incoming image sequence which constitutes the query are stored as scores and reported.

The additional method includes a correlation ensemble of a set of matching frames or sequences between the original video and query video. The correlation ensembles from this set of matching frames and sequences is processed by a classifier and a determination is made if the query and video frame and sequence are similar. This method enables detection of heavily edited versions of original video.

Figure 22:
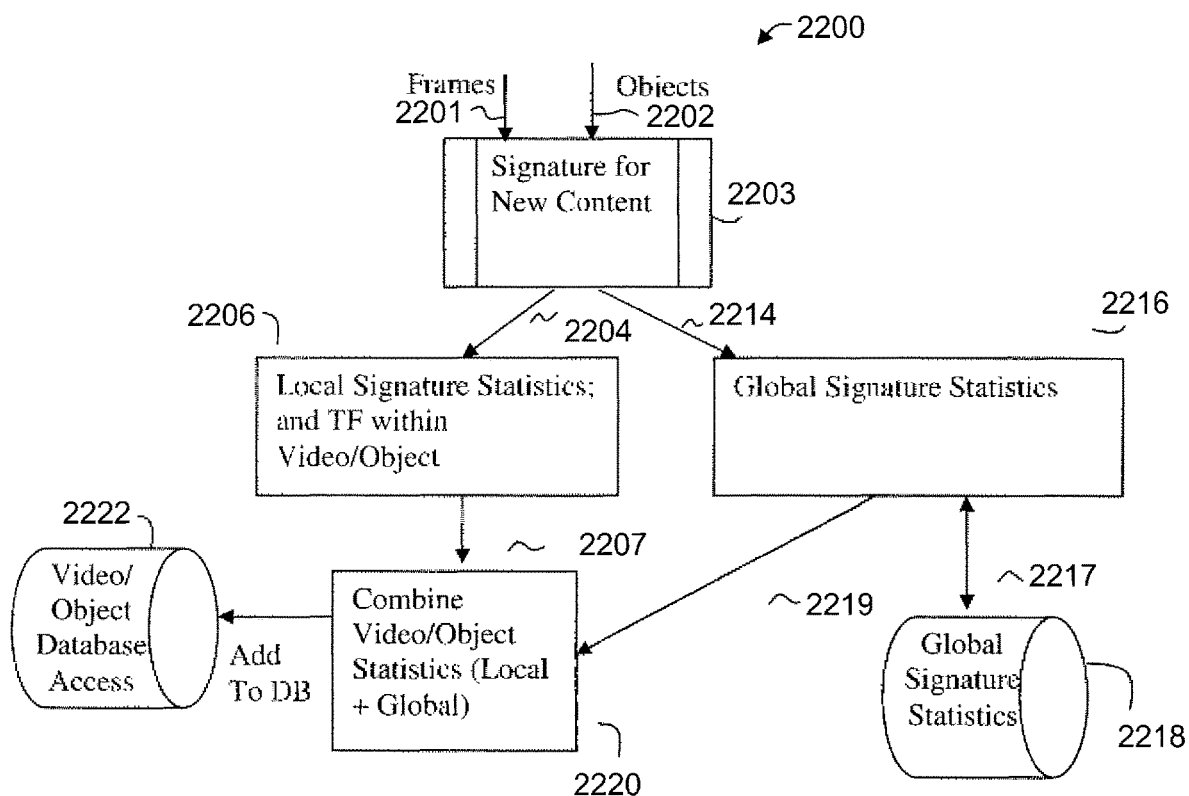
FIG. 22 shows a system wherein the database is updated by adding new reference content signatures using a very efficient and highly scalable update method.

FIG. 22 illustrates a method 2200 that may suitably be employed to select database signatures that are more unique so as to increase information content. These selected signatures optimize the likelihood of differentiating between the many video sequences stored. In a preferred embodiment to select high information signatures in the database, video frames 2201 or objects 2202, after image processing treatment of the video frames or objects, are further processed in step 2203 to generate signatures. These signatures are compared in step 2206 within the new content is added and using the frame distance as a factor. In step 2216 the new signature information statistics are updated 2217 based on known signature characteristics 2218. The statistics calculated by steps 2206 and 2216 are combined in step 2220. Signatures with high information content relative to the rest of the signatures in the video database are retained. Based on the uniqueness of the signatures and other control parameters, such as priority of a video sequence, or total signatures present per video sequence at combined step 2220, the selected keys are retained and stored video database 2222. The 2 versions of the video database one for fast cluster search and another for fast detailed sequence checking can use different thresholds for signature selection.

Figure 23:
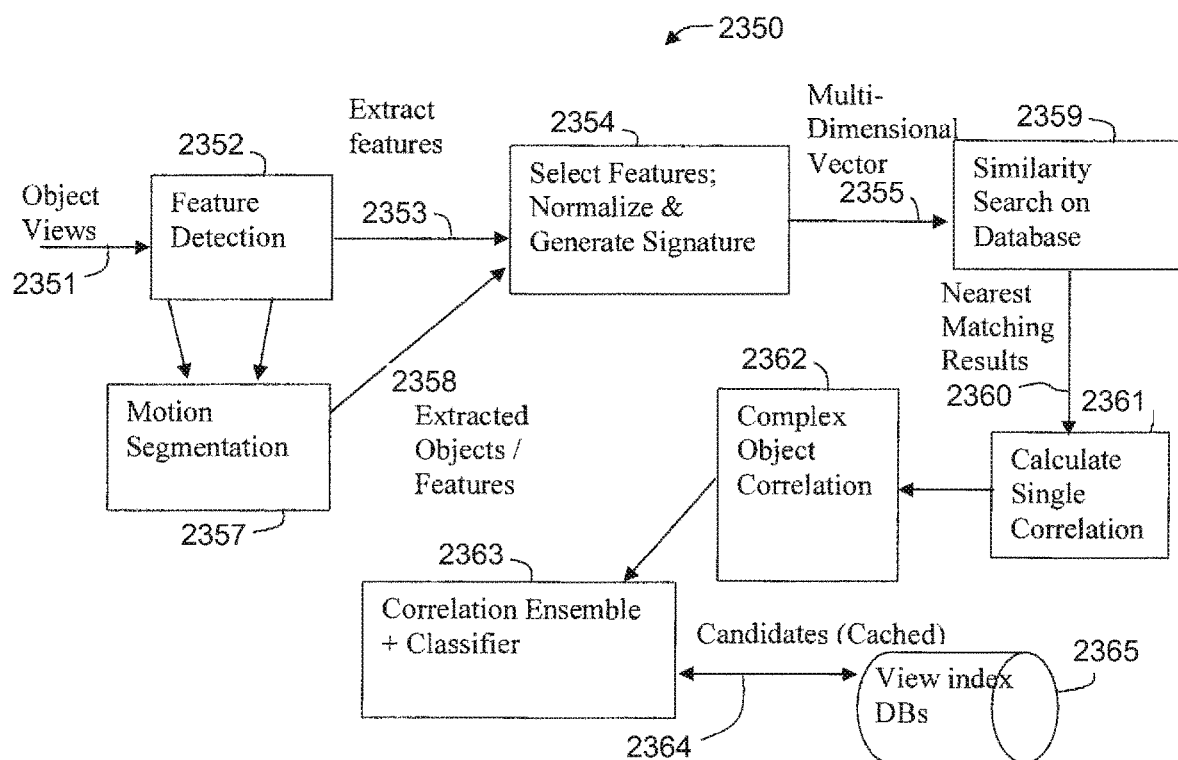
FIG. 23 shows an object identification system wherein reference object is processed to generate a database of multi-dimensional vectors; to identify a matching video for a query object, a set of similarity search of the above database and correlation and classification in accordance with the present invention.

FIG. 23 describes an alternative method 2350 which includes, receiving an incoming set of object views 2351 and pre-processing that sequence into different aspects in step 2352. The incoming set of object views may be constructed from a 3D model generated from a video source or stereo image, or a set of images of query object. Results of the preprocessing in step 2352 are utilized in step 2357 where correlation processing is employed to identify information between two images and to extract motion based information, including correlated contours. Weighted contours and keypoints 2353 are generated in step 2352 for further processing. Correlated objects 2358 are generated in step 2357. The multi-dimensional inputs are converted using weighted contours and keypoint information to select area or objects of interest and, after normalization for orientation and diameter, are processed into numerical terms in step 2354 to generate a multi-dimensional vector 2355. In step 2359, a database search is performed to find uniqueness. The nearest matching results 2360 are used to generate a correlation scores in step 2361 which are further processed to generate sequence correlation scores in step 2362. The likely matching objects are again evaluated using all database signatures using the object index database 2365 in step 2363. The algorithmic operations are a correlation ensemble and a classifier to identify matching objects. For efficient access of the database for during this detailed classification step, the database is indexed by object and object viewpoints. The best matching results for each incoming image sequence which constitutes the query are stored as scores and reported.

The additional method includes a correlation ensemble of a set of matching view points or view sequences between the original object and query object. The correlation ensembles from this set of matching view points or view sequences is processed by a classifier and a determination is made if the query and original object view points or view sequences are similar. This method enables detection of heavily distorted or obfuscated versions of original object.

Those of skill in the art will appreciate that based on the present disclosure additional alternative systems and methods for scalable, accurate and distortion robust media fingerprinting and identification of digital video sequences may be determined in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those of ordinary skill in the art may be made in the arrangement, operation and details of the method and apparatus of the present invention disclosed herein without departing from the spirit and scope of the invention as defined in the appended claims. For example, in another embodiment, an alternate method of feature detection other than the two-pass scale space approach, is used. A feature detection method that provides the center location and spatial extent of the feature, which may be described as a "scale space" method, is feasible. In yet another embodiment, an alternate method for generating a descriptor is used other than the "global descriptor" method presently described. The "phase descriptor" method is one such alternative, and it is described in U.S. application Ser. No. 12/612,729 filed Nov. 5, 2009 entitled "Digital Video Content Fingerprinting Based on Scale Invariant Interest Region Detection with an Array of Anisotropic Filters", FIGS. 9, 10, and 11 and pages 26-28, 38, and 39.

Other approaches that generate a compact N dimension vector for a rectangular area of pixels are applicable.

We claim:

1. A method comprising:
    obtaining, by one or more computing devices, a pair of query signatures corresponding to a query sequence of media content;
    searching, by the one or more computing devices, a reference database, using the pair of query signatures so as to identify a set of reference signatures that are within a distance measure of the pair of query signatures;
    determining, by the one or more computing devices, a correlation score between the pair of query signatures and a pair of reference signatures of the set of reference signatures, wherein the correlation score is based on a first similarity score between a first query signature of the pair of query signatures and a first reference signature of the pair of reference signatures, a second similarity score between a second query signature of the pair of query signatures and a second reference signature of the pair of reference signatures, and a frame correlation between the pair of query signatures and the pair of reference signatures; and
    based at least on the correlation score, identifying, by the one or more computing devices, a reference media content corresponding to the query sequence of media content.

2. The method of claim 1, wherein the first query signature and the second query signature corresponding to different frames of the query sequence of media content.

3. The method of claim 1, wherein searching the reference database comprises searching the reference database using a hash index of the first query signature and a hash index of the second query signature.

4. The method of claim 1, wherein identifying the reference media content comprises identifying the reference media content based at least on the correlation score satisfying a threshold.

5. The method of claim 1, further comprising determining a correlation in space between the pair of query signatures and the pair of reference signatures,
    wherein the identifying is further based on the correlation in space.

6. The method of claim 5, wherein the correlation in space is based on spatial locations of the first query signature, the second query signature, the first reference signature, and the second reference signature.

7. The method of claim 1, wherein identifying the reference media content comprises identifying a name of the reference media content and a start frame within the reference media content.

8. A non-transitory computer-readable medium having stored therein instructions that are executable to cause a computing system to perform functions comprising:
    obtaining a pair of query signatures corresponding to a query sequence of media content,
    searching a reference database using the pair of query signatures so as to identify a set of reference signatures that are within a distance measure of the pair of query signatures;
    determining a correlation score between the pair of query signatures and a pair of reference signatures of the set of reference signatures, wherein the correlation score is based on a first similarity score between a first query signature of the pair of query signatures and a first reference signature of the pair of reference signatures, a second similarity score between a second query signature of the pair of query signatures and a second reference signature of the pair of reference signatures, and a frame correlation between the pair of query signatures and the pair of reference signatures; and
    based at least on the correlation score, identifying a reference media content corresponding to the query sequence of media content.

9. The non-transitory computer-readable medium of claim 8, wherein the first query signature and the second query signature corresponding to different frames of the query sequence of media content.

10. The non-transitory computer-readable medium of claim 8, wherein searching the reference database comprises searching the reference database using a hash index of the first query signature and a hash index of the second query signature.

11. The non-transitory computer-readable medium of claim 8, wherein identifying the reference media content comprises identifying the reference media content based at least on the correlation score satisfying a threshold.

12. The non-transitory computer-readable medium of claim 8:
    wherein the functions further comprise determining a correlation in space between the pair of query signatures and the pair of reference signatures, and
    wherein the identifying is further based on the correlation in space.

13. The non-transitory computer-readable medium of claim 12, wherein the correlation in space is based on spatial locations of the first query signature, the second query signature, the first reference signature, and the second reference signature.

14. The non-transitory computer-readable medium of claim 8, wherein identifying the reference media content comprises identifying a name of the reference media content and a start frame within the reference media content.

15. A computing system comprising:
    a processing unit; and
    a computer-readable medium having stored therein instructions that are executable to cause the computing system to perform functions comprising:
        obtaining a pair of query signatures corresponding to a query sequence of media content,
        searching a reference database using the pair of query signatures so as to identify a set of reference signatures that are within a distance measure of the pair of query signatures;
        determining a correlation score between the pair of query signatures and a pair of reference signatures of the set of reference signatures, wherein the correlation score is based on a first similarity score between a first query signature of the pair of query signatures and a first reference signature of the pair of reference signatures, a second similarity score between a second query signature of the pair of query signatures and a second reference signature of the pair of reference signatures, and a frame correlation between the pair of query signatures and the pair of reference signatures; and
        based at least on the correlation score, identifying a reference media content corresponding to the query sequence of media content.

16. The computing system of claim 15, wherein the first query signature and the second query signature corresponding to different frames of the query sequence of media content.

17. The computing system of claim 15, wherein searching the reference database comprises searching the reference database using a hash index of the first query signature and a hash index of the second query signature.

18. The computing system of claim 15, wherein identifying the reference media content comprises identifying the reference media content based at least on the correlation score satisfying a threshold.

19. The computing system of claim 15:
   wherein the functions further comprise determining a correlation in space between the pair of query signatures and the pair of reference signatures, and
   wherein the identifying is further based on the correlation in space.

20. The computing system of claim 15, wherein identifying the reference media content comprises identifying a name of the reference media content and a start frame within the reference media content.

\* \* \* \* \*